US009734241B2

(12) United States Patent
Slovak et al.

(10) Patent No.: US 9,734,241 B2
(45) Date of Patent: Aug. 15, 2017

(54) COMPUTERIZED SYSTEM AND METHOD FOR CREATING AGGREGATE PROFILE REPORTS REGARDING LITIGANTS, ATTORNEYS, LAW FIRMS, JUDGES, AND CASES BY TYPE AND BY COURT FROM COURT DOCKET RECORDS

(75) Inventors: Marc B. Slovak, Wynnewood, PA (US); Kevin R. Stehr, Seattle, WA (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 2592 days.

(21) Appl. No.: 11/157,177

(22) Filed: Jun. 21, 2005

(65) Prior Publication Data

US 2006/0129593 A1 Jun. 15, 2006

Related U.S. Application Data

(60) Provisional application No. 60/581,760, filed on Jun. 23, 2004.

(51) Int. Cl.
*G06F 17/30* (2006.01)
*G06Q 50/18* (2012.01)
*G06Q 10/10* (2012.01)

(52) U.S. Cl.
CPC .. *G06F 17/30719* (2013.01); *G06F 17/30616* (2013.01); *G06F 17/30696* (2013.01); *G06Q 10/10* (2013.01); *G06Q 50/18* (2013.01)

(58) Field of Classification Search
CPC .. G06Q 50/18; G06Q 10/10; G06F 17/30719; G06F 17/30616; G06F 17/30696

USPC ........................................................... 705/1
See application file for complete search history.

(56) References Cited

U.S. PATENT DOCUMENTS

| | | | |
|---|---|---|---|
| 5,544,352 A | | 8/1996 | Egger |
| 5,603,025 A | * | 2/1997 | Tabb et al. |
| 5,794,236 A | | 8/1998 | Mehrle |
| 5,838,966 A | * | 11/1998 | Harlan ........................ 715/866 |
| 5,870,770 A | | 2/1999 | Wolfe |

(Continued)

OTHER PUBLICATIONS

Corrine Streff, Use Microsoft Graph to quickly and easily create charts, Mar. 2004, ProQuest Computing, p. 11.*

(Continued)

*Primary Examiner* — Carrie S Gilkey
(74) *Attorney, Agent, or Firm* — Dinsmore & Shohl LLP

(57) ABSTRACT

Computerized method for aggregating relevant information from court records and presenting such information in electronic reports including tables and charts. There are five types of reports that focus on cases filed by Litigant, Attorney or Law Firm, Judge, Court, and Nature of Suit. A History option also is provided, in which are grouped all reports previously run by the user in one table. The user inputs a time frame and identifies specific reporting entities. The process accepts these inputs and constructs a list of cases that meet the specified criteria. The information in the list is presented to the user as a multi-part report containing tables and charts of aggregate information of particular interest to the user. Most report sections allow for "drill-downs" that bring additional specific focus to the reports. The reports are also configurable in a variety of ways including selecting graph types and section inclusion/exclusion.

17 Claims, 83 Drawing Sheets

(56) References Cited

U.S. PATENT DOCUMENTS

| | | | |
|---|---|---|---|
| 5,875,431 A | 2/1999 | Heckman et al. | |
| 5,940,800 A | 8/1999 | Bennett et al. | |
| 5,950,194 A | 9/1999 | Bennett et al. | |
| 6,026,395 A | 2/2000 | Bennett et al. | |
| 6,055,531 A | 4/2000 | Bennett et al. | |
| 6,098,070 A * | 8/2000 | Maxwell | 707/102 |
| 6,263,351 B1 | 7/2001 | Wolfe | |
| 6,279,033 B1 * | 8/2001 | Selvarajan et al. | 709/217 |
| 6,301,590 B1 * | 10/2001 | Siow et al. | 715/234 |
| 6,502,081 B1 | 12/2002 | Wiltshire, Jr. et al. | |
| 6,529,911 B1 | 3/2003 | Mielenhausen | |
| 6,549,894 B1 | 4/2003 | Simpson et al. | |
| 6,668,255 B2 | 12/2003 | Mielenhausen | |
| 6,732,087 B1 | 5/2004 | Hughes et al. | |
| 6,738,760 B1 | 5/2004 | Krachman | |
| 6,873,991 B2 * | 3/2005 | Carroll et al. | |
| 6,901,404 B1 * | 5/2005 | Bonutti | |
| 7,197,716 B2 * | 3/2007 | Newell et al. | 715/760 |
| 7,571,174 B2 * | 8/2009 | Arumainayagam et al. | |
| 2002/0049705 A1 * | 4/2002 | Haviv-Segal et al. | 707/1 |
| 2002/0052863 A1 | 5/2002 | Morikage et al. | |
| 2002/0091679 A1 | 7/2002 | Wright | |
| 2002/0188521 A1 | 12/2002 | Kimmel, Jr. | |
| 2003/0046277 A1 | 3/2003 | Jackson et al. | |
| 2003/0112270 A1 | 6/2003 | Newell et al. | |
| 2003/0195876 A1 | 10/2003 | Hughes et al. | |
| 2003/0204430 A1 | 10/2003 | Kalmick et al. | |
| 2004/0019496 A1 * | 1/2004 | Angle et al. | 705/1 |
| 2004/0024775 A1 * | 2/2004 | Kemp | 707/102 |

OTHER PUBLICATIONS

LexisNexis(TM) CourtLink(R) Offers Statewide Access in New York; Legal professionals get total State Supreme Court coverage for online alerts, tracking, Feb. 2, 2004, PR Newswire.*

Debnath et al., "LawBot: A Multiagent Assistant for Legal Research"; IEEE Internet Computing; Nov.-Dec. 2000; pp. 32-37.*

Debnath et al.; "LawBot: A Multiagent Assistant for Legal Research"; IEEE Internet Computing; Nov.-Dec. 2000; pp. 32-37.

Hafner et al.; "SmartLaw: Adapting 'Classic' Expert System Techniques for the Legal Research Domain"; International conference on Artificial Intelligence and Law; 1993; pp. 131-141.

* cited by examiner

| | 100 | 200 | 300 | 400 | 500 |
|---|---|---|---|---|---|

| Litigant | Attorney/Law Firm | Judicial | Courts | Nature of Suit | |
|---|---|---|---|---|---|

— 110

Report period from [01/01/2004] to [04/12/2004] ◄—130   —120a   —140  [HELP]

Litigant name: [                              ]   Search Tips   — 120b
Alternate spelling or subsidiary: [                              ]
Alternate spelling or subsidiary: [                              ]   — 120c
Alternate spelling or subsidiary: [                              ]
Alternate spelling or subsidiary: [                              ]   — 120d — 150a                                                              — 120e Client matter Code
[        ]
                                                  — 150b
Client/Project Notes
[                    ]

[Produce Profile]  — 170

Due to fact that company names may be entered by court clerks in a variety of ways it may be difficult to identify all litigation involving a company. Only enter the key components of a company name and/or any other known variations when searching. Additionally, you may be interested in researching company subsidiaries and/or other business relationships. If you would like to perform research click here. There is no additional charge to perform this research. A new window will open. Enter key components of the company name in the input field and click Search.

160

You have previously run the following Litigant Strategic Profiles.
To rerun a profile click on Rerun. To delete a previous profile click on Delete.

160a  —160b

| Action | Litigant | Date Run | Rerun Free Until | From | To | Results | Billing Code | Notes |
|---|---|---|---|---|---|---|---|---|
| Rerun Delete | Intel Corporation | 04/06/2004 10:55:42 am | $150.00 to rerun | 04/01/2003 | 03/31/2004 | 28 | | |
| Rerun Delete | Viacom | 03/18/2004 9:35:25 am | $150.00 to rerun | 01/01/1999 | 03/18/2004 | 4243 | | |
| Rerun Delete | wyeth | 03/11/2004 3:20:27 pm | $150.00 to rerun | 01/01/2004 | 03/11/2004 | 796 | | |
| Rerun Delete | wyeth | 03/11/2004 2:46:25 pm | $150.00 to rerun | 01/01/2003 | 03/11/2004 | 5388 | | |

Delete All Previous Litigant Profiles

—160c        Copyright © 2004, LexisNexis

FIGURE 3A

Back to myCourtlink Strategic Profile Menu

LexisNexis CourtLink® ———————————— STRATEGIC PROFILES myCourtlink > Strategic Profile Home > Litigant Strategic Profile > Selection/Verification The fee to generate a Litigant Strategic Profile is $150.00. This fee will not be billed if this is a subsequent report for the same litigant run within 24 hours of the initial report (including profiles rerun with revised date ranges). If the profile report yields no case results you will not be charged.

Check the litigants to be included in this report and then click Produce Profile at the bottom of the screen. This list represents all of the variations of litigant names we could identify containing the names you entered. You must enter the name to be displayed on the report in the input box at the bottom of the screen.

> To assist you with your research, you can search our database of corporate affiliations and perhaps discover other companies related to [Microsoft]. This service is offered at no additional fee. If you would like to perform this search please click here and a new results window will be opened.

Report period is from 01/01/2004 to 04/12/2004

— 180b            — 180a

| Include? | Case Count | Litigant Name |
|---|---|---|
| ☐ | 1 | Microsoft Corp |
| ☐ | 1 | Microsoft Corp Inc, A Washington Corporation |
| ☐ | 3 | Microsoft Corp, A Washington Corporation |
| ☐ | 5 | Microsoft Corporation |
| ☐ | 1 | Microsoft Corporation Counter |
| ☐ | 1 | Microsoft Corporation, A Wahington Corporation |
| ☐ | 7 | Microsoft Corporation, A Washington Corporation |
| ☐ | 1 | Microsoft Corporation, Inc |
| ☐ | 1 | Microsoft Corporation, Third Party Microsoft Corporation 3RD Party |
| ☐ 180c | 1 | Microsoft, A Washington Corporation |

[Select All] [Deselect All]   /180d                      — 180g

Name to use on Report  |Microsoft                                      |

Do you want to create this report?

[Produce Profile] [Cancel]   [HELP]

Back to myCourtlink Strategic Profile Menu

LexisNexis™ *CourtLink®* ——————————— *STRATEGIC PROFILES* myCourtlink > Strategic Profile Home > Litigant Strategic Profile > Profile Report LexisNexis™ Courtlink®
Litigant Strategic Profile for
Microsoft
01/01/2004 - 04/12/2004
21 Cases

— 190

The following represents an analysis of the cases where Microsoft has been involved in Federal District Court litigation .

Nature of Suit Analysis

Nature of Suit Analysis - Between 01/01/2004 and 04/12/2004, Microsoft has been involved in the following federal litigation. Click on a Nature of Suit description for an analysis specific to these cases.

| Nature of Suit | Count | Percent |
|---|---|---|
| Antitrust | 1 | 4.76 |
| Copyrights | 5 | 23.81 |
| Employment | 2 | 9.52 |
| Other Civil Rights | 1 | 4.76 |
| Other Statutory Actions | 5 | 23.81 |
| Patent | 3 | 14.29 |
| Trademark | 4 | 19.05 |

191a

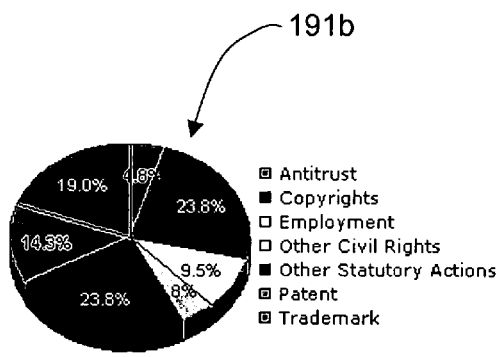

191b

- Antitrust
- Copyrights
- Employment
- Other Civil Rights
- Other Statutory Actions
- Patent
- Trademark

Jurisdictional Analysis

Jurisdictional Analysis – Between 01/01/2004 and 04/12/2004, Microsoft has been involved in litigation in the following states.

| State | Count | Percent |
|---|---|---|
| Alabama | 1 | 4.76 |
| Arizona | 1 | 4.76 |
| California | 7 | 33.33 |
| Florida | 2 | 9.52 |
| New York | 1 | 4.76 |
| Oregon | 2 | 9.52 |
| South Carolina | 1 | 4.76 |
| Utah | 1 | 4.76 |
| Virginia | 1 | 4.76 |
| Washington | 4 | 19.05 |

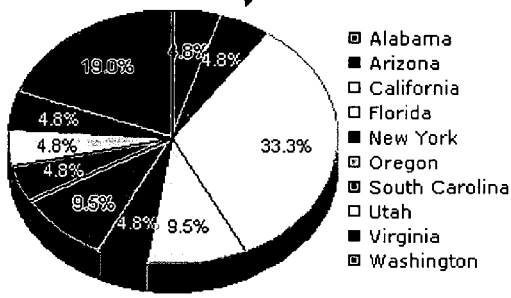

FIGURE 3G

Federal District Court Analysis

Federal District Court Analysis – Between 01/01/2004 and 04/12/2004, Microsoft has been involved in litigation in the following courts.

| Federal District Court | Count | Percent |
|---|---|---|
| Alabama - Northern | 1 | 4.76 |
| Arizona | 1 | 4.76 |
| California - Central | 3 | 14.29 |
| California - Northern | 4 | 19.05 |
| Florida - Southern | 2 | 9.52 |
| New York - Southern | 1 | 4.76 |
| Oregon | 2 | 9.52 |
| South Carolina | 1 | 4.76 |
| Utah | 1 | 4.76 |
| Virginia - Eastern | 1 | 4.76 |
| Washington - Western | 4 | 19.05 |

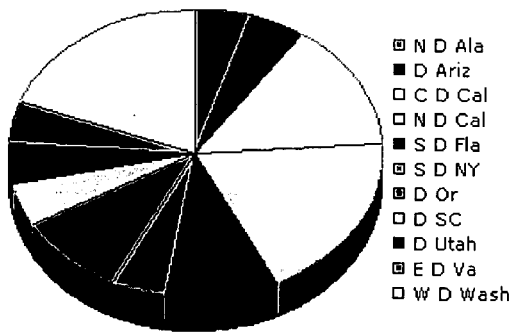

Law Firm Analysis

Law Firm Analysis – Between 01/01/2004 and 04/12/2004, Microsoft has been represented in litigation by the following firms. (NOTE: Firms having multiple attorneys representing the client in a single case will increase their count. Certain newer cases may not have defense counsel assigned.) Click on a Law Firm name to restrict the report to cases involving a specific firm.

| Key | Law Firm | Count | Pct |
|-----|----------|-------|-----|
| F1  |          | 1 | 3.13 |
| F2  | Fish & Richardson, PC | 1 | 3.13 |
| F3  | Fried, Frank, Harris, Shriver & Jacobson | 1 | 3.13 |
| F4  | Fried, Frank, Harris, Shriver & Jacobson LLP | 1 | 3.13 |
| F5  | Holland & Knight | 1 | 3.13 |
| F6  | Holland & Knight LLP | 1 | 3.13 |
| F7  | Klarquist Sparkman, LLP | 1 | 3.13 |
| F8  | Nelson Mullins Riley and Scarborough | 2 | 6.25 |
| F9  | Piper Rudnick | 8 | 25.00 |
| F10 | Piper Rudnick LLP | 1 | 3.13 |
| F11 | Preston Gates & Ellis | 8 | 25.00 |
| F12 | Preston Gates & Ellis LLP | 2 | 6.25 |
| F13 | Ray Quinney & Nebeker | 3 | 9.38 |
| F14 | Sidley Austin Brown & Wood LLP | 1 | 3.13 |

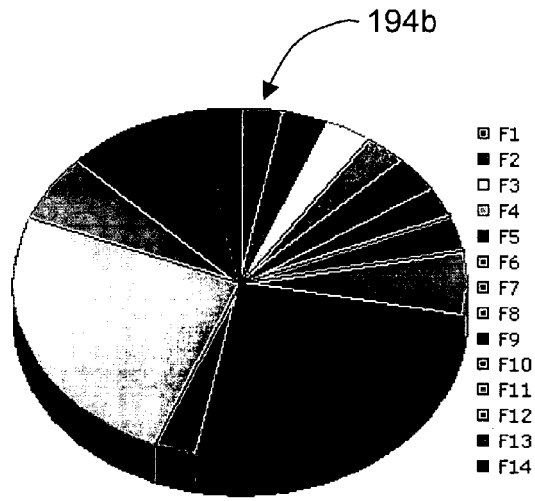

FIGURE 3H

Cases Referenced - Cases referenced by this report include the following.

Click on View to view a specific case. Click on Track to track ongoing activity for a case.

If the symbol ! appears in the first column, this is an indicator that no defense attorneys are present on our copy of the docket. To discover if any defense attorneys have been assigned on the most recent version of the docket, click on View. When looking at the case, click on the Update button and we will obtain the most recent copy of the case from the court. You will be alerted by email when the case has been obtained and you can then rerun this report which will include the updated information.

Click on this symbol 📧 to be alerted by email when new cases are found for Microsoft.

| ! | Action | Court | Docket | Heading | NOS | Filed | Case Law |
|---|---|---|---|---|---|---|---|
|   | View Track | S D Fla | 0:04cv60430 | Freedman v. Microsoft Corp | Employment | 04/05/2004 | N/A |
| ! | View Track | D Ariz | 2:04mc29 | Microsoft Corp v. Sandman | Other Statutory Actions | 03/26/2004 | N/A |
|   | View Track | N D Cal | 5:04cv959 | Thangellapally v. Microsoft Corporation | Employment | 03/09/2004 | N/A |
| ! | View Track | W D Wash | 2:04cv515 | Microsoft Corp v. JDO Media Inc et al | Other Statutory Actions | 03/09/2004 | N/A |
| ! | View Track | W D Wash | 2:04cv516 | Microsoft Corp v. Does | Other Statutory Actions | 03/09/2004 | N/A |
| ! | View Track | N D Ala | 2:04cv399 | Ram Tool and Supply v. Microsoft Corp, Inc | Copyrights | 02/27/2004 | N/A |
| ! | View Track | S D Fla | 0:04cv60252 | Tai Pan, Inc v. Microsoft Corp | Trademark | 02/27/2004 | N/A |
|   | View Track | N D Cal | 3:04cv807 | United States of America et al v. Oracle Corporation | Antitrust | 02/26/2004 | N/A |
| ! | View Track | W D Wash | 2:04cv355 | Microsoft Corp v. Ho | Copyrights | 02/20/2004 | N/A |
| ! | View Track | S D NY | 1:04cv1442 | In Re: Phillips Electronics North American Corporation | Other Statutory Actions | 02/19/2004 | N/A |
|   | View Track | N D Cal | 3:04cv588 | Lextron Systems, Inc v. Microsoft Corporation | Patent | 02/11/2004 | N/A |
| ! | View Track | D Or | 3:04cv180 | Motionless Keyboard Company v. Microsoft Corporation et al | Patent | 02/09/2004 | N/A |
|   | View Track | D Or | 6:04cv180 | Motionless Keyboard Company v. Microsoft Corporation et al | Patent | 02/09/2004 | N/A |
|   | View Track | N D Cal | 3:04cv408 | Pasetes v. Washington Township Healthcare District et al | Other Civil Rights | 01/29/2004 | N/A |
| ! | View Track | D SC | 4:04cv270 | Microsoft Corp v. Internet Express, et al | Copyrights | 01/29/2004 | N/A |
|   | View Track | C D Cal | 2:04cv448 | Microsoft Corporation v. Nano Electronics Incorporated et al | Trademark | 01/23/2004 | N/A |
| ! | View Track | E D Va | 1:04cv71 | Microsoft Corp v. PC Menu, Inc, et al | Copyrights | 01/23/2004 | N/A |
| ! | View Track | D Utah | 2:04cv56 | Microsoft v. Perseus Trading, et al | Copyrights | 01/22/2004 | N/A |
|   | View Track | W D Wash | 2:04cv116 | Microsoft Corp Inc v. SYNERGY6 Inc et al | Other Statutory Actions | 01/15/2004 | N/A |
| ! | View Track | C D Cal | 2:04cv230 | Microsoft Corporation v. MD and I Corporation et al | Trademark | 01/14/2004 | N/A |

FIGURE 3J

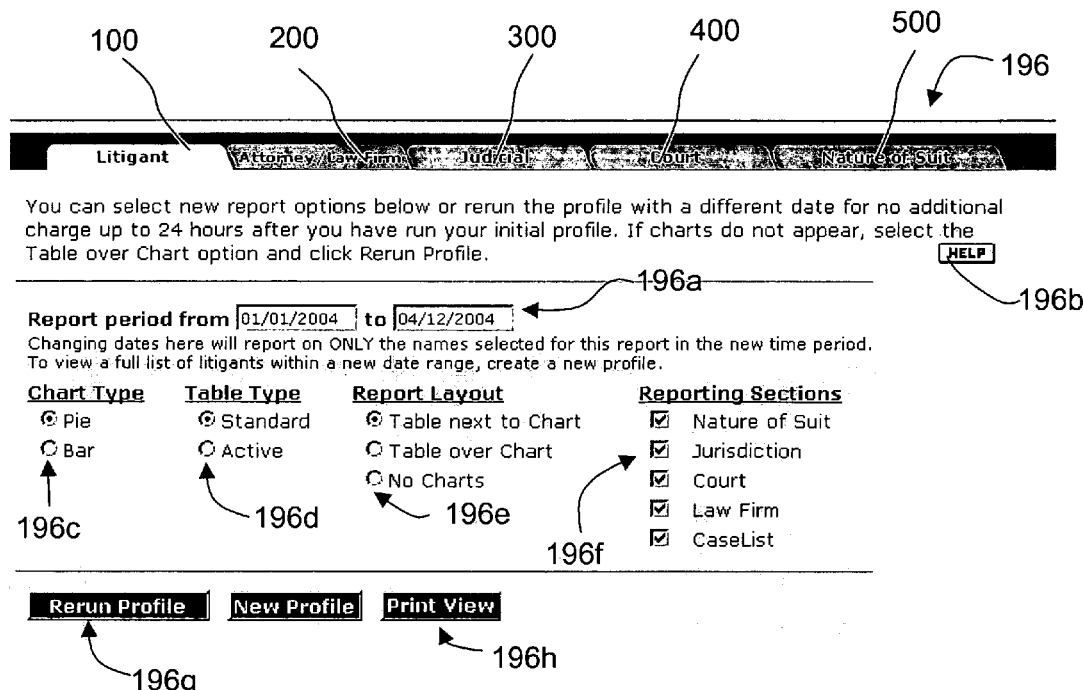

FIGURE 3K

Report Criteria

Cases Filed: From 01/01/2004 to 04/12/2004
Report Name: Microsoft
Litigants Included:
 Microsoft Corp
 Microsoft Corp Inc, A Washington Corporation
 Microsoft Corp, A Washington Corporation
 Microsoft Corporation
 Microsoft Corporation Counter
 Microsoft Corporation, A Wahington Corporation
 Microsoft Corporation, A Washington Corporation
 Microsoft Corporation, Inc
 Microsoft Corporation, Third Party Microsoft Corporation 3RD Party
 Microsoft, A Washington Corporation

FIGURE 3L 600   100       200          300      400       500
 \    \          \            \        \         \

| History | Litigant | Attorney/Law Firm | Judicial | Court | Nature of Suit |

— 110

Select Court                                                                [Help]
  Court System: [US Federal District Courts (Civil Only)]

Name of Party [info]                    ⟵ 120a
  Litigant Name: [                    ]
  Alternate spelling or subsidiary: [                    ]  — 120b
  Alternate spelling or subsidiary: [                    ]  — 120c
  Alternate spelling or subsidiary: [                    ]
  Alternate spelling or subsidiary: [                    ]  — 120d
                                                              — 120e Search for cases filed between these dates:
  From:              To:
  [1/1/2005]         [5/27/2005]    ⟵ 130
  MM/DD/YYYY         MM/DD/YYYY
                     ⟵ 150a
Client Matter Code: [info] Previous Codes: [info]
[            ]  [-- Select One --] Manage Previous Codes            170
These codes will appear on your invoice next to charges associated with this search.  — 150b Client/Project Notes:
[                                                    ]

[Create Profile]

Chart Type:    Reporting Selections:
  ⊙ Pie          ☑ Court
  ○ Bar          ☑ Law Firm
                 ☑ Nature of Suit
                 ☑ Jurisdiction
    ↑            ☑ Case List  ⟵ 196f
   196c

Research Company Subsidiaries

To research company subsidiaries and/or other business relationships, click here. There is no additional charge to perform this research.

Tip: Due to the fact that company names may be entered by court clerks in a variety of ways, it may be difficult to identify all litigation involving a company. To ensure you are getting the most information possible, enter only the key components of a company name in your search

FIGURE 3M

Print

LexisNexis CourtLink Strategic Profiles
Name Search Tips

You may use wildcards and exact name searching when entering a name. For example, you may enter IBM as the Litigant Name and International Business Machines as the alternate spelling (when entering company names, avoid using terms like Inc., Ltd, and Corp. Only enter the relevant part of the company name).

Using Wildcards - The * is used for multiple characters. For example entering Inte* as a Litigant would find all companies having the following words in their name: International, Integrated, Intelligent, etc.

Exact Matching - Use quotation marks (") to insure an exact match. For example, let's say you wanted to search for Union Bank for an exact match search. You would enter "Union Bank". This would guarantee that you would only get results where the words "Union" and "Bank" appear next to each other within the litigant name.

Quick Tips:

- Put quotes (") around words that have to appear in that order.
- The name must start with a double quote (")
- Do not put the word "the" in between quotes. For example: The Smith Company should be entered as "Smith Company"
- No more than 9 words are allowed in a name.

We recommend that you normally enter the name without quotes. Entering "John Doe" will not result in a hit if the court decides to enter his name with a middle initial such as John A. Doe. If you still wish to use exact name searching for a person's or company's name, we recommend entering "John Doe" with an alternate spelling of "Doe John". Searching for "Trump Plaza Hotel" Casino will not recognize that Casino is outside of the quotes and will look for an exact match for "Trump Plaza Hotel Casino".

Law Firm Analysis

Law Firm Analysis - Between 1/1/2004 and 4/12/2004, Microsoft has been represented in litigation by the following firms. (NOTE: Certain newer cases may not have defense counsel assigned.) Click on a Law Firm name to restrict the report to cases involving a specific firm.

| Key | Law Firm | Count | Percent | Legend |
|---|---|---|---|---|
| F1 | Bradley Arant Rose & White | 1 | 3.85% | ■ |
| F2 | Fish & Richardson, PC | 1 | 3.85% | ■ |
| F3 | Fried, Frank, Harris, Shriver & Jacobson | 1 | 3.85% | ■ |
| F4 | Fried, Frank, Harris, Shriver & Jacobson LLP | 1 | 3.85% | ■ |
| F5 | Holland & Knight | 2 | 7.69% | ■ |
| F6 | Holland & Knight LLP | 1 | 3.85% | ■ |
| F7 | Klarquist Sparkman, LLP | 1 | 3.85% | ■ |
| F8 | Microsoft Corporation | 1 | 3.85% | ■ |
| F9 | Nelson Mullins Riley and Scarborough | 1 | 3.85% | ■ |
| F10 | Piper Rudnick | 4 | 15.38% | ☐ |
| F11 | Piper Rudnick LLP | 1 | 3.85% | ■ |
| F12 | Preston Gates & Ellis | 5 | 19.23% | ■ |
| F13 | Preston Gates & Ellis LLP | 1 | 3.85% | ☐ |
| F14 | Ray Quinney & Nebeker | 1 | 3.85% | ■ |
| F15 | Sidley Austin Brown & Wood | 1 | 3.85% | ☐ |
| F16 | Sidley Austin Brown & Wood LLP | 1 | 3.85% | ■ |
| F17 | Thompson & Knight | 1 | 3.85% | ▦ |
| F18 | White Arnold Andrews & Dowd PC | 1 | 3.85% | ■ |

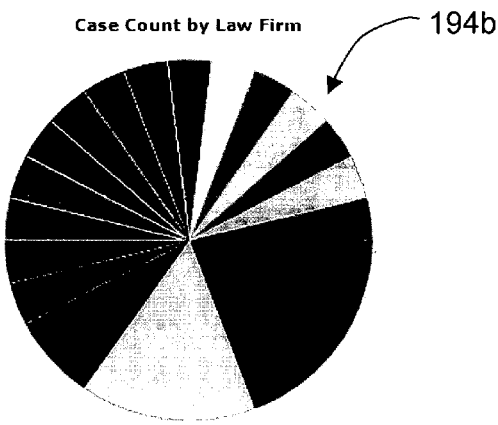

Case Count by Law Firm

FIGURE 3T

*Profile Report* | Case List | *Internal*

Cases Referenced - Cases referenced by this report include the following.

Click on View to view a specific case. Click on Track to track ongoing activity for a case.

If the symbol ! appears in the first column, this is an indicator that no defense attorneys are present on our copy of the docket. To discover if any defense attorneys have been assigned on the most recent version of the docket, click on View. When looking at the case, click on the Update button and we will obtain the most recent copy of the case from the court. You will be alerted by email when the case has been obtained and you can then rerun this report which will include the updated information.

— 195b
Click on this symbol 📧 to be alerted by email when new cases are found for Microsoft.

— 195a   195k

/ 195c   ⌐ 195d   ⌐ 195e   195f ⌐   195g ⌐   195h   Printer Friendly List
                                                        Customize List
Items 1 to 22 of 22  195i

| Action | Court | Docket | Heading | NOS | Filed | Case Law |
|---|---|---|---|---|---|---|
| | All | | | All | | |
| Track View | California - Central | 2:04cv2425 | State Farm General Insurance Company v. Comptek Plus International Inc Et A | Insurance | 4/6/2004 | n/a |
| Track View | Florida - Southern | 0:04cv60430 | Freedman v. Microsoft Corp | Employment | 4/5/2004 | n/a |
| ! Track View | Arizona | 2:04mc29 | Microsoft Corp v. Sandman  195j | Other Statutory Actions | 3/26/2004 | n/a |
| Track View | Washington - Western | 2:04cv515 | Microsoft Corp v. JDO Media Inc et al | Other Statutory Actions | 3/9/2004 | n/a |
| ! Track View | Washington - Western | 2:04cv516 | Microsoft Corp v. Lin, et al | Other Statutory Actions | 3/9/2004 | n/a |
| Track View | California - Northern | 5:04cv959 | Thangellapally v. Microsoft Corporation | Employment | 3/9/2004 | n/a |
| Track View | Florida - Southern | 0:04cv60252 | Tai Pan, Inc v. Microsoft Corp | Trademark | 2/27/2004 | n/a |
| Track View | Alabama - Northern | 2:04cv399 | Ram Tool and Supply v. Microsoft Corp, Inc | Copyrights | 2/27/2004 | n/a |
| Track View | California - Northern | 3:04cv807 | United States of America et al v. Oracle Corporation | Antitrust | 2/26/2004 | n/a |
| ! Track View | Washington - Western | 2:04cv355 | Microsoft Corp v. Ho | Copyrights | 2/20/2004 | n/a |
| ! Track View | New York - Southern | 1:04cv1442 | In Re: Phillips Electronics North American Corporation | Other Statutory Actions | 2/19/2004 | n/a |
| Track View | California - Northern | 3:04cv588 | Lextron Systems, Inc v. Microsoft Corporation | Patent | 2/11/2004 | n/a |
| ! Track View | Oregon | 3:04cv180 | Motionless Keyboard Company v. Microsoft Corporation et al | Patent | 2/9/2004 | n/a |
| Track View | Oregon | 6:04cv180 | Motionless Keyboard Company v. Microsoft Corporation et al | Patent | 2/9/2004 | n/a |
| Track View | California - Northern | 3:04cv408 | Pasetes v. Washington Township Healthcare District et al | Other Civil Rights | 1/29/2004 | n/a |
| ! Track View | South Carolina | 4:04cv270 | Microsoft Corp v. Internet Express, et al | Copyrights | 1/29/2004 | n/a |
| Track View | Virginia - Eastern | 1:04cv71 | Microsoft Corp v. PC Menu, Inc, et al | Copyrights | 1/23/2004 | n/a |
| Track View | California - Central | 2:04cv448 | Microsoft Corporation v. Nano Electronics Incorporated et al | Trademark | 1/23/2004 | n/a |
| Track View | Utah | 2:04cv56 | Microsoft v. Perseus Trading, et al | Copyrights | 1/22/2004 | n/a |
| Track | Washington - Western | 2:04cv116 | Microsoft Corp Inc v. SYNERGY6 Inc et | Other Statutory Actions | 1/15/2004 | n/a |

FIGURE 3V

Search for cases filed between these dates:
From: 1/1/2004 MM/DD/YYYY
To: 4/12/2004 MM/DD/YYYY  ← 196a Chart Type:
◉ Pie
○ Bar
↑
196c Reporting Selections:
☑ Court
☑ Law Firm
☑ Nature of Suit
☑ Jurisdiction
☑ Case List
196f 196 ⟶ Print View
196i

[Re-run Profile] [New Profile]
196g

| Profile Report | Case List | Criteria |

Court System: U.S. District Courts

Cases Filed: From 1/1/2004 To 4/12/2004

Report Name: Microsoft

Litigants Included:

Microsoft Corporation, A Washington Corporation

Microsoft Corporation

Microsoft Corp, A Washington Corporation

Microsoft Corp Inc, A Washington Corporation

Microsoft Corporation Counter

Microsoft Corporation Third Party Microsoft Corporation 3RD Party

Microsoft Corporation, A Wahington Corporation

Microsoft Corp

Microsoft Corporation, Inc

Microsoft Corporation, Inc Counter

Microsoft, A Washington Corporation

FIGURE 3X

| | 100 | 200 | 300 | 400 | 500 |

| Litigant | Attorney/Law Firm | Judicial | Court | Nature of Suit |

Report period from [01/01/2004] to [04/12/2004] ← 230

[HELP]

220a

Attorney's last name: [_____] Enter all or part of last name

Law Firm: [_____] Enter only first name of Law Firm (optional)      210

220b

Client matter Code 250a
[_____]

Client/Project Notes
[_____] 250b

Produce Profile ——— 270

NOTE: Attorney/Law Firm profiles are performed against a database of Federal District Court civil cases. The database includes cases from some courts that go back as far as 20 years. In Phase 1 of the rollout, Attorney/Law Firm profiles will only include cases where the last copy of the case that LexisNexis CourtLink obtained from the court contains the name(s) of the attorney(s). Most new cases LexisNexis CourtLink obtains do not have defense counsel listed on the case docket. These names will only be added if LexisNexis CourtLink obtains an updated copy of the case after defense counsel has been listed on the case docket. Certain factors, including misspellings and abbreviations may cause attorneys to be omitted. For these reasons, Attorney/Law Firm profiles may not attribute all civil cases in which an attorney is counsel of record. We plan to address many of these issues in Phase 2.

You have previously run the following Attorney/Law Firm Strategic Profiles.
To rerun a profile click on Rerun. To delete a previous profile click on Delete.

260a   260b

| Action | Attorney | Date Run | Rerun Free Until | From | To | Results | Billing Code | Notes |
|---|---|---|---|---|---|---|---|---|
| Rerun Delete | Jerry Blackwell | 03/10/2004 11:18:09 am | $75.00 to rerun | 01/01/2004 | 03/02/2004 | 5 | | |
| Rerun Delete | Wolf, Block | 02/17/2004 9:12:15 am | $75.00 to rerun | 01/01/2004 | 02/12/2004 | 5 | | |

Delete All Previous Attorney/Law Firm Profiles 260c                                      260

FIGURE 4A

Back to myCourtlink  Strategic Profile Menu

LexisNexis™ CourtLink® ——————————— STRATEGIC PROFILES myCourtlink > Strategic Profile Home > Attorney/Law Firm Strategic Profile > Profile Report    290

LexisNexis™ Courtlink®
Attorney/Law Firm Strategic Profile for
Ian Strogatz
01/01/1980 - 04/12/2004
20 Cases The following represents an analysis of the cases where Ian Strogatz has been engaged as an attorney in Federal District Court.

GENERAL OVERVIEW

Nature of Suit Analysis

Nature of Suit Analysis - Between 01/01/1980 and 04/12/2004, Ian Strogatz has participated in cases that are identified by Nature of Suit as follows. Click on a Nature of Suit description for an analysis specific to these cases.

| Nature of Suit | Count | Percent |
|---|---|---|
| Employment | 2 | 10.00 |
| Fraud | 1 | 5.00 |
| Insurance | 5 | 25.00 |
| Other Contract | 7 | 35.00 |
| Personal Property | 1 | 5.00 |
| Securities | 4 | 20.00 |

291a

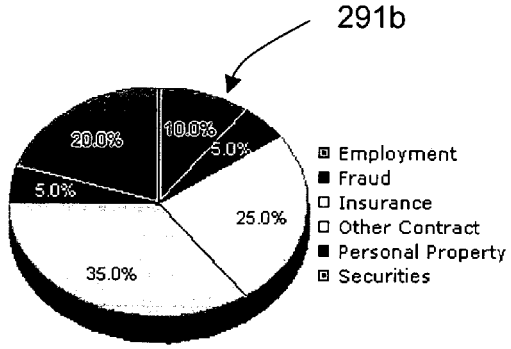

291b

- Employment
- Fraud
- Insurance
- Other Contract
- Personal Property
- Securities

FIGURE 4D

Judge Appearance Analysis

Judge Appearence Analysis - Between 01/01/1980 and 04/12/2004, Ian Strogatz has appeared before the following judges. Click on a judge name for an analysis specific to the judge.

| Judge | Court | Count |
|---|---|---|
| Naomi R Buchwald | New York - Southern | 1 |
| A Richard Caputo | Pennsylvania - Middle | 1 |
| Robert J Cindrich | Pennsylvania - Western | 1 |
| Denise L Cote | New York - Southern | 1 |
| Alfred V Covello | Connecticut | 1 |
| Stewart Dalzell | Pennsylvania - Eastern | 1 |
| Robert S Gawthrop III | Pennsylvania - Eastern | 2 |
| James T Giles | Pennsylvania - Eastern | 2 |
| Marilyn Dolan GO | New York - Eastern | 1 |
| Sterling Johnson Jr | New York - Eastern | 1 |
| J Curtis Joyner | Pennsylvania - Eastern | 1 |
| Yvette Kane | Pennsylvania - Middle | 1 |
| Marvin Katz | Pennsylvania - Eastern | 1 |
| James McGirr Kelly | Pennsylvania - Eastern | 1 |
| Clarence C Newcomer | Pennsylvania - Eastern | 2 |
| William M Nickerson | Maryland. | 1 |
| ILA Jeanne Sensenich | Pennsylvania - Western | 1 |
| Norma L Shapiro | Pennsylvania - Eastern | 1 |
| Thomas I Vanaskie | Pennsylvania - Middle | 1 |
| William H Yohn r | Pennsylvania - Eastern | 1 |

FIGURE 4F

Client Analysis

Client Analysis - Between 01/01/1980 and 04/12/2004, Ian Strogatz has represented the following clients.

| Client | Capacity | Court | Case Heading | Nature Of Suit |
|---|---|---|---|---|
| Bear Stearns & Co, Inc | Plaintiff | E D Pa | Bear Stearns & Co, , et al v. Philadelphia Stock Exch, et al | Securities |
| Century Life Insurance Company | Defendant | E D Pa | Providian Life and, et al v. Cuna Mutual Insuranc, et al | Fraud |
| Century Life of America | Defendant | E D Pa | Providian Life and, et al v. Cuna Mutual Insuranc, et al | Fraud |
| Cuna Mutual Insurance Group | Defendant | E D Pa | Hering v. Cuna Mutual Ins, et al | Insurance |
| Cuna Mutual Insurance Society | Defendant | E D Pa | Providian Life and, et al v. Cuna Mutual Insuranc, et al | Fraud |
| Cuna Mutual Investment Corporation | Defendant | E D Pa | Providian Life and, et al v. Cuna Mutual Insuranc, et al | Fraud |
| David Cutler Industries, Ltd | Plaintiff | E D Pa | David Cutler Indust v. Amer Stores Co Inc | Personal Property |
| Drake Capital Securities, Inc | Defendant | E D Pa | Bean, et al v. Regal Communications, et al | Securities |
| Drake Capital Securities, Inc | Defendant | E D Pa | Epstein v. Toll, et al | Securities |
| Fidelity and Deposit Co of Maryland | Defendant | S D NY | Morse /Diesel, Inc> v. Fidelity & Deposit C | Other Contract |
| Fidelity and Deposit Co of Maryland | Other | S D NY | Morse /Diesel, Inc> v. Fidelity & Deposit C | Other Contract |
| Fidelity and Deposit Company of Maryland | Defendant | E D Pa | Willow Grove Bank v. Fidelity and Deposit | Insurance |
| Fidelity and Deposit Company of Maryland | Plaintiff | M D Pa | Fidelity & Deposit v. R.l.mylet, Inc, et al | Other Contract |
| Fidelity and Guaranty Insurance Company | Plaintiff | E D NY | Fidelity and Guarant, et al v. J Double K, Inc, et al | Other Contract |
| Intercargo Insurance Company | Defendant | E D Pa | The School Dist v. Intercargo Ins Co | Other Contract |
| Intercargo Insurance Company | Other | E D Pa | The School Dist v. Intercargo Ins Co | Other Contract |
| Legalgard, Inc | Defendant | E D Pa | Dalicandro v. Legalgard, Inc, et al | Securities |
| Legalgard, Inc DBA Sandenhill, Inc | Defendant | E D Pa | Dalicandro v. Legalgard, Inc, et al | Securities |
| Members Life Insurance Company | Defendant | E D Pa | Providian Life and, et al v. Cuna Mutual Insuranc, et al | Fraud |
| Premier Systems, Inc | Other | E D Pa | Premier Systems, Inc v. St Paul Fire | Insurance |
| Premier Systems, Inc | Plaintiff | E D Pa | Premier Systems, Inc v. St Paul Fire | Insurance |
| Reliance Insurance Company | Defendant | E D Pa | Davis v. Reliance Insurance | Employment |
| Reliance Insurance Company, Inc | Defendant | E D Pa | Dalicandro v. Legalgard, Inc, et al | Securities |
| UNA Mutual Insurance Society | Defendant | E D Pa | Hering v. Cuna Mutual Ins, et al | Insurance |
| United States Fidelity & Guaranty Company | Defendant | M D Pa | Harris Financial, M v. United States Fidel | Insurance |
| United States Fidelity & | Plaintiff | M D Pa | United States Fidel v. Feibus, et | Other Contract |

FIGURE 4G

Opposing/Co-Counsel Analysis

Opposing/Co-Counsel Analysis - Between 01/01/1980 and 04/12/2004, Ian Strogatz has been on the same or opposing sides with the following attorneys. Click on an attorney name to discover possible further information from Martindale-Hubbell.

| Attorney | Rep | Side | Court | Case Heading |
|---|---|---|---|---|
| Steven J Aaronoff | Other | Opposing | E D Pa | Dalicandro v. Legalgard, Inc, et al |
| Arlin M Adams | Defendant | Same side | E D Pa | Ezold, Nancy O Mara v. Wolf, Block, Schorr, et al |
| Gerald E Arth | Defendant | Same side | E D Pa | Dalicandro v. Legalgard, Inc, et al |
| Glenn P Banks | Other | Same side | E D Pa | Premier Systems, Inc v. St Paul Fire |
| Glenn P Banks | Defendant | Opposing | E D Pa | Premier Systems, Inc v. St Paul Fire |
| Michael J Barry | Defendant | Opposing | E D Pa | Bear Stearns & Co, , et al v. Philadelphia Stock Exch, et al |
| Richard S Bishop | Defendant | Opposing | M D Pa | United States Fidel v. Feibus, et al |
| Martin J Black | Defendant | Opposing | E D Pa | David Cutler Indust v. Amer Stores Co Inc |
| David I Bookspan | Plaintiff | Same side | M D Pa | United States Fidel v. Feibus, et al |
| David I Bookspan | Defendant | Same side | M D Pa | Harris Financial, M v. United States Fidel |
| John J Branigan | Plaintiff | Opposing | E D Pa | Hering v. Cuna Mutual Ins, et al |
| Jeannette M Brian | Plaintiff | Opposing | M D Pa | Harris Financial, M v. United States Fidel |
| Michael A Bucci | Defendant | Same side | D Conn | Cupples Products Inc v. US Fidelity |
| John J Calandra | Defendant | Same side | E D Pa | Dalicandro v. Legalgard, Inc, et al |
| Marjorie F Chertok | Other | Same side | E D Pa | Premier Systems, Inc v. St Paul Fire |
| Marjorie F Chertok | Defendant | Opposing | E D Pa | Premier Systems, Inc v. St Paul Fire |
| Dawn R Chism | Plaintiff | Opposing | E D Pa | The School Dist v. Intercargo Ins Co |
| Daniel D MC Clain | Defendant | Same side | E D Pa | Willow Grove Bank v. Fidelity and Deposit |
| Jacob C Cohn | Defendant | Same side | D Md | Corporacion De v. USF&G |
| Jacob C Cohn | Plaintiff | Same side | E D Pa | David Cutler Indust v. Amer Stores Co Inc |
| Jacob C Cohn | Defendant | Same side | E D Pa | Epstein v. Toll, et al |
| Jacob C Cohn | Defendant | Same side | E D Pa | Bean, et al v. Regal Communications, et al |
| Kennteth M Cushman | Other | Opposing | S D NY | Morse /Diesel, Inc> v. Fidelity & Deposit C |
| Alan J Davis | Plaintiff | Same side | E D Pa | Bear Stearns & Co, , et al v. Philadelphia Stock Exch, et al |
| Mark S Dichter | Defendant | Same side | E D Pa | Ezold, Nancy O Mara v. Wolf, Block, Schorr, et al |
| John P Diiorio | Defendant | Opposing | M D Pa | United States Fidel v. Feibus, et al |
| Diana S Donaldson | Defendant | Opposing | E D Pa | Bear Stearns & Co, , et al v. Philadelphia Stock Exch, et al |
| John H Doran | Defendant | Opposing | M D Pa | Fidelity & Deposit v. R.l.mylet, Inc, et al |
| John W Dreste | Plaintiff | Same side | E D NY | Fidelity and Guarant, et al v. J Double K, Inc, et al |
| Steven H Eichler | Other | Opposing | E D Pa | The School Dist v. Intercargo Ins Co |
| J William Ernstrom | Plaintiff | Same side | M D Pa | United States Fidel v. Feibus, et al |
| Richard W Foltz Jr | Other | Opposing | S D NY | Morse /Diesel, Inc> v. Fidelity & Deposit C |
| Susan J French | Defendant | Same side | M D Pa | Harris Financial, M v. United States Fidel |
| Mark S Gamell | Defendant | Same side | S D NY | Morse /Diesel, Inc> v. Fidelity & Deposit C |
| Mark S Gamell | Other | Opposing | S D NY | Morse /Diesel, Inc> v. Fidelity & Deposit C |
| M Norman Goldberger | Defendant | Same side | E D Pa | Ezold, Nancy O Mara v. Wolf, Block, Schorr, et al |
| Joyce K Hackenbrach | Other | Opposing | S D NY | Morse /Diesel, Inc> v. Fidelity & Deposit C |
| Patricia M Hamill | Plaintiff | Opposing | E D Pa | Providian Life and, et al v. Cuna Mutual Insuranc, et al |

FIGURE 4H

Case Listing

Cases Referenced – Cases referenced by this report include the following.

Click on View to view a specific case. Click on Track to track ongoing activity for a case.

If the symbol ! appears in the first column, this is an indicator that no defense attorneys are present on our copy of the docket. To discover if any defense attorneys have been assigned on the most recent version of the docket, click on View. When looking at the case, click on the Update button and we will obtain the most recent copy of the case from the court. You will be alerted by email when the case has been obtained and you can then rerun this report which will include the updated information.

Click on this symbol to be alerted by email when new cases are found for Ian Strogatz.

| ! | Action | Court | Docket | Heading | NOS | Filed | Case Law |
|---|---|---|---|---|---|---|---|
| | View Track | W D Pa | 2:01cv1638 | United States Fideli v. Dick Corporation/, et al | Other Contract | 08/29/2001 | N/A |
| | View Track | M D Pa | 3:01cv199 | Fidelity & Deposit v. R.J.mylet, Inc, et al | Other Contract | 01/30/2001 | N/A |
| | View Track | D Md | 1:99cv3024 | Corporacion De v. USF&G | Insurance | 10/05/1999 | N/A |
| | View Track | E D Pa | 2:99cv3778 | Dalicandro v. Legalgard, Inc, et al | Securities | 07/26/1999 | 2000 U.S. Dist. LEXIS 3089 2001 U.S. Dist. LEXIS 18530 |
| | View Track | D Conn | 3:98cv1217 | Cupples Products Inc v. US Fidelity | Other Contract | 06/26/1998 | N/A |
| | View Track | E D Pa | 2:98cv1296 | Willow Grove Bank v. Fidelity and Deposit | Insurance | 03/11/1998 | N/A |
| | View Track | M D Pa | 1:97cv1053 | Harris Financial, M v. United States Fidel | Insurance | 07/11/1997 | N/A |
| | View Track | E D Pa | 2:97cv3647 | Hering v. Cuna Mutual Ins, et al | Insurance | 05/27/1997 | N/A |
| | View Track | E D Pa | 2:96cv8716 | David Cutler Indust v. Amer Stores Co Inc | Personal Property | 12/31/1996 | N/A |
| | View Track | E D Pa | 2:96cv3242 | The School Dist v. Intercargo Ins Co | Other Contract | 04/24/1996 | N/A |
| | View Track | E D Pa | 2:96cv2991 | Davis v. Reliance Insurance | Employment | 04/16/1996 | N/A |
| | View Track | E D Pa | 2:96cv1797 | Providian Life and, et al v. Cuna Mutual Insuranc, et al | Fraud | 03/07/1996 | 1996 U.S. Dist. LEXIS 4109 |
| | View Track | E D NY | 1:96cv247 | Fidelity and Guarant, et al v. J Double K, Inc, et al | Other Contract | 01/19/1996 | N/A |
| | View Track | M D Pa | 3:95cv1925 | United States Fidel v. Feibus, et al | Other Contract | 11/17/1995 | 1995 U.S. Dist. LEXIS 22011 |
| | View Track | E D Pa | 2:94cv1346 | Epstein v. Toll, et al | Securities | 02/24/1994 | N/A |
| | View Track | E D Pa | 2:94cv1236 | Bean, et al v. Regal Communications, et al | Securities | 02/22/1994 | N/A |
| | View Track | E D Pa | 2:90cv4052 | Bear Stearns & Co, , et al v. Philadelphia | Securities | 06/14/1990 | N/A |

FIGURE 4J 600   100   200                    300   400   500

[History] [Litigant] Attorney/Law Firm [Judicial] [Court] [Nature of Suit]

Select Court                                                                    [Help]
Court System: | US Federal District Courts (Civil Only) |

Name of Attorney [info]                                                          210
Attorney Name: [                          ]  ———— 220a
Law Firm:      [                          ]  Enter one or two words from a Law Firm (optional)
                                              ———— 220b

Search for cases filed between these dates:
From:              To:
| 1/1/2005 | 🗓 [?]   | 5/27/2005 | 🗓 [?]  ←———— 230
MM/DD/YYYY         MM/DD/YYYY
                250a Client Matter Code: [info]  Previous Codes: [info]
[                ]  [-- Select One -- ▼] Manage Previous Codes
*These codes will appear on your invoice next to charges associated with this search.*

Client/Project Notes:
[                                ]  ———— 250b

Chart Type:    Reporting Selections:                                    [Create Profile]
 ⊙ Pie          ☑ Nature of Suit
 ○ Bar          ☑ Appearances before Judges
                ☑ Clients Represented
                ☑ Representation Capacity
                ☑ Case List                ———— 298f
  298c          ☐ Opposing and Co-Counsel
                ☑ Case Load
                  ⊙ By Year
                  ○ By Month Attorney/Law Firm profiles are performed against a database of Federal District Court and select state court cases. The database includes cases that go back as far as 20 years in some courts.

Attorney/Law Firm profiles include only cases where the last copy of the docket obtained from the court contains attorney names. To ensure that defense counsel is included on dockets and your searches return accurate results, LexisNexis CourtLink updates attorney information for any Federal District civil case where defense counsel does not appear at the time of filing. These updates take place 35 days after the filing date, and are repeated every 35 days until defense counsel first appears.

Certain factors, including misspellings and abbreviations may cause attorneys or firms to be omitted. For these reasons, Attorney/Law Firm profiles may not attribute all cases in which an attorney is counsel of record.

Attorneys/Law Firms to include in profile

Variations of attorney/law firm names we could identify containing the names you entered.

Profile name: [Ian Strogatz]    [Cancel] [Create Profile]
If no name is entered, the name of the first attorney will be used on the report.

| | Case Count | Attorney | Firm | City | State/Zip |
|---|---|---|---|---|---|
| ☐ | 6 | Ian A L Strogatz | n/a | Philadelphia | PA 19102 |
| ☐ | 4 —280b | Ian AL Strogatz | Wolf, Block, Schorr & Solis-Cohen | Philadelphia | PA 19102 |
| ☐ | 4 | Ian A L Strogatz | Wolf, Block, Schorr and Solis-Cohen | Philadelphia | PA 19102-2678 |
| ☐ | 2 | Ian A L Strogatz | Wolf Block Schorr and Solis-Cohen LLP | Philadelphia | PA 19103-2097 |
| ☐ | 1 | Ian AL Strogatz | Wolf Block Schorr and Solis-Cohen LLP | Philadelphia | PA 19103 |
| ☐ | 1 | Ian AL Strogatz | Wolf, Block, Schorr & Solis-Cohen | Philadelphia | PA 19102-2678 |
| ☐ | 1 | Ian AL Strogatz | Wolf, Block, Schorr & Solis-Cohen | Philadelphia | PA 19103-2097 |
| ☐ | 1 | Ian AL Strogatz, Esq | Wolf, Block, Schorr and Solis-Cohen | Philadelphia | PA 19102 |

[Cancel] [Create Profile]

| Profile Report | Case List | Criteria |

LexisNexis® CourtLink®
Attorney Strategic Profile for

Ian Strogatz

1/1/1980 - 4/12/2004

20 Case(s)

The following represents an analysis of the cases where Ian Strogatz has been engaged as an attorney in U.S. District Courts Court.

GENERAL OVERVIEW

— 293

Judge Appearance Analysis

Judge Appearence Analysis - Between 1/1/1980 and 4/12/2004, Ian Strogatz has appeared before the following judges. Click on a judge name for an analysis specific to the judge.

293c  293b  293d

Printer Friendly List
Customize List

Items 1 to 20 of 20

| Count | Judge | Court |
|---|---|---|
|  | All | All |
| 1 | Alfred V Covello | Connecticut |
| 1 | William M Nickerson | Maryland |
| 1 | Marilyn Dolan GO | New York - Eastern |
| 1 | Sterling Johnson, Jr | New York - Eastern |
| 1 | Denise L Cote | New York - Southern |
| 1 | Naomi R Buchwald | New York - Southern |
| 2 | Clarence C Newcomer | Pennsylvania - Eastern |
| 1 | J Curtis Joyner | Pennsylvania - Eastern |
| 1 | James McGirr Kelly | Pennsylvania - Eastern |
| 2 | James T Giles | Pennsylvania - Eastern |
| 1 | Marvin Katz | Pennsylvania - Eastern |
| 1 | Norma L Shapiro | Pennsylvania - Eastern |
| 2 | Robert S Gawthrop, III | Pennsylvania - Eastern |
| 1 | Stewart Dalzell | Pennsylvania - Eastern |
| 1 | William H Yohn Jr | Pennsylvania - Eastern |
| 1 | A Richard Caputo | Pennsylvania - Middle |
| 1 | Thomas I Vanaskie | Pennsylvania - Middle |
| 1 | Yvette Kane | Pennsylvania - Middle |
| 1 | ILA Jeanne Sensenich | Pennsylvania - Western |
| 1 | Robert J Cindrich | Pennsylvania - Western |

293e  293a

Items 1 to 20 of 20
Printer Friendly List
Customize List

FIGURE 4R

Client Analysis

Client Analysis - Between 1/1/1980 and 4/12/2004, Ian Strogatz has represented the following clients.

Printer Friendly List
Customize List

Items 1 to 30 of 30

| Client | Capacity | Court | Case Heading | Nature Of Suit |
|---|---|---|---|---|
| | All | All | All | All |
| Bear Stearns & Co, Inc | P | Pennsylvania - Eastern | Bear Stearns & Co, , et al v. Philadelph | Securities |
| Century Life Insurance Company | D | Pennsylvania - Eastern | Providian Life and, et al v. Cuna Mutual | Fraud |
| Century Life of America | D | Pennsylvania - Eastern | Providian Life and, et al v. Cuna Mutual | Fraud |
| Cuna Mutual Insurance Group | D | Pennsylvania - Eastern | Hering v. Cuna Mutual Ins, et al | Insurance |
| Cuna Mutual Insurance Society | D | Pennsylvania - Eastern | Providian Life and, et al v. Cuna Mutual | Fraud |
| Cuna Mutual Investment Corporation | D | Pennsylvania - Eastern | Providian Life and, et al v. Cuna Mutual | Fraud |
| David Cutler Industries, Ltd | P | Pennsylvania - Eastern | David Cutler Indust v. Amer Stores Co In | Personal Property |
| Drake Capital Securities, Inc | D | Pennsylvania - Eastern | Bean, et al v. Regal Communications, et | Securities |
| Drake Capital Securities, Inc | D | Pennsylvania - Eastern | Epstein v. Toll, et al | Securities |
| Fidelity and Deposit Co of Maryland | D | New York - Southern | Morse /Diesel, Inc> v. Fidelity & Deposi | Other Contract |
| Fidelity and Deposit Co of Maryland | O | New York - Southern | Morse /Diesel, Inc> v. Fidelity & Deposi | Other Contract |
| Fidelity and Deposit Company of Maryland | D | Pennsylvania - Eastern | Willow Grove Bank v. Fidelity and Deposi | Insurance |
| Fidelity and Deposit Company of Maryland | P | Pennsylvania - Middle | Fidelity & Deposit v. R.I.mylet, Inc, et | Other Contract |
| Fidelity and Guaranty Insurance Company | P | New York - Eastern | Fidelity and Guarant, et al v. J Double | Other Contract |
| Intercargo Insurance Company | D | Pennsylvania - Eastern | The School Dist v. Intercargo Ins Co | Other Contract |
| Intercargo Insurance Company | O | Pennsylvania - Eastern | The School Dist v. Intercargo Ins Co | Other Contract |
| Legalgard, Inc | D | Pennsylvania - Eastern | Dalicandro v. Legalgard, Inc, et al | Securities |
| Legalgard, Inc DBA Sandenhill, Inc | D | Pennsylvania - Eastern | Dalicandro v. Legalgard, Inc, et al | Securities |
| Members Life Insurance Company | D | Pennsylvania - Eastern | Providian Life and, et al v. Cuna Mutual | Fraud |
| Premier Systems, Inc | O | Pennsylvania - Eastern | Premier Systems, Inc v. St Paul Fire | Insurance |
| Premier Systems, Inc | P | Pennsylvania - Eastern | Premier Systems, Inc v. St Paul Fire | Insurance |
| Reliance Insurance Company | D | Pennsylvania - Eastern | Davis v. Reliance Insurance | Employment |
| Reliance Insurance Company, Inc | D | Pennsylvania - Eastern | Dalicandro v. Legalgard, Inc, et al | Securities |
| UNA Mutual Insurance Society | D | Pennsylvania - Eastern | Hering v. Cuna Mutual Ins, et al | Insurance |
| United States Fidelity & | D | Pennsylvania - Middle | Harris Financial, M v. United States Fid | Insurance |

FIGURE 4S

Opposing / Co-Counsel Analysis

Opposing/Co-Counsel Analysis - Between 1/1/1980 and 4/12/2004, Ian Strogatz has been on the same or opposing sides with the following attorneys. Click on an attorney name to discover possible further information from Martindale-Hubbell.

Printer Friendly List
Customize List

Page 1 [ 2 ] Items 1 to 100 of 116

| Attorney | Rep<br>All | Side<br>All | Court<br>All | Case Heading<br>All |
|---|---|---|---|---|
| Alan J Davis | P | Same Side | Pennsylvania - Eastern | Bear Stearns & Co, , et al v. Philadelphia Stock Exch, et al |
| Anthony J Twardowski | D | Same Side | Pennsylvania - Middle | Harris Financial, M v. United States Fidel |
| Anthony R Twardowski | P | Same Side | Pennsylvania - Eastern | Bear Stearns & Co, , et al v. Philadelphia Stock Exch, et al |
| Anthony R Twardowski | D | Same Side | Pennsylvania - Eastern | Bean, et al v. Regal Communications, et al |
| Anthony R Twardowski | D | Same Side | Pennsylvania - Eastern | Willow Grove Bank v. Fidelity and Deposit |
| Anthony R Twardowski | D | Same Side | Pennsylvania - Eastern | Epstein v. Toll, et al |
| Anthony R Twardowski | D | Same Side | Pennsylvania - Eastern | Hering v. Cuna Mutual Ins, et al |
| Arlin M Adams | D | Same Side | Pennsylvania - Eastern | Ezold, Nancy O'Mara v. Wolf, Block, Schorr, et al |
| Bruce S Marks | P | Opposing | Pennsylvania - Eastern | Dalicandro v. Legalgard, Inc, et al |
| Bruce Schoenberg | P | Opposing | Maryland | Corporacion De v. USF&G |
| Charles Paul Scheuritzel | D | Same Side | Pennsylvania - Eastern | Dalicandro v. Legalgard, Inc, et al |
| Charles Paul Scheuritzel | O | Opposing | Pennsylvania - Eastern | Dalicandro v. Legalgard, Inc, et al |
| Charles Roe Mills | P | Opposing | Maryland | Corporacion De v. USF&G |
| Christopher K Walters | P | Opposing | Pennsylvania - Eastern | The School Dist v. Intercargo Ins Co |
| Daniel D MC Clain | D | Same Side | Pennsylvania - Eastern | Willow Grove Bank v. Fidelity and Deposit |
| Daniel M Jaffe | P | Opposing | Pennsylvania - Eastern | Ezold, Nancy O'Mara v. Wolf, Block, Schorr, et al |
| David I Bookspan | D | Same Side | Pennsylvania - Middle | Harris Financial, M v. United States Fidel |
| David I Bookspan | P | Same Side | Pennsylvania - Middle | United States Fidel v. Feibus, et al |
| Dawn R Chism | P | Opposing | Pennsylvania - Eastern | The School Dist v. Intercargo Ins Co |
| Debra L Raskin | P | Opposing | Pennsylvania - Eastern | Ezold, Nancy O'Mara v. Wolf, Block, Schorr, et al |
| Diana S Donaldson | D | Opposing | Pennsylvania - Eastern | Bear Stearns & Co, , et al v. Philadelphia Stock Exch, et al |
| Donald J Lough | D | Opposing | Pennsylvania - Eastern | Premier Systems, Inc v. St Paul Fire |
| Donald J Lough | O | Same Side | Pennsylvania - Eastern | Premier Systems, Inc v. St Paul Fire |
| Douglas R Widin | D | Same Side | Pennsylvania - Eastern | Dalicandro v. Legalgard, Inc, et al |
| Douglas R Widin | P | Same Side | Pennsylvania - Western | United States Fideli v. Dick Corporation/, et al |
| Eric Ian Schwartz | D | Opposing | Pennsylvania - Eastern | David Cutler Indust v. Amer Stores Co Inc |
| Eric L Keepers | P | Opposing | Pennsylvania - Eastern | Hering v. Cuna Mutual Ins, et al |
| Eric Landau | O | Opposing | Pennsylvania - Eastern | Dalicandro v. Legalgard, Inc, et al |
| Gary L Leshko | P | Same Side | Pennsylvania - Eastern | Bear Stearns & Co, , et al v. Philadelphia Stock Exch, et al |
| Gerald E Arth | D | Same Side | Pennsylvania - Eastern | Dalicandro v. Legalgard, Inc, et al |
| Glenn P Banks | O | Same Side | Pennsylvania - Eastern | Premier Systems, Inc v. St Paul Fire |
| Glenn P Banks | D | Opposing | Pennsylvania - Eastern | Premier Systems, Inc v. St Paul Fire |
| Howard S Veisz | O | Opposing | New York - Southern | Morse /Diesel, Inc> v. Fidelity & Deposit C |
| J William Ernstrom | P | Same Side | Pennsylvania - Middle | United States Fidel v. Feibus, et al |
| Jackie B Snarkman | D | Opposing | Pennsylvania - Eastern | The School Dist v. Intercargo Ins Co |

FIGURE 4T

| Action | Court | Docket | Heading | NL? | Filed | Case Law |
|---|---|---|---|---|---|---|
| | All | | | All | | |
| Track View | Pennsylvania - Western | 2:01cv1638 | United States Fideli v. Dick Corporation/, et al | Other Contract | 8/29/2001 | 2003 U.S. Dist. LEXIS 9444 |
| Track View | Pennsylvania - Middle | 3:01cv199 | Fidelity & Deposit v. R.l.mylet, Inc, et al | Other Contract | 1/30/2001 | n/a |
| Track View | Maryland | 1:99cv3024 | Corporacion De v. USF&G | Insurance | 10/5/1999 | n/a |
| Track View | Pennsylvania - Eastern | 2:99cv3778 | Dalicandro v. Legalgard, Inc, et al | Securities | 7/26/1999 | 2000 U.S. Dist. LEXIS 3089<br>2001 U.S. Dist. LEXIS 18530<br>2002 U.S. Dist. LEXIS 25443<br>2004 U.S. Dist. LEXIS 2253 |
| Track View | Connecticut | 3:98cv1217 | Cupples Products Inc v. US Fidelity | Other Contract | 6/26/1998 | n/a |
| Track View | Pennsylvania - Eastern | 2:98cv1296 | Willow Grove Bank v. Fidelity and Deposit | Insurance | 3/11/1998 | n/a |
| Track View | Pennsylvania - Middle | 1:97cv1053 | Harris Financial, M v. United States Fidel | Insurance | 7/11/1997 | n/a |
| Track View | Pennsylvania - Eastern | 2:97cv3647 | Hering v. Cuna Mutual Ins, et al | Insurance | 5/27/1997 | n/a |
| Track View | Pennsylvania - Eastern | 2:96cv8716 | David Cutler Indust v. Amer Stores Co Inc | Personal Property | 12/31/1996 | n/a |
| Track View | Pennsylvania - Eastern | 2:96cv3242 | The School Dist v. Intercargo Ins Co | Other Contract | 4/24/1996 | n/a |
| Track View | Pennsylvania - Eastern | 2:96cv2991 | Davis v. Reliance Insurance | Employment | 4/16/1996 | n/a |
| Track View | Pennsylvania - Eastern | 2:96cv1797 | Providian Life and, et al v. Cuna Mutual Insuranc, et al | Fraud | 3/7/1996 | 1996 U.S. Dist. LEXIS 4109 |
| Track View | New York - Eastern | 1:96cv247 | Fidelity and Guarant, et al v. J Double K, Inc, et al | Other Contract | 1/19/1996 | n/a |
| Track View | Pennsylvania - Middle | 3:95cv1925 | United States Fidel v. Feibus, et al | Other Contract | 11/17/1995 | 1995 U.S. Dist. LEXIS 22011 |
| Track View | Pennsylvania - Eastern | 2:94cv1346 | Epstein v. Toll, et al | Securities | 2/24/1994 | n/a |
| Track View | Pennsylvania - Eastern | 2:94cv1236 | Bean, et al v. Regal Communications, et al | Securities | 2/22/1994 | n/a |
| Track View | Pennsylvania - Eastern | 2:90cv4052 | Bear Stearns & Co, , et al v. Philadelphia Stock Exch, et al | Securities | 6/14/1990 | n/a |
| Track View | Pennsylvania - Eastern | 2:90cv1979 | Premier Systems, Inc v. St Paul Fire | Insurance | 3/21/1990 | n/a |

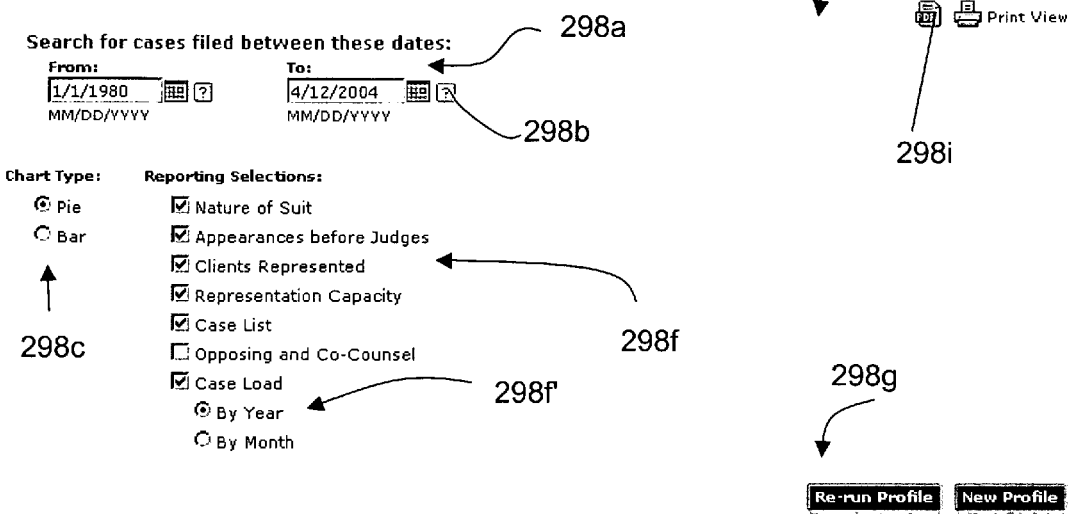

FIGURE 4X

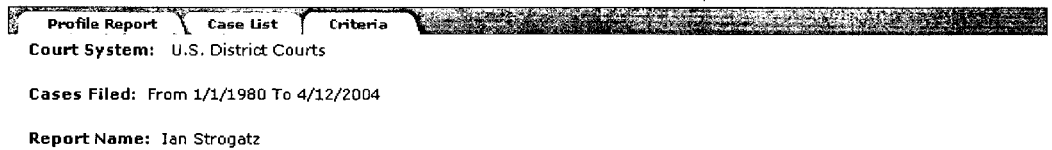

Court System: U.S. District Courts

Cases Filed: From 1/1/1980 To 4/12/2004

Report Name: Ian Strogatz

Attorney(s)/Law Firm(s) Included:

| Attorney | Law Firm | City/State |
|---|---|---|
| Ian A L Strogatz | n/a | Philadelphia, PA |
| Ian AL Strogatz | Wolf, Block, Schorr & Solis-Cohen | Philadelphia, PA |
| Ian A L Strogatz | Wolf, Block, Schorr and Solis-Cohen | Philadelphia, PA |
| Ian A L Strogatz | Wolf Block Schorr and Solis-Cohen LLP | Philadelphia, PA |
| Ian AL Strogatz | Wolf Block Schorr and Solis-Cohen LLP | Philadelphia, PA |
| Ian AL Strogatz | Wolf, Block, Schorr & Solis-Cohen | Philadelphia, PA |
| Ian AL Strogatz | Wolf, Block, Schorr & Solis-Cohen | Philadelphia, PA |
| Ian AL Strogatz, Esq | Wolf, Block, Schorr and Solis-Cohen | Philadelphia, PA |

| | 100 | 200 | 300 | 400 | 500 |
|---|---|---|---|---|---|

[Litigant] [Attorney/Law Firm] Judicial [Court] [Nature of Suit] — 310

Report period from [01/01/2004] to [04/12/2004] ◄—330    140 [HELP]

Judge's last name [_____] Enter all or part of last name —320a

Find a judge by court [Any ▼] Choose a judge from a list of court judges (optional) —320b Client matter Code —350a
[____]

Client/Project Notes —350b
[_____]

[Produce Profile] —370

360a    360b    360

You have previously run the following Judicial Strategic Profiles.
To rerun a profile click on Rerun. To delete a previous profile click on Delete.

| Action | Judge | Date Run | Rerun Free Until | From | To | Results | Billing Code | Notes |
|---|---|---|---|---|---|---|---|---|
| Rerun Delete | Mitchell H Cohen | 04/12/2004 4:17:55 pm | 04/13/2004 4:17:55 pm | 01/01/1980 | 04/08/2004 | 193 | | |
| Rerun Delete | H David Young | 10/01/2003 4:10:28 pm | $75.00 to rerun | 01/01/2002 | 10/01/2003 | 242 | | |
| Rerun Delete | James S Gwin | 09/17/2003 1:55:23 pm | $75.00 to rerun | 01/01/2002 | 09/11/2003 | 465 | | |

Delete All Previous Judicial Profiles
         ↘360c

FIGURE 5A

Nature of Suit Analysis

Nature of Suit Analysis - Between 01/01/2004 and 04/12/2004, Norma L Shapiro has presided over cases in Pennsylvania - Eastern and Pennsylvania - Western that are identified by Nature of Suit as follows. Click on a Nature of Suit description for an analysis specific to these cases.

| Nature of Suit | Count | Percent |
|---|---|---|
| Banking | 2 | 4.44 |
| Employment | 2 | 4.44 |
| ERISA | 1 | 2.22 |
| Foreclosure | 1 | 2.22 |
| Insurance | 3 | 6.67 |
| Labor/Management Relations | 1 | 2.22 |
| Miscellaneous Cases | 1 | 2.22 |
| Motor Vehicle | 2 | 4.44 |
| Other Civil Rights | 3 | 6.67 |
| Other Contract | 2 | 4.44 |
| Other Statutory Actions | 6 | 13.33 |
| Personal Injury | 5 | 11.11 |
| Prisoner - Civil Rights | 2 | 4.44 |
| Prisoner - General | 5 | 11.11 |
| Prisoner - Other | 2 | 4.44 |
| Product Liability | 2 | 4.44 |
| SSID Title XVI | 3 | 6.67 |
| Truth in Lending | 1 | 2.22 |
| Vacate Sentence | 1 | 2.22 |

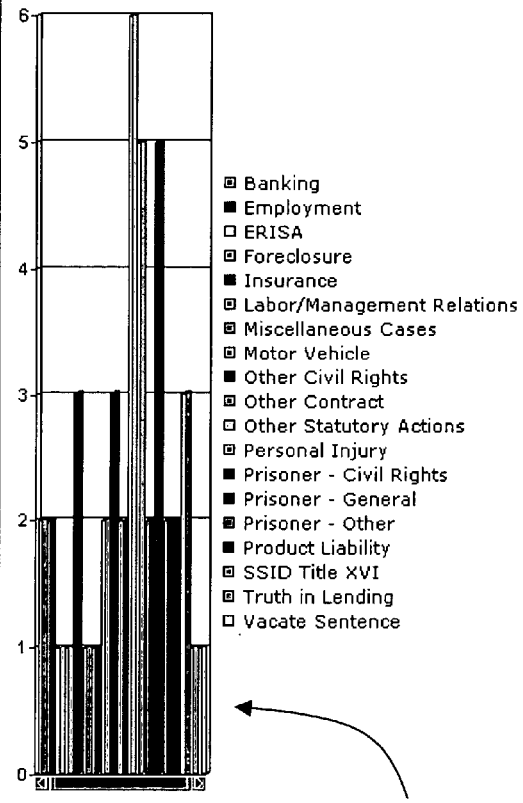

FIGURE 5D

Attorney Appearance Analysis

Attorney Appearence Analysis - Between 01/01/2004 and 04/12/2004, the following attorneys have appeared before Norma L Shapiro . Click on an attorney name for an analysis specific to the attorney. Click on a law firm name for more information from Martindale-Hubbell.

| Attorney Name | Law Firm | Count |
|---|---|---|
| Norris E Gelman | Unknown | 1 |
| David Addams | Unknown | 1 |
| Michael Patrick Boyle | Unknown | 1 |
| Henry S Perkin | Unknown | 1 |
| Edward A Fox | Unknown | 1 |
| Anthony Williams | Unknown | 1 |
| John Lock | Unknown | 1 |
| Gene Bowman | Unknown | 1 |
| Cain Jones | Unknown | 1 |
| Carl Dwayne Crawford | Unknown | 1 |
| Litsa Stafilidis | Unknown | 1 |
| Min Cheng Liang | Unknown | 1 |
| George P O'Connell | Barbin and O'Connell | 1 |
| Robert J Lukens | Community Legal Services, Inc | 1 |
| Joseph H Riches | Cozen and O'Connor | 1 |
| Bonnie S Stein | Curtin and Heefner LLP | 1 |
| Gerhard P Dietrich | Daller Greenberg & Dietrich, LLP | 1 |
| Donald P Russo | Donald P Russo, Esquire | 1 |
| James A Francis | Francis & Mailman, PC | 1 |
| Mark D Mailman | Francis & Mailman, PC | 1 |
| Gilda L Kramer | Gilda L Kramer, Esq | 1 |
| Michael T McKeever | Goldbeck McCafferty & McKeever | 1 |
| Ann C Lebowitz | Grant & Lebowitz, LLC | 1 |
| Charles J Grant | Grant & Lebowitz, LLC | 1 |
| Maryellen T Conroy | Hohn & Scheuerle | 1 |
| Ira H Weinstock | Ira H Weinstock, PC | 1 |
| Paul M Messing | Kairys, Rudovsky, Epstein & Messing, LLP | 1 |
| Barry P Ginsberg | Law Offices of Barry P Ginsberg | 1 |
| Jonathan Wheeler | Law Offices of Jonathan Wheeler PC | 1 |
| Lawrence P Engrissei | Law Offices of Lawrence P Engrissei | 1 |
| Richard J Hollawell | Law Offices of Marvin Lundy, LLP | 1 |
| William C Haynes | Law Offices of William C Haynes | 1 |
| Lawrence S Rubin | Lawrence S Rubin, Atty | 1 |
| Daniel C Levin | Levin, Fishbein, Sedran & Berman | 1 |
| Jason M Rapa | Lightner Law Offices, PC | 1 |
| Cary L Flitter | Lundy Flitter Beldecos & Berger PC | 1 |
| Charles Paul Scheuritzel | Marvin Larsson Henkin & Scheuritzel | 1 |
| Thomas A Lynam III | MC Eldrew & Fullam | 1 |
| Roberto K Paglione | McDonnell & Associates, PC | 1 |
| Robert M Dunn | McDonnell & Associates, PC | 1 |

Judge to include in profile

Variations of judge names we could identify containing the names you entered.

Profile name: Norma L Shapiro     [Cancel] [Create Profile]
If left blank, the name of the selected judge will be used on the report.

| Select | Case Count | Judge | Court |
|---|---|---|---|
| ○ | 46 | Norma L Shapiro | Pennsylvania - Eastern |

[Cancel] [Create Profile]

Profile Report | Case List | Criteria

LexisNexis® CourtLink®
Judicial Strategic Profile for — 390
Norma L Shapiro
1/1/2004 - 4/12/2004
46 Case(s)

The following represents an analysis of the cases presided over by Norma L Shapiro in U.S. District Courts Court.

GENERAL OVERVIEW

FIGURE 5L

Nature of Suit Analysis

Nature of Suit Analysis - Between 1/1/2004 and 4/12/2004, Norma L Shapiro has participated in cases that are identified by Nature of Suit as follows. Click on a Nature of Suit description for an analysis specific to these cases.

| Key | NOS | Count | Percent | Legend |
|-----|-----|-------|---------|--------|
| 430 | Banking | 2 | 4.35% | ■ |
| 442 | Employment | 2 | 4.35% | ■ |
| 791 | Erisa | 1 | 2.17% | ▨ |
| 220 | Foreclosure | 1 | 2.17% | ■ |
| 110 | Insurance | 3 | 6.52% | ■ |
| 720 | Labor/Management Relations | 1 | 2.17% | ■ |
| 350 | Motor Vehicle | 2 | 4.35% | ■ |
| 440 | Other Civil Rights | 4 | 8.70% | ■ |
| 190 | Other Contract | 2 | 4.35% | ■ |
| 890 | Other Statutory Actions | 6 | 13.04% | ■ |
| 360 | Personal Injury | 5 | 10.87% | ▨ |
| 555 | Prisoner - Civil Rights | 2 | 4.35% | ■ |
| 530 | Prisoner - General | 5 | 10.87% | ■ |
| 550 | Prisoner - Other | 2 | 4.35% | ■ |
| 365 | Product Liability | 2 | 4.35% | □ |
| 864 | SSID Title XVI | 3 | 6.52% | ■ |
| 371 | Truth in Lending | 1 | 2.17% | ■ |
| 510 | Vacate Sentence | 1 | 2.17% | ■ |
| 111 | n/a | 1 | 2.17% | ■ |

391a

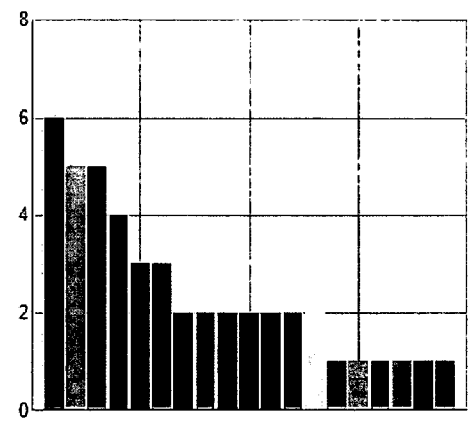

Attorney/Law Firm Appearance Analysis

Attorney/Law Firm Appearance Analysis - Between 1/1/2004 and 4/12/2004, the following attorneys have appeared before Norma L Shapiro. Click on an attorney name for an analysis specific to the attorney. Click on a law firm name for more information from Martindale-Hubbell.

Printer Friendly List
Customize List

Page 1 [ 2 ]  Items 1 to 100 of 106

| Attorney Name | Law Firm | Count |
|---|---|---|
| All | All | |
| Adam I Sager | Sager & Sager Associates | 1 |
| Adam M Soll | Soll & Soll, LLC | 1 |
| Analisa Sondergaard | Rawle & Henderson LLP | 1 |
| Andrew J Bellwoar | Siana Bellwoar & McAndrew LLP | 1 |
| Andrew M Schwartz | Marshall Dennehey Warner Coleman & Goggin | 1 |
| Angela Coll Caliendo | Segal McCambridge Singer & Mahoney, Ltd | 1 |
| Ann C Lebowitz | Grant & Lebowitz, LLC | 1 |
| Anthony Williams | n/a | 1 |
| Barry P Ginsberg | Law Offices of Barry P Ginsberg | 1 |
| Bonnie S Stein | Curtin and Heefner LLP | 1 |
| Brian P Crowner | Duane Morris LLP | 1 |
| Brian P Downey | Pepper Hamilton, LLP | 1 |
| Brian R Mildenberg | Mildenberg & Stalbaum PC | 2 |
| Bruce J Kasten | Duane Morris LLP | 1 |
| Cain Jones | n/a | 1 |
| Carl Dwayne Crawford | n/a | 1 |
| Cary L Flitter | Lundy Flitter Beldecos & Berger PC | 1 |
| Catherine E Hamilton | Cozen O'Connor | 1 |
| Charles J Grant | Grant & Lebowitz, LLC | 1 |
| Charles Paul Scheuritzel | Marvin Larsson Henkin & Scheuritzel | 1 |
| Cheryl B Wolf | Rovner, Allen, Rovner and Zimmerman | 1 |
| Christopher P Gerber | Siana Bellwoar & McAndrew LLP | 1 |
| Courtney Seda McDonnell | McDonnell & Associates | 1 |
| Daniel C Levin | Levin, Fishbein, Sedran & Berman | 1 |
| David M McGlaughlin | Newman & McGlaughlin, PC | 1 |
| Denis James Lawler | Blank Rome LLP | 1 |
| Denise H Houghton | Cozen O'Connor | 1 |
| Dennis D Brogan | Wusinich, Brogan & Stanzione | 1 |
| Donald P Russo | Donald P Russo, Esquire | 1 |
| Edward A Fox | n/a | 1 |
| Edward J Kelbon | Saul Ewing LLP | 1 |
| Elizabeth Luening Long | Silverman Bernheim & Vogel | 1 |
| Eric R Brown | Marshall Dennehey Warner Coleman & Goggin | 1 |
| Francis R Filipi | Office of Attorney General | 1 |
| Frank A Chernak | Ballard Spahr Andrews & Ingersoll LLP | 1 |
| Gene Bowman | n/a | 1 |
| George P O'Connell | Barbin and O'Connell | 1 |
| Gerhard P Dietrich | Daller Greenberg & Dietrich, LLP | 1 |
| Gilda L Kramer | Gilda L Kramer, Esq | 1 |
| Henry S Perkin | n/a | 1 |
| Ira H Weinstock | Ira H Weinstock, PC | 1 |
| James A Francis | Francis & Mailman, PC | 1 |
| James A Rocco, III | Law Offices of James A Rocco, III | 1 |

FIGURE 5O

Profile Report | Case List | Criteria

Cases Referenced - Cases referenced by this report include the following.

Click on View to view a specific case. Click on Track to track ongoing activity for a case.

If the symbol ! appears in the first column, this is an indicator that no defense attorneys are present on our copy of the docket. To discover if any defense attorneys have been assigned on the most recent version of the docket, click on View. When looking at the case, click on the Update button and we will obtain the most recent copy of the case from the court. You will be alerted by email when the case has been obtained and you can then rerun this report which will include the updated information.

Click on this symbol 📧 to be alerted by email when new cases are found for Norma L Shapiro.

Printer Friendly List
Customize List

Items 1 to 46 of 46

| Action | Court | Docket | Heading | NOS | Filed | Case Law |
|--------|-------|--------|---------|-----|-------|----------|
| | Pennsylvania - Eastern | | | All | | |
| Track View | Pennsylvania - Eastern | 2:04cv1538 | Liang v. Bureau of Immigration and Customs Enforcement | Prisoner - General | 4/8/2004 | n/a |
| Track View | Pennsylvania - Eastern | 2:04cv1549 | Markel International Insurance Company, Ltd v. Banks Management Company Et A | Insurance | 4/8/2004 | n/a |
| Track View | Pennsylvania - Eastern | 2:04cv1523 | Maddox v. Southeastern Pennsylvania Transportation Authority Et A | Personal Injury | 4/7/2004 | n/a |
| Track View | Pennsylvania - Eastern | 2:04cv1527 | Parfrey v. Walgreen Co et al | Personal Injury | 4/7/2004 | n/a |
| Track View | Pennsylvania - Eastern | 2:04cv1530 | Koss v. Delaware River Port Authority et al | Other Civil Rights | 4/7/2004 | n/a |
| Track View | Pennsylvania - Eastern | 2:04cv1501 | Barlow et al v. Hecker | Other Statutory Actions | 4/5/2004 | n/a |
| ! Track View | Pennsylvania - Eastern | 2:04cv1449 | International Brotherhood of Teamsters, Chauffeurs, Warehousemen and Helpers of America, Local Union | Labor/Management Relations | 4/2/2004 | n/a |
| Track View | Pennsylvania - Eastern | 2:04cv1470 | Directv, Inc v. Coleman | Other Statutory Actions | 4/2/2004 | n/a |
| Track View | Pennsylvania - Eastern | 2:04cv1489 | Levert et al v. Philadelphia International Records, et al | Other Contract | 4/2/2004 | 2004 U.S. Dist. LEXIS 11825 |
| Track View | Pennsylvania - Eastern | 2:04cv1373 | Keenhold v. Walnutport Police Department et al | Employment | 3/30/2004 | n/a |
| Track View | Pennsylvania - Eastern | 2:04cv1357 | Griffin v. Barnhart | SSID Title XVI | 3/29/2004 | n/a |
| Track View | Pennsylvania - Eastern | 2:04cv1359 | Fults et al v. Interdynamics, Inc et al | Product Liability | 3/29/2004 | n/a |
| Track View | Pennsylvania - Eastern | 2:04cv1300 | Gilley et al v. Schneider National Bulk Carriers, Inc | Motor Vehicle | 3/25/2004 | n/a |
| ! Track View | Pennsylvania - Eastern | 2:04mc62 | Crawford v. Kunz et al | n/a | 3/25/2004 | n/a |
| Track View | Pennsylvania - Eastern | 2:04cv1249 | Hydrocon Services, Inc v. Clarendon America Insurance Company, Inc | Insurance | 3/23/2004 | n/a |
| Track View | Pennsylvania - Eastern | 2:04cv1219 | Jones v. Hartzell et al | Prisoner - Civil Rights | 3/22/2004 | n/a |
| Track View | Pennsylvania - Eastern | 2:04cv1174 | Boykins v. Tennis et al | Prisoner - General | 3/18/2004 | 2004 U.S. Dist. LEXIS 11550 2004 U.S. Dist. LEXIS 14070 |

FIGURE 5P

Search for cases filed between these dates: — 395a
From:            To:
1/1/2004   ▦ ?   4/12/2004   ▦ ⓧ
MM/DD/YYYY       MM/DD/YYYY
                              ⟋395b Chart Type:   Reporting Selections:
○ Pie         ☑ Nature of Suit
◉ Bar         ☑ Attorney Appearances
              ☑ Case List
              ☑ Case Load ⟶ 395f
                 ○ By Year
                 ◉ By Month
395c
              395f 395 — 395i
Print View Re-run Profile   New Profile
395g

| Profile Report | Case List | Criteria |

Court System: U.S. District Courts

Cases Filed: From 1/1/2004 To 4/12/2004

Judge: Norma L Shapiro

Court(s): Pennsylvania - Eastern

FIGURE 5R

Total Cases Filed By Nature of Suit

Total Cases Filed - Between 01/01/2004 and 04/12/2004, 903 total cases were filed in Arizona with the following distribution by Nature of Suit for the period.

492a →

| Nature of Suit | Count | Percent |
|---|---|---|
| Contract - Insurance cases | 33 | 3.65 |
| Contract - Miller Act cases | 2 | 0.22 |
| Contract - Judgments cases | 1 | 0.11 |
| Contract - Student Loans cases | 1 | 0.11 |
| Contract - Other Contract cases | 44 | 4.87 |
| Contract - Product Liability cases | 1 | 0.11 |
| Real Property - Foreclosure cases | 1 | 0.11 |
| Real Property - Real Property cases | 1 | 0.11 |
| Personal Injury - Assault Libel & Slander cases | 3 | 0.33 |
| Personal Injury - FELA cases | 1 | 0.11 |
| Personal Injury - Motor Vehicle cases | 8 | 0.89 |
| Personal Injury - Motor Vehicle Prod Liability cases | 5 | 0.55 |
| Personal Injury - Personal Injury cases | 14 | 1.55 |
| Personal Injury - Medical Malpractice cases | 5 | 0.55 |
| Personal Injury - Product Liability cases | 13 | 1.44 |
| Personal Property - Fraud cases | 5 | 0.55 |
| Personal Property - Truth in Lending cases | 1 | 0.11 |
| Personal Property - Personal Property cases | 1 | 0.11 |
| Personal Property - Product Liability cases | 2 | 0.22 |
| Other Statutes - Antitrust cases | 3 | 0.33 |
| Bankruptcy - Appeal 28 USC 158 cases | 12 | 1.33 |
| Civil Rights - Other Civil Rights cases | 62 | 6.87 |
| Civil Rights - Employment cases | 94 | 10.41 |
| Civil Rights - Housing/Accommodations cases | 3 | 0.33 |
| Civil Rights - Welfare cases | 1 | 0.11 |
| Other Statutes - Commerce cases | 1 | 0.11 |
| Other Statutes - RICO cases | 3 | 0.33 |
| Prisoner Petitions - Vacate Sentence cases | 45 | 4.98 |
| Prisoner Petitions - Prisoner - General cases | 114 | 12.62 |
| Prisoner Petitions - Death Penalty cases | 2 | 0.22 |
| Prisoner Petitions - Prisoner - Mandamus cases | 4 | 0.44 |
| Prisoner Petitions - Prisoner - Other cases | 34 | 3.77 |
| Prisoner Petitions - Prisoner - Civil Rights cases | 91 | 10.08 |
| Forfeiture/Penalty - Seizure of Property cases | 9 | 1.00 |
| Forfeiture/Penalty - Forfeiture/Penalty cases | 7 | 0.78 |
| Labor - Fair Labor Standards Act cases | 5 | 0.55 |
| Labor - Labor/Management Relations cases | 3 | 0.33 |
| Labor - Reporting & Disclosure Act cases | 2 | 0.22 |
| Labor - Labor Litigation cases | 2 | 0.22 |
| Labor - ERISA cases | 16 | 1.77 |
| Property Rights - Copyrights cases | 14 | 1.55 |
| Property Rights - Patent cases | 11 | 1.22 |
| Property Rights - Trademark cases | 44 | 4.87 |
| Other Statutes - Securities cases | 10 | 1.11 |
| Social Security - HIA (1395f) cases | 1 | 0.11 |
| Social Security - DIWC/DIWW (405(g)) cases | 15 | 1.66 |
| Social Security - SSID Title XVI cases | 6 | 0.66 |
| Social Security - RSI (405(g)) cases | 2 | 0.22 |
| Federal Tax Suits - Taxes cases | 8 | 0.89 |
| Other Statutes - Other Statutory Actions cases | 120 | 13.29 |
| Other Statutes - Agricultural Acts cases | 2 | 0.22 |
| Other Statutes - Environmental cases | 3 | 0.33 |
| Other Statutes - FOIA cases | 1 | 0.11 |
| Other Statutes - Constitutionality cases | 4 | 0.44 |
| Other Statutes - Miscellaneous Cases cases | 7 | 0.78 |

[tabs: History | Litigant | Attorney/Law Firm | Judicial | Court | Nature of Suit]   —410

Select Court

⦿ US District   — 420e
○ State Court

Court: [Select a court location ▼]   — 420a

Nature of Suit

Nature of Suit: [All ▼]   — 420b
Nature of Suit: [None Selected ▼]   — 420c
Nature of Suit: [None Selected ▼]
                             420d

Search for cases filed between these dates:   — 430

From: [1/1/2005]   To: [5/27/2005]
MM/DD/YYYY        MM/DD/YYYY

Client Matter Code: [info]  Previous Codes: [info]   450a
[_____] [-- Select One -- ▼] Manage Previous Codes
These codes will appear on your invoice next to charges associated with this search.

Client/Project Notes:
[_____]   — 450b

470
Chart Type:    Reporting Period:              [Create Profile]
 ⦿ Bar          ⦿ By Year     — 493f
 ○ Line         ○ By Month ↑
        — 493c

Please verify that your report will include the following.

```
Date Range: From 1/1/2004 to 4/12/2004
Court Selected: Arizona
Nature of Suit 1: All cases
Nature of Suit 2: Not Selected
Nature of Suit 3: Not Selected
```

[Cancel]  [Create Profile]

FIGURE 6G

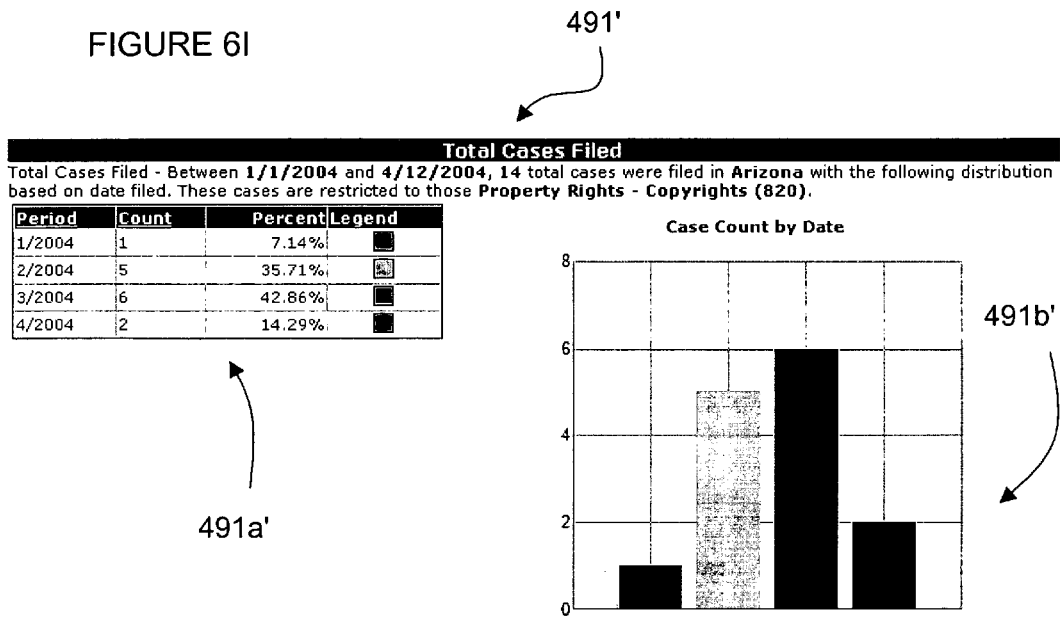

FIGURE 7G

Total Cases Filed By Court — 592

Total Cases Filed - Between 01/01/2004 and 04/12/2004, 536 total Personal Property - Fraud cases cases were filed in the following Courts for the period

| Court | Count | Percent |
|---|---|---|
| Alabama - Middle | 4 | 0.75 |
| Alabama - Northern | 4 | 0.75 |
| Alabama - Southern | 1 | 0.19 |
| Arizona | 5 | 0.93 |
| Arkansas - Eastern | 4 | 0.75 |
| Arkansas - Western | 3 | 0.56 |
| California - Central | 15 | 2.80 |
| California - Northern | 6 | 1.12 |
| California - Southern | 6 | 1.12 |
| Colorado | 8 | 1.49 |
| Connecticut | 6 | 1.12 |
| District of Columbia | 5 | 0.93 |
| Florida - Middle | 12 | 2.24 |
| Florida - Southern | 18 | 3.36 |
| Georgia - Middle | 1 | 0.19 |
| Georgia - Northern | 110 | 20.52 |
| Georgia - Southern | 10 | 1.87 |
| Hawaii | 2 | 0.37 |
| Idaho | 1 | 0.19 |
| Illinois - Central | 1 | 0.19 |
| Illinois - Northern | 24 | 4.48 |
| Indiana - Southern | 4 | 0.75 |
| Iowa - Southern | 1 | 0.19 |
| Kansas | 7 | 1.31 |
| Kentucky - Eastern | 1 | 0.19 |
| Kentucky - Western | 1 | 0.19 |
| Louisiana - Western | 2 | 0.37 |
| Maryland | 11 | 2.05 |
| Massachusetts | 4 | 0.75 |
| Michigan - Eastern | 7 | 1.31 |
| Michigan - Western | 1 | 0.19 |
| Minnesota | 67 | 12.50 |
| Mississippi - Northern | 9 | 1.68 |
| Mississippi - Southern | 9 | 1.68 |
| Missouri - Eastern | 3 | 0.56 |
| Missouri - Western | 7 | 1.31 |
| Montana | 1 | 0.19 |
| Nevada | 4 | 0.75 |
| New Hampshire | 1 | 0.19 |
| New Jersey | 14 | 2.61 |
| New Mexico | 2 | 0.37 |
| New York - Eastern | 3 | 0.56 |
| New York - Northern | 4 | 0.75 |
| New York - Southern | 22 | 4.10 |
| New York - Western | 2 | 0.37 |
| North Carolina - Middle | 1 | 0.19 |
| North Carolina - Western | 8 | 1.49 |
| Ohio - Northern | 6 | 1.12 |
| Ohio - Southern | 5 | 0.93 |
| Oklahoma - Northern | 2 | 0.37 |
| Oklahoma - Western | 2 | 0.37 |
| Oregon | 2 | 0.37 |
| Pennsylvania - Eastern | 7 | 1.31 |
| Pennsylvania - Middle | 1 | 0.19 |
| Pennsylvania - Western | 4 | 0.75 |
| Puerto Rico | 3 | 0.56 |
| Rhode Island | 1 | 0.19 |
| South Carolina | 3 | 0.56 |
| South Dakota | 1 | 0.19 |
| Tennessee - Eastern | 3 | 0.56 |
| Texas - Northern | 19 | 3.54 |
| Texas - Southern | 11 | 2.05 |
| Texas - Western | 2 | 0.37 |
| Utah | 1 | 0.19 |
| Vermont | 1 | 0.19 |
| Virginia - Eastern | 6 | 1.12 |
| Virginia - Western | 1 | 0.19 |
| Washington - Eastern | 2 | 0.37 |
| Washington - Western | 5 | 0.93 |
| West Virginia - Northern | 1 | 0.19 |
| West Virginia - Southern | 2 | 0.37 |
| Wisconsin - Eastern | 2 | 0.37 |
| Wyoming | 1 | 0.19 |

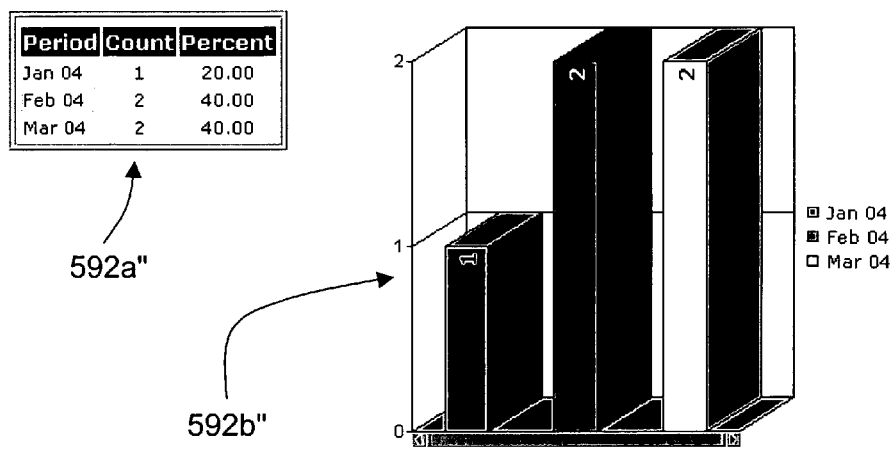

Total Cases Filed

Total Cases Filed - Between 01/01/2004 and 04/12/2004, 5 Personal Property - Fraud cases cases were filed with the following distribution based on date filed These cases are restricted to those filed in District of Columbia.

| Period | Count | Percent |
|--------|-------|---------|
| Jan 04 | 1 | 20.00 |
| Feb 04 | 2 | 40.00 |
| Mar 04 | 2 | 40.00 |

592a"

592b"

100  200  300  400  500  593

Litigant   Attorney/Law Firm   Judicial   Court   Nature of Suit

You can select new report options below or rerun the profile with a different date for no additional charge up to 24 hours after you have run your initial profile. If charts do not appear, select the Table over Chart option and click Rerun Profile.  [HELP]

Report period from [01/01/2004] to [04/12/2004]

| Chart Type | Table Type | Report Layout | Reporting Period |
|------------|------------|---------------|------------------|
| ⊙ Bar | ⊙ Standard | ⊙ Table next to Chart | ○ By Year |
| ○ Line | ○ Active | ○ Table over Chart | ⊙ By Month |
| | | ○ No Charts | |

593c   593d   593e   593f

[Rerun Profile]  [New Profile]  [Print View]

History / Litigant / Attorney/Law Firm / Judicial / Court / Nature of Suit

[Help]

Select Court(s)

| Federal Court: | All | — 520b |
| Federal Court: | None Selected | — 520c |
| Federal Court: | None Selected | |
| Federal Court: | None Selected | — 520d |
|  |  | — 520e |

- OR -

State Court: | None Selected |

Nature of Suit  ———— 520a

Nature of Suit: | None Selected |

Search for cases filed between these dates: ← 530

From:              To:
| 1/1/2005 |       | 5/27/2005 |
MM/DD/YYYY         MM/DD/YYYY ———— 550a
Client Matter Code: [info]  Previous Codes: [info]
|          |    | --- Select One --- | Manage Previous Codes
*These codes will appear on your invoice next to charges associated with this search.* ———— 550b Client/Project Notes:                                                    570
|                                                      |

Chart Type:    Reporting Period:                                   [Create Profile]
  ⊙ Bar         ⊙ By Year
  ○ Line        ○ By Month
     ↖             ↖
      593c          593f

Please verify that your report will include the following.

| Date Range: From 1/1/2004 to 4/12/2004
| Nature of Suit: Personal Property - Fraud (370) cases
| Court 1: District of Columbia
| Court 2: Not Selected
| Court 3: Not Selected
| Court 4: Not Selected

[Cancel]  [Create Profile]

LexisNexis® CourtLink®
Nature of Suit Strategic Profile
Personal Property - Fraud (370)
1/1/2004 - 4/12/2004
536 Case(s)
All Courts The following represents an analysis of Personal Property - Fraud (370) cases filed in the following courts for All Courts.

GENERAL OVERVIEW

LexisNexis® CourtLink®
Nature of Suit Strategic Profile
Personal Property - Fraud (370)
1/1/2004 - 4/12/2004
5 Case(s)
District of Columbia The following represents an analysis of Personal Property - Fraud (370) cases filed in the following courts for District of Columbia.

GENERAL OVERVIEW

LexisNexis® CourtLink®
Nature of Suit Strategic Profile
Personal Property - Fraud (370)
1/1/2004 - 4/12/2004
18 Case(s)
Mississippi Northern
Mississippi Southern The following represents an analysis of Personal Property - Fraud (370) cases filed in the following courts for Mississippi Northern and Mississippi Southern.

GENERAL OVERVIEW

FIGURE 7R

Total Cases Filed By Court

Total Cases Filed - Between 1/1/2004 and 4/12/2004, 536 total Personal Property - Fraud (370) cases were filed in the following Courts for the period

| Court | Count | Percent | Legend |
|---|---|---|---|
| Alabama - Middle | 4 | 0.75% | ■ |
| Alabama - Northern | 4 | 0.75% | ■ |
| Alabama - Southern | 1 | 0.19% | ■ |
| Arizona | 5 | 0.93% | ■ |
| Arkansas - Eastern | 4 | 0.75% | ■ |
| Arkansas - Western | 3 | 0.56% | ■ |
| California - Central | 15 | 2.80% | ■ |
| California - Northern | 6 | 1.12% | ■ |
| California - Southern | 6 | 1.12% | ■ |
| Colorado | 8 | 1.49% | ▨ |
| Connecticut | 6 | 1.12% | ■ |
| Dist. Of Columbia | 5 | 0.93% | ■ |
| Florida - Middle | 12 | 2.24% | ■ |
| Florida - Southern | 18 | 3.36% | ■ |
| Georgia - Middle | 1 | 0.19% | ■ |
| Georgia - Northern | 109 | 20.34% | ■ |
| Georgia - Southern | 10 | 1.87% | ■ |
| Hawaii | 2 | 0.37% | ■ |
| Idaho | 1 | 0.19% | ■ |
| Illinois - Central | 1 | 0.19% | ■ |
| Illinois - Northern | 24 | 4.48% | ■ |
| Indiana - Southern | 4 | 0.75% | ■ |
| Iowa - Southern | 1 | 0.19% | ■ |
| Kansas | 7 | 1.31% | ■ |
| Kentucky - Eastern | 1 | 0.19% | ■ |
| Kentucky - Western | 1 | 0.19% | ■ |
| Louisiana - Western | 2 | 0.37% | ■ |
| Maryland | 11 | 2.05% | ■ |
| Massachusetts | 4 | 0.75% | ■ |
| Michigan - Eastern | 7 | 1.31% | ■ |
| Michigan - Western | 1 | 0.19% | ■ |
| Minnesota | 66 | 12.31% | ▨ |
| Mississippi - Northern | 9 | 1.68% | □ |
| Mississippi - Southern | 9 | 1.68% | ■ |
| Missouri - Eastern | 3 | 0.56% | ■ |
| Missouri - Western | 7 | 1.31% | ■ |
| Montana | 1 | 0.19% | ■ |
| Nevada | 4 | 0.75% | ■ |
| New Hampshire | 1 | 0.19% | ■ |
| New Jersey | 16 | 2.99% | ■ |

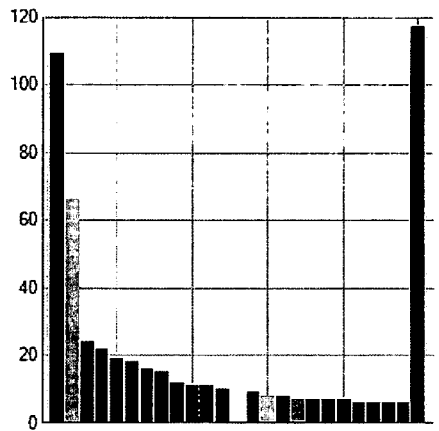

Case Count by Court

The top 24 Court (by case count) are represented by individual bars in the chart. The remaining Court are aggregated in the right-most bar, shown in dark purple color.

COMPUTERIZED SYSTEM AND METHOD FOR CREATING AGGREGATE PROFILE REPORTS REGARDING LITIGANTS, ATTORNEYS, LAW FIRMS, JUDGES, AND CASES BY TYPE AND BY COURT FROM COURT DOCKET RECORDS

CROSS-REFERENCE TO RELATED APPLICATIONS

The present patent application is based on, and claims priority from, U.S. provisional Application No. 60/581,760, filed Jun. 23, 2004, which is incorporated herein by reference in its entirety.

COPYRIGHTED MATERIAL

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to techniques for creating a court record information report, and more particularly to a computerized method for obtaining, aggregating, and presenting court record information to users interested in producing such a report based on specific user criteria, for example, Litigant, Attorney, Law Firm, Judge, Case Type, or Court.

2. Related Art

Many people have a desire or need to investigate court records. The reasons for these investigations may be (1) to follow an ongoing case, (2) to investigate a party's litigation history, (3) to research an attorney's prior representations, or perhaps (4) to research a judge's prior rulings. A number of commercial services, as well as the courts themselves, offer the ability to view a court record for a case after a simple case search. However, an individual case or a case list that is the result of a simple search does little to provide a comprehensive picture of the prior activities of a specific litigant, attorney, or judge; nor can it inform one of new case filing trends by case type or court.

It is to the solution of these and other problems that the present invention is directed.

SUMMARY OF THE INVENTION

It is accordingly a primary object of the present invention to provide a computerized method for obtaining and presenting aggregated case information for selected time periods.

It is another object of the present invention to provide a computerized method for presenting aggregated case information in tabular and graphic format relevant to the type of aggregated case information being produced.

As used herein, "Strategic Profile report" or "Strategic Profile" means court record information obtained, aggregated, and presented by Litigant, Attorney, Law Firm, Judge, Case Type, or Court in accordance with the present invention.

The above and other objects of the invention are achieved by computerized methods for aggregating relevant information from court records and presenting such information in electronic reports including tables and charts with the ability to drill down further in meaningful ways. The process requires a user to input search criteria. Search criteria representing either a Litigant, Attorney, Law Firm, or Judge name are first filtered against a corresponding table of names. Matches are displayed to the user and selections are made. The final report is run against these user selections qualified by the date range entered.

Each report contains aggregated data (including counts and percentages) of significant data including the case type (or nature of suit), where the cases were filed (by state and by court), litigants, attorneys (including opposing and co-counsel), and judges. With the exception of the profiles by court and nature of suit, all profiles display a list of the cases that were included (matched to the criteria). Individual cases may be displayed online or setup for future case tracking. A number of tables presented in the reports allow for drilling down to more specific data. For example, a Litigant Strategic Profile allows one to select a specific Nature of Suit presented and view a report comprised only of those cases equivalent to the Nature of Suit selected. The Strategic Profile reports offer a variety of reporting options including (1) the ability to alter the graphic presentation between a pie chart and a bar chart (or where appropriate, a line chart), (2) the ability to sort and filter at least some, and preferably all, table columns (or in an alternate implementation, to view tables as static HTML or as a java applet allowing for sorting and filtering), (3) the ability to position charts to the right of or below associated tables, (4) the ability to include or not include selected tables and graphs, and (5) the ability to change the selected date range without having to re-specify other report criteria. The segments of a pie chart or the bars of a bar chart preferably are displayed in unique colors. A color key can be provided as a separate column of the corresponding table. "Mousing over" a segment of a pie chart or a bar of a bar chart displays the data represented by the segment or the bar.

A special print view of the reports allows for a display that eliminates all hyperlinks and header graphics. Reports also can be generated to data files (for example, PDF files), to allow the reports to be saved and to be sent to others.

A Litigant Strategic Profile allows a user to specify a litigant name and time period and quickly receive an online report that summarizes such items as (1) number of cases, (2) number of cases by type of case, (3) number of cases by state and court where the cases were filed, (4) attorneys and law firms who have represented the litigant. Any one of these aggregated lists can be drilled down to discover the unique set of cases comprising the aggregate. These cases can then be looked at individually and also (if the case is still ongoing) be marked for future investigation.

An Attorney or Law Firm (multiple attorney) Strategic Profile allows a user to specify one or more attorneys, a time period, and quickly receive an online report that summarizes such items as (1) the clients the attorney has represented, (2) the types of cases on which the attorney has worked, (3) the judges before whom the attorney has appeared, (4) the states and courts where the cases have occurred, and (5) other attorneys with or against whom the selected attorney(s) has worked. Any one of these aggregated lists can be drilled down to discover the unique set of cases comprising the aggregate. These cases can then be looked at individually and also (if the case is still ongoing) be marked for future investigation.

A Judicial Strategic Profile allows a user to specify a judge and a time period and quickly receive an online report that summarizes such items as (1) the types of cases presided over, (2) attorney appearances, and (3) a case load analysis over time. The unique set of cases that comprise each aggregate can readily be discovered and case details can be easily obtained.

A Nature of Suit (Case Type) Strategic Profile allows a user to specify a time period, a specific case type and one or more courts and to obtain a report that displays the number of cases filed over time.

A Court Strategic Profile allows a user to specify a time period, a specific court and one or more case types and to obtain a report that displays the number of cases filed over time.

Strategic Profiles present information in a way that has not been previously available or could only be obtained by spending many hours or even days researching individual cases. All of these reports are used by users for business development and litigation support and preparation purposes. Litigant Strategic Profiles allow a law firm to quickly gain insight into a company's litigation history and discover which law firms have represented the company in the past. Attorney and Judicial Strategic profiles present a litigation history for the attorney and judge that is an invaluable tool for trial preparation.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 3A is an illustration of an exemplary Litigant Strategic Profile initial parameter input screen.

FIG. 3C is an illustration of an exemplary Litigant Strategic Profile screen presenting possible litigant matches to the user for approval.

FIG. 3D is an illustration of an exemplary heading of a Litigant Strategic Profile report, showing the name of the litigant, the dates the report covers, and the count of cases discovered.

FIG. 3E is an illustration of an exemplary "Nature of Suit" section of a Litigant Strategic Profile report.

FIG. 3F is an illustration of an exemplary "Jurisdictional Analysis" section of a Litigant Strategic Profile report.

FIG. 3G is an illustration of an exemplary "Federal District Court Analysis" section of a Litigant Strategic Profile report.

FIG. 3H is an illustration of an exemplary "Law Firm Analysis" section of a Litigant Strategic Profile report.

FIG. 3J is an illustration of an exemplary "Case Listing" section of a Litigant Strategic Profile report, displaying a tabular listing of the cases included in the report (or report drill down).

FIG. 3K is an illustration of an exemplary Litigant Strategic Profile Input Form section of a Litigant Strategic Profile report.

FIG. 3L is an illustration of an exemplary Litigant Strategic Profile "Parameters" or Report Criteria section of the Litigant Strategic Profile report.

FIG. 3M is an illustration of an alternate embodiment of the input screen of FIG. 3A.

FIG. 3N is an illustration of an alternate embodiment of the instruction screen of FIG. 3B.

FIG. 3O is an illustration of an alternate embodiment of the litigant match screen of FIG. 3C.

FIG. 3T is an illustration of an alternate embodiment of the report section of FIG. 3H.

FIG. 3V is an illustration of an alternate embodiment of the report section of FIG. 3J.

FIG. 3W is an illustration of an alternate embodiment of the report section of FIG. 3K.

FIG. 3X is an illustration of an alternate embodiment of the report section of FIG. 3L.

FIG. 4A is an illustration of an exemplary Attorney/Law Firm Strategic Profile initial parameter input screen.

FIG. 4C is an illustration of an exemplary heading of an Attorney/Law Firm Strategic Profile report, showing the name of the Attorney or Law Firm, the dates the report covers and the count of cases discovered.

FIG. 4D is an illustration of an exemplary "Nature of Suit" section of an Attorney/Law Firm Strategic Profile report.

FIG. 4F is an illustration of an exemplary "Judge Appearance Analysis" section of an Attorney/Law Firm Strategic Profile report.

FIG. 4G is an illustration of an exemplary "Client Analysis" section of an Attorney/Law Firm Strategic Profile report.

FIG. 4H is an illustration of an exemplary "Opposing/Co-Counsel" section of an Attorney/Law Firm Strategic Profile report.

FIG. 4J is an illustration of an exemplary "Case Listing" section of an Attorney/Law Firm Strategic Profile report, displaying a tabular listing of the cases included in the report (or report drill down).

FIG. 4M is an illustration of an alternate embodiment of the input screen of FIG. 4A.

FIG. 4N is an illustration of an alternate embodiment of the screen of FIG. 4B.

FIG. 4R is an illustration of an alternate embodiment of the report section of FIG. 4F.

FIG. 4S is an illustration of an alternate embodiment of the report section of FIG. 4G.

FIG. 4T is an illustration of an alternate embodiment of the report section of FIG. 4H.

FIG. 4V is an illustration of an alternate embodiment of the report section of FIG. 4J.

FIG. 4W is an illustration of an alternate embodiment of the report section of FIG. 4K.

FIG. 4X is an illustration of an alternate embodiment of the report section of FIG. 4L.

FIG. 5A is an illustration of an exemplary Judicial Strategic Profile initial input screen.

FIG. 5D is an illustration of an exemplary "Nature of Suit" section of a Judicial Strategic Profile report.

FIG. 5F is an illustration of an exemplary "Attorney Appearance Analysis" section of a Judicial Strategic Profile report.

FIG. 5J is an illustration of an alternate embodiment of the input screen of FIG. 5A.

FIG. 5K is an illustration of an alternate embodiment of the screen of FIG. 5B.

FIG. 5L is an illustration of an alternate embodiment of the report section of FIG. 5C.

FIG. 5M is an illustration of an alternate embodiment of the report section of FIG. 5D.

FIG. 5O is an illustration of an alternate embodiment of the report section of FIG. 5F.

FIG. 5P is an illustration of an alternate embodiment of the report section of FIG. 5G.

FIG. 5Q is an illustration of an alternate embodiment of the report section of FIG. 5H.

FIG. 5R is an illustration of an alternate embodiment of the report section of FIG. 5I.

FIG. 6F is an illustration of an alternate embodiment of the screen of FIG. 6A.

FIG. 6G is an illustration of an alternate embodiment of the screen of FIG. 6B.

FIG. 6H-1 is an illustration of an alternate embodiment of the report section of FIG. 6C-1.

FIG. 6H-2 is an illustration of an alternate embodiment of the report section of FIG. 6C-2 combined with FIG. 6C-3.

FIG. 6I is an illustration of an alternate embodiment of the report section of FIG. 6D.

FIG. 6J is an illustration of an alternate embodiment input screen of FIG. 6E.

FIGS. 7G and 7H are illustrations of exemplary "Distribution of Total Number of Cases Filed" sections of a Nature of Suit Strategic Profile report in which all Courts are selected.

FIG. 7L is an illustration of an exemplary "Total Number of Cases Filed" section of a Nature of Suit Strategic Profile report in which a single court is selected.

FIG. 7M is an illustration of an exemplary Input Form section of a Nature of Suit Strategic Profile report.

FIG. 7N is an illustration of an alternate embodiment of the input screen of FIG. 7A.

FIG. 7O is an illustration of an alternate embodiment of the verification screen of FIG. 7B.

FIG. 7P is an illustration of an alternate embodiment of the report heading of FIG. 7C.

FIG. 7Q is an illustration of an alternate embodiment of the report heading of FIG. 7D.

FIG. 7R is an illustration of an alternate embodiment of the report heading of FIG. 7E.

FIG. 7T is an illustration of an alternate embodiment of the report sections of FIGS. 7G and 7H.

DETAILED DESCRIPTION OF THE PREFERRED EMBODIMENTS

Figure 1:
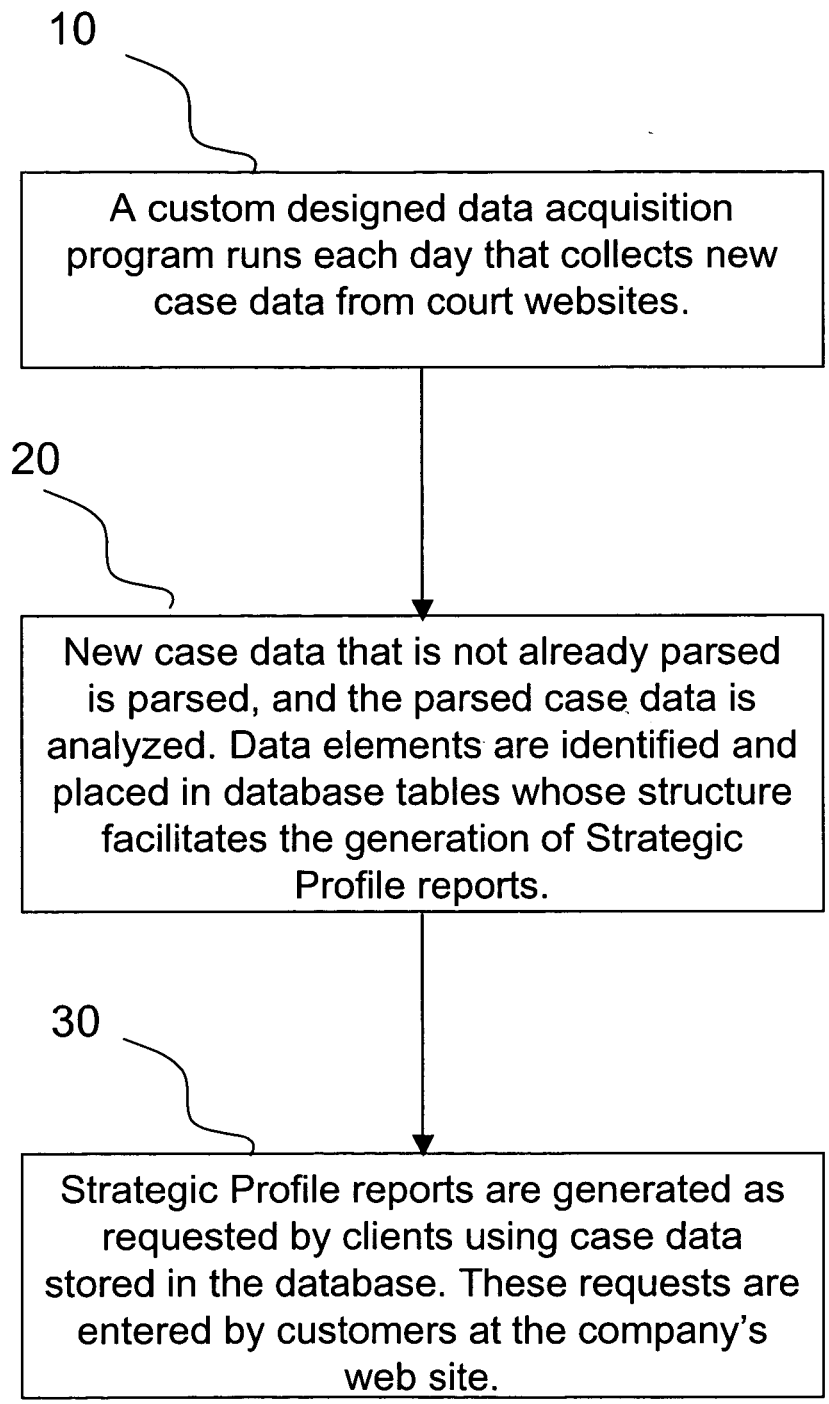
FIG. 1 is a high level flow diagram illustrating the steps in the method for creating aggregate profile reports in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention is described below with reference to flowchart illustrations of methods, apparatus (systems), and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The present invention is preferably practiced within the environment of an application hosted on an Internet client-server hypertext distributed information retrieval system (for example, the World Wide Web). As is known by those skilled in this art, on the World Wide Web everything (documents, menus, indices) is represented to the user as a hypertext object in hypertext markup language ("HTML") format. Hypertext links refer to other documents by their Uniform Resource Locators ("URLs"). The URLs can refer to local or remote resources accessible via File Transfer Protocol, distributed document retrieval systems, or distributed bulletin board systems, as well as those available via the http protocol used to transfer hypertext documents. These Hypertext pages also include code used to query a database resident on a remote server, consistent with user specified inputs and code to present the results in the manner described herein.

The client program (known as a browser), e.g. Microsoft® Internet Explorer and Netscape® Navigator, runs on the user's computer and provides two basic navigation operations: to follow a link or to send a query to a server.

A prerequisite for the process of producing Strategic Profiles is the accumulation of data that is then stored in a database configured to support Strategic Profile reporting. While the processes used to obtain, parse, and store these data are not part of the present invention, such processes being carried out by commercially available computer programs or by programs that can easily be written by those of skill in the relevant art, a discussion of these processes is relevant to an explanation of how Strategic Profiles are created.

While the process of creating a Strategic Profile is not limited to any specific court data, for exemplary purposes, it is described with respect to an implementation that reports against data obtained from the United States District Courts. However, it will be appreciated by those of skill in the art that data can also be obtained from other courts, such as state courts, state and government administrative tribunals, etc.

Also, in the implementation described herein, the present invention is presented as a service available through the LexisNexis™ CourtLink® interactive, online, court-related legal databases. However, it will be appreciated by those of skill in the art that the present invention can be implemented as a stand-alone system and method, or in association with services other than the LexisNexis™ CourtLink® services.

Referring now to FIG. 1, each night, new case data is obtained from the courts (step 10). Case data can be obtained from the courts by automated "dialer" programs, via the Internet web sites of the courts, or by dialup facilities provided by the courts, or can be delivered by the courts. The new case data obtained from the courts are captured and stored on a case-by-case basis as text on a host server. New case data obtained from some courts is already parsed into data fields. In the case of new case data that is not already parsed, a parsing program reads these data and parses (separates) the data into component data fields (step 20). These parsed data are then stored in a database in a series of database tables that are queried when Strategic Profiles are generated (step 30). These tables are as follows:

Docket table—contains basic information about the case (court, docket number, nature of suit, date filed, statute, cause of action, etc.)

Litigant table—contains a unique list of litigant names.

Litigant Link table—defines a relationship between a litigant and all of the cases in which the litigant is a participant; and defines the relationship of the litigant to the case (as plaintiff or defendant).

Litigant Order table—defines the order in which the case Litigants should be presented on the case docket.

Attorney table—contains a unique list of attorney information, including name, law firm, and address information.

Attorney Link table—defines a relationship between the attorney, the litigants represented by the attorney, and the cases involving the attorney.

Judge table—contains a unique list of judges

Judge Link table—defines a relationship between the judge and the cases that the judge has participated in.

Strategic Profile reports are created using parameters entered by a user and the data contained in the above-mentioned database tables.

The Strategic Profile reports are accessible through the Internet. A potential user first accesses the Internet using any conventional means, e.g. a personal computer having a modem connected to an Internet service provider using a standard phone line, cable service provider, etc. Once connected, the user uses a standard Internet web browser (such as Netscape® Navigator® or Microsoft® Internet Explorer) to access a web page that displays a menu of the Strategic Profile reports available (FIG. 2A) (or in an alternative embodiment, shown in FIG. 2B, a history of the user's previously generated Strategic Profile reports, as will be discussed in greater detail hereinafter).

The user selects the specific Strategic Profile report to be run by selecting (for example, by clicking his or her mouse on) the menu tab representing the desired report. Selection may be achieved by "clicking" a mouse or track ball button or other conventional computer navigation device. "Clicking" is used herein as a generic term for such selection.

Figures 2A, 2B:
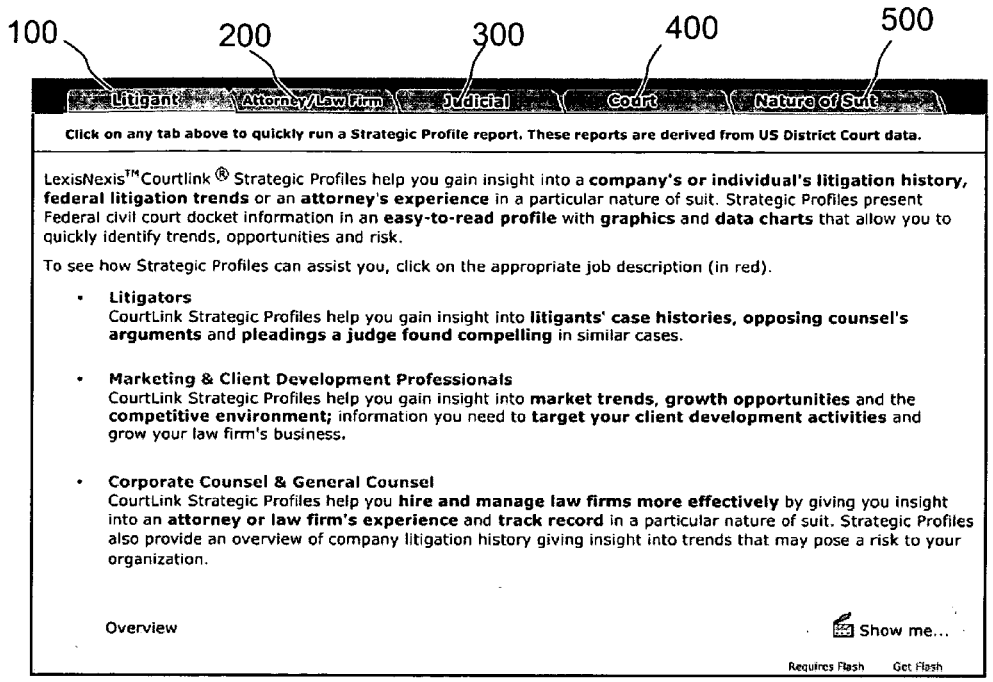
FIG. 2A is an illustration of an exemplary Strategic Profile main menu screen.
FIG. 2B is an illustration of the initial screen presented to a user at sign-on in an alternate embodiment of the invention.

As shown in both FIGS. 2A and 2B, which illustrates the Strategic Profile reports main menu screen, the list of reports includes the following:

Litigant Strategic Profile report 100
Attorney/Law Finn Strategic Profile report 200
Judicial Strategic Profile report 300
Court Strategic Profile report 400
Nature of Suit Strategic Profile report 500

The objective of the Strategic Profile reports is to present aggregated case information in tabular and graphic format relevant to the type of Strategic Profile being produced. In one implementation, the code being run by the user issues a direct query to a database to obtain the data needed for the Strategic Profile reports, and returns aggregated results. In another implementation, the code being run by the user packages up an XML message containing report instructions, and sends this request to a separate backend process (a program running on another computer). The backend computer reads the instructions, constructs correct queries similar to those issued by the code in the first implementation, gathers the resulting data, formats in XML, and returns it to the front end, which then displays the results. The second implementation provides improved security for the database as well as improved performance. The same data is ultimately returned and acted on by the program in both implementations. Accordingly, as described herein, the process of the program constructing or forming a query refers to the process employed by either implementation, or by other processes that achieve the same result, as will be well-known to those of ordinary skill in the art.

In both implementations, the report production is asynchronous, meaning that even if the user closes his or her browser while the report is being generated, the report results will be available next time the user logs in.

What follows is a detailed description of the implementation of each type of Strategic Profile.

Litigant Strategic Profile

Upon selecting Litigant Strategic Profile (by clicking the corresponding tab 100 of the main menu), the user is presented with a screen as depicted in FIG. 3A. The user may link back to the Strategic Profile main menu or link to other LexisNexis Courtlink services by clicking on appropriate links (not shown). The user may click on the "Help" button 110 to receive detailed instructions and report samples. The user may click on any of the four other Strategic Profile tabs 200, 300, 400, and 500 to create a report of the specified type. In an alternate implementation, shown in FIG. 2B, a sixth option, a History tab 600, is provided, in which are grouped all reports previously run by the user in one table, as discussed in greater detail hereinafter.

The central portion of the screen contains input fields 120a-120e where the user must specify the parameters used to generate a specific Litigant Strategic Profile. The user must specify a date range 130 for reporting purposes. As is well-known to those of skill in the art, an interactive calendar can be provided, which enables the user to select a date by clicking on it. This date range indicates the dates between which cases will be investigated containing the litigant(s) specified. Cases with an initial filing date outside this range will not be considered. The user may then enter a primary litigant name in the input field 120a and up to a pre-determined number of additional litigant names (in the exemplary screen illustrated in FIG. 3A, the number of additional litigant names is four) in the input fields 120b-120e. A litigant name can be the name of an individual, business, organization, or government agency that is a named party in a legal proceeding in the courts. The additional litigant names are optional and may be an alternate spelling of the primary litigant name, the name of a related company (perhaps a subsidiary), or the name of a party totally unrelated to the primary litigant.

Figure 3B:
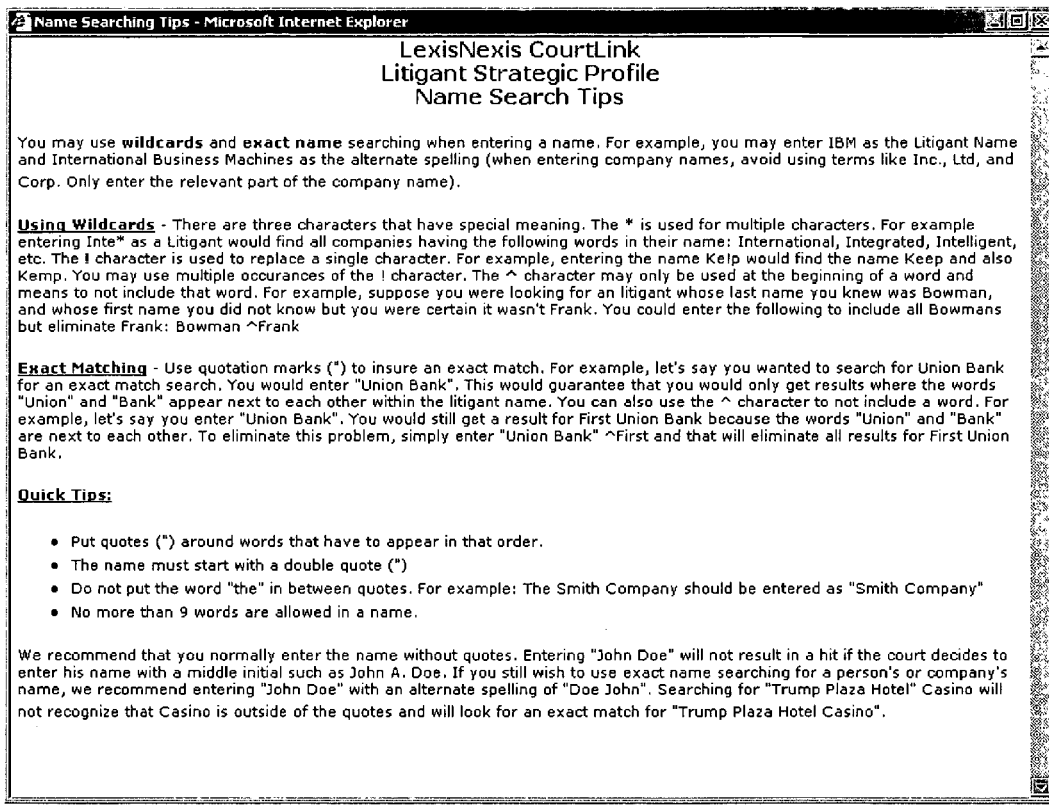
FIG. 3B is an illustration of an exemplary Litigant Strategic Profile "Search Tips" screen providing instructions how litigant names are matched to database entries.

Should the user click on the link 140 labeled "Search Tips," a Search Tips screen (alternate embodiments of which are shown in FIGS. 3B and 3N) will be displayed, with an explanation of how names the user might enter are matched to database entries. Two optional fields 150a and 150b complete the input form. The user may elect to enter a "Client Matter Code" in optional field 150a, useful for aggregating direct fees to be handled by the user's own internal billing system. As is well-known to those of skill in the art, previously-used billing codes can be provided in a drop-down menu, from which the user can select. The second optional field 150b, labeled "Client Notes," allows the user to make a free form notation regarding the particular Strategic Profile report to be generated.

Each time a Litigant Strategic Profile report is generated, a record is entered in a database table that is associated with the running of Litigant Strategic Profiles and records the fact that a specific user has run a specific report, so that should the user desire, he or she can rerun the report again at a later date with the same parameters. The bottom portion 160 of the input screen displays all of the Litigant Strategic Profiles queries previously run by the user. The user may elect to rerun any of these prior queries by clicking on the "Rerun" link 160a or to delete any of these saved records by clicking on the "Delete" link 160b. At the very bottom of the screen is a link 160c that allows for the deletion of all previously saved records.

In an alternate embodiment, shown in FIG. 3M, the user is allowed to select a chart type (for example a pie chart or a bar chart), for example, using radio buttons 196*c* and Reporting Selections (that is, the types of information to be included in the report), for example using check boxes 196*f*, before running the initial report.

Clicking on the "Produce Profile" button 170 begins the reporting process. As a first step, the program takes the name(s) entered by the user and constructs queries that discover all possible matches (applying the search rules as described in the Search Tips page shown in FIG. 3B) against the Litigant database table. The program presents a screen (alternate embodiments of which are shown in FIGS. 3C and 3O) displaying these possible matches to the user for approval. In the example described herein, the input litigant name is "Microsoft." The user may select any displayed litigant name 180*a* by clicking on the check box 180*b* next to the name. The user is also given the opportunity to select or deselect all names by clicking on the appropriate button 180*c* or 180*d*, or as shown in FIG. 3O, by using a single check box 180*h* that the user selects or deselects. This step of asking the user to indicate which name matches are relevant to the Litigant Strategic Profile is critical, due to the fact that there are many similar names and/or name variations in the case information as obtained from the courts. Without the step of allowing the user to indicate exactly which names are to be included, there is a high probability of generating erroneous results.

The user may elect to cancel the report by clicking on the "Cancel" button 180*e* or proceed to report production by clicking on the "Produce Profile" button 180*f*. The user may also enter in an input field 180*g* a Litigant Name to be used only for printing on the report heading (not used for matching) by entering text in the input box next to "Name to use on report."

When the user clicks on "Produce Profile," the program begins to gather up the necessary information required to produce the report by executing a series of queries against the Litigant database tables. The Litigant Strategic Profile report is presented in five sections (191, 192, 193, 194, and 195, shown respectively in FIGS. 3E, 3F, 3G, 3H, and 3I), each of which includes a table and accompanying graphics. As a prerequisite to producing these sections, the program must first determine the set of cases that qualify based on the input parameters. The program forms a query that investigates the Litigant database table to extract all litigant names indicated by the user and then joins these names to the Docket table by using the Litigant Link table that defines a relationship between each litigant and the cases involving the litigant. Finally, the list of cases is filtered to include only those cases where the filing date of the case is between the dates specified by the user. Armed with this set of cases, the program can now produce the five tables (with accompanying graphics) displayed on the report.

A report heading 190 (FIG. 3D) is displayed showing the name of the litigant, the dates the report covers and the count of cases discovered. The first section of the report is a grouping of cases by Nature of Suit (or case type) description 191 (FIG. 3E). A query is executed against the database that identifies the qualified cases as described above and groups these cases by Nature of Suit category (for example, "Antitrust," "copyrights," "Employment," "Other Civil Rights," "Other Statutory Actions," "Patent," and "Trademark"). A count of cases in each category is presented and a percentage of each type of case against the total cases found is calculated. These results are then presented in tabular form 191*a* and also as a pie or bar chart 191*b* as shown in FIG. 3E. Each Nature of Suit description in the table 191*a* is enabled to be a hyperlink, meaning that if the user should click on a specific description, an entirely new report will be generated (this is in effect a form of filtering by the rows of the report), further restricting the report to cases of only that particular Nature of Suit. This is a particularly useful feature to those users seeking to investigate case details of cases of only a particular category.

The Jurisdictional Analysis report section 192 (FIG. 3F) groups the cases in the set by the states in which they were filed. A chart 192*a* and accompanying graph 192*b* display counts and corresponding percentages. This report section provides the user with an overall view of the distribution of cases geographically, and along with the next report section, is particularly relevant to law firms doing business in the indicated regions.

The Federal District Court Analysis report section 193 (FIG. 3G) refines the Jurisdictional Analysis report section by regrouping the case set to display which specific Federal District Court the cases were filed in. Since many states have more than one district court, this presentation provides a more refined geographical distribution. The report section is displayed as a table 193*a* (Court Name, count of cases, percentage of total) and as a pie or bar chart 193*b*.

Figure 3I:
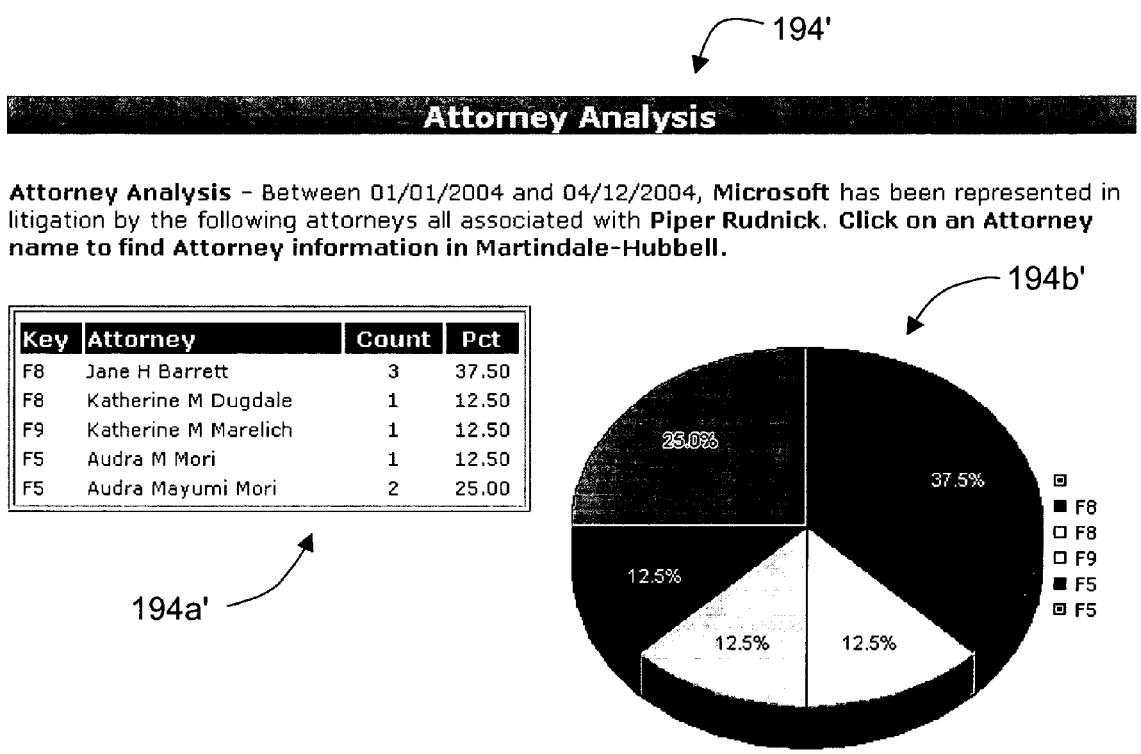
FIG. 3I is an illustration of an exemplary Litigant Strategic Profile screen display of a report including only those cases where a selected law firm has represented the litigant. In this table, the lawyers from the selected Law Firm are displayed.

The Law Firm Analysis report section 194 (FIG. 3H) regroups the cases by the Law Firms representing the litigant and presents a corresponding table 194*a* and chart 194*b* showing the Law Firm name, count, and percentage of total. Due to the fact that in many instances, more than one lawyer from a law firm will be listed on the case docket as representing the litigant, the counts presented in this table are usually higher than the total case count. Each Law Firm name is created as a hyperlink. When the user clicks on a hyperlinked law firm name, a new report will be generated including only those cases where the law firm has represented the litigant. When this new report is generated for a specific law firm, the Law Firm Analysis report section is replaced by an Attorney Analysis report section 194' (FIG. 3I). This section displays the names of the attorneys who have represented the litigant in the case set where the indicated Law Firm is referenced. The table 194*a*' and chart 194*b*' display the Attorney name, case count, and percentage of total.

The final report section, the Case Listing report section 195 (FIG. 3J), is a tabular listing 195*a* of the cases included in the report (or report drill down). These are the set of cases initially selected by query that meet the specific criteria as defined by the user. When the user clicks on either a Nature of Suit description and/or a Law Firm, the case set is limited by this additional parameter. The case set is presented as a table only (no chart). The columns that can be displayed on this table are as follows:

(!) Attorney warning flag column 195*b*—If an exclamation point (!) appears, this means that defense counsel has not yet been assigned for the litigant in the case. It will be appreciated by those of skill in the art that symbols other than ! may be used as a warning flag.

Action 195*c* column—The user may click on a "View" case link to display the full case docket and/or a "Track" case link that will alert the user to any new case developments.

Court column 195*d*—The court where the case was filed.

Docket column 195*e*—The case docket number.

Heading column 195*f*—The name of the case (e.g. Jones vs. Smith).

NOS column 195*g*—The Nature of Suit (or type) of the case.

Filed column 195*h*—The date the case was initially filed.

Case Law column 195*i*—If a reference appears in this column, then it indicates that the case has been closed and that there are case law materials available through an online legal research database (in this exemplary implementation, on Lexis.com). Clicking on the reference will direct the user to this material.

At least some, and preferably all columns of the tabular case listing 195*a* are sortable, and selected columns are filterable. In addition, the user can customize the tabular case listing 195*a* by adding or removing columns, specifying the number of items shown on a page, and setting default sorting options, as discussed hereinafter. An alternate embodiment of case listing 195*a* (shown in FIG. 3V) is filterable according to parameters identified in drop-down menus 195*j* provided in at least some of the columns (as illustrated in FIG. 3V, the Court and NOS columns).

The Case Listing section 195 is the final report section of the Litigant Strategic Profile report. Immediately following this section is an input form 196 (FIG. 3K) that allows the user to (1) switch to a different type of Strategic Profile (by clicking on a different one of tabs 100, 200, 300, 400, and 500), (2) change the reporting dates for the current Litigant Strategic Profile (information fields 196*a*), (3) obtain product help (help button 196*b*), (4) change the chart type from pie charts to bar charts (or vice versa) (radio buttons 196*c*), (5) indicate whether the report tables should be active (meaning that report tables can be interactively sorted and filtered) (radio buttons 196*d*) in the implementation in which a java applet is used to allow sorting and filtering, (6) indicate the placement of charts in relation to tables (to the side, below or suppressed) (radio buttons 196*e*), or (7) indicate which of the five report sections should be displayed (check boxes 196*f*). The user can select the level of customization he or she requires and click the "Rerun Profile" button 196*g* to create a modified report.

Figure 3P:
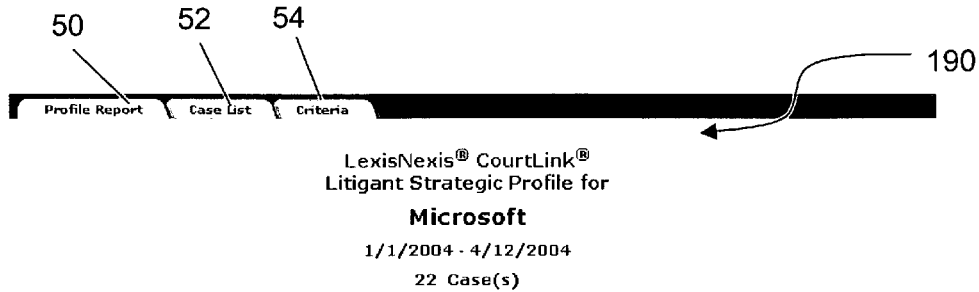
FIG. 3P is an illustration of an alternate embodiment of the report section of FIG. 3D.
Figure 3Q:
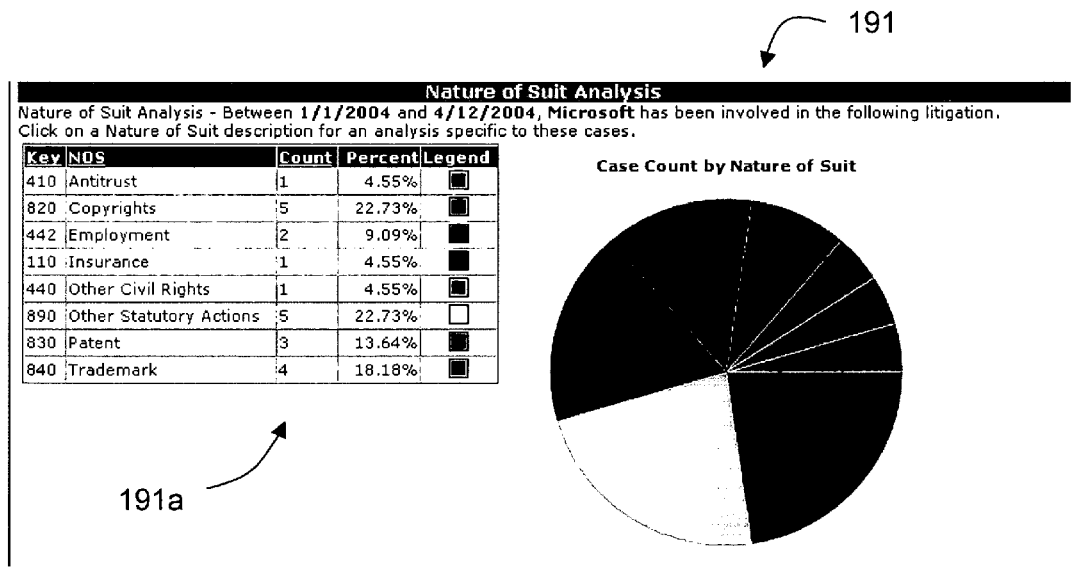
FIG. 3Q is an illustration of an alternate embodiment of the report section of FIG. 3E.
Figure 3R:
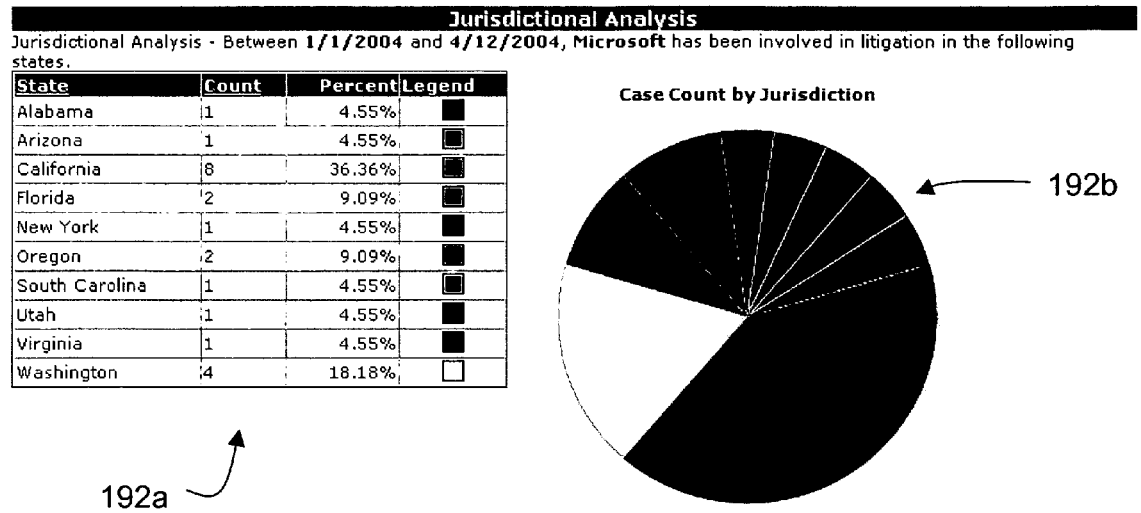
FIG. 3R is an illustration of an alternate embodiment of the report section of FIG. 3F.
Figure 3S:
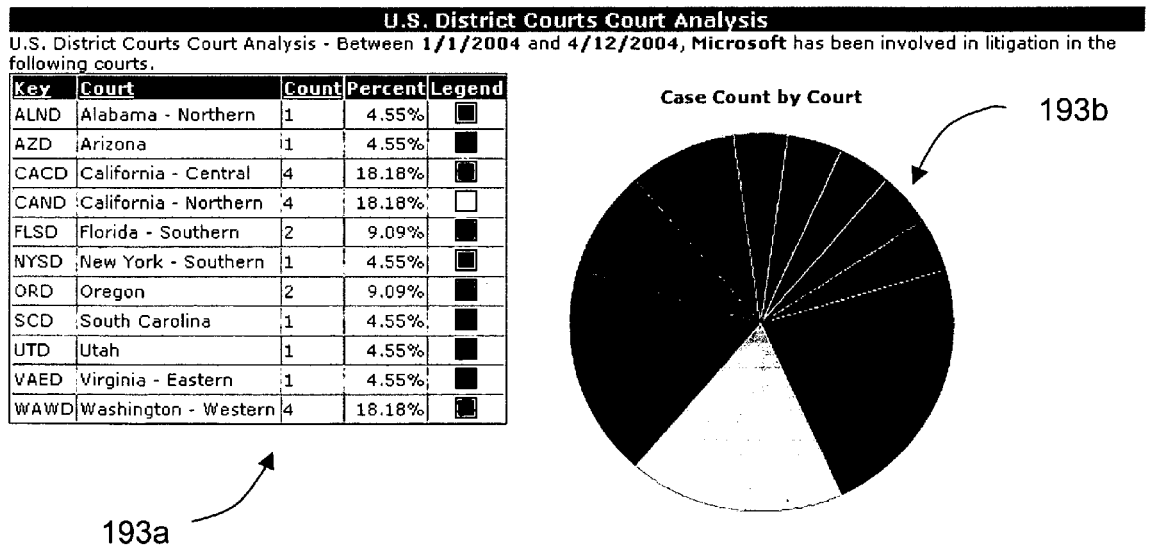
FIG. 3S is an illustration of an alternate embodiment of the report section of FIG. 3G.

An alternate embodiment of the input form, illustrated in FIG. 3W, omits the Table Type option 196*d* (which is instead found in the alternate embodiment of the input screen illustrated in FIG. 3M) and the Report Layout option 196*e* (which in the alternate embodiment is superfluous because as shown in FIG. 3V, all tables are made active, and as shown in FIG. 3Q, the report layout is fixed as "Table next to Chart").

Figure 3U:
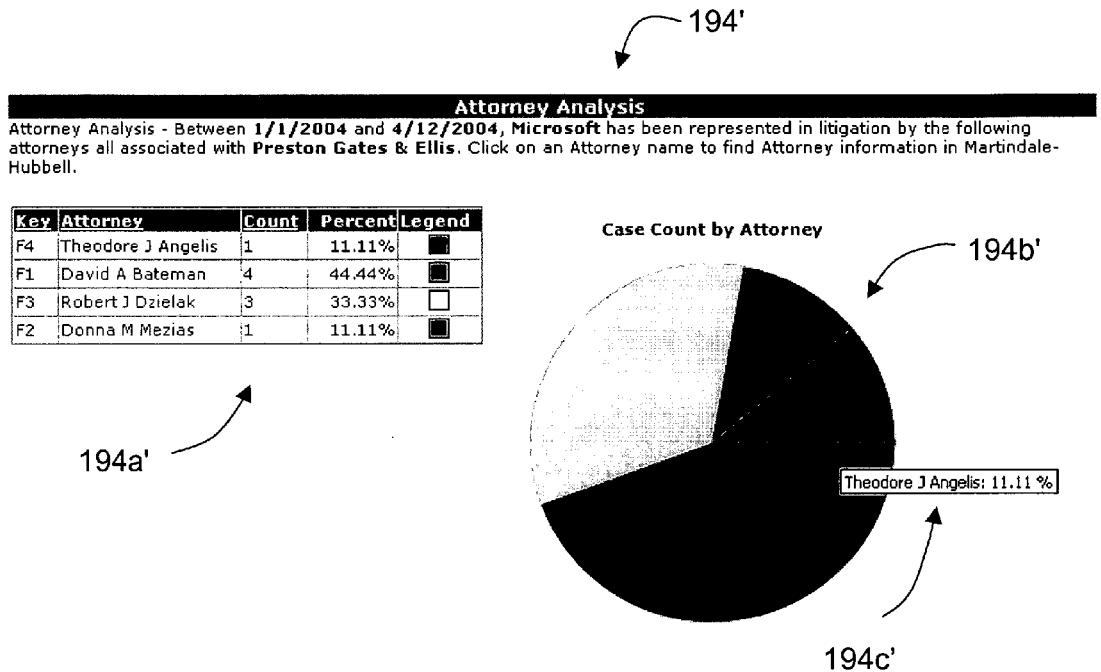
FIG. 3U is an illustration of an alternate embodiment of the screen display of FIG. 3I.

The segments of the pie chart or the bars of the bar chart preferably are displayed in unique colors. As shown in FIG. 3U, a color key can be provided as a separate column of the corresponding table (or as will be appreciated by those of skill in the art, in a separate part of the screen). "Mousing over" a segment of a pie chart or a bar of a bar chart displays the data 194*c'* represented by the segment or the bar.

Should the user desire a printable copy of the report (one without header graphics or the bottom input form), he or she can click the "Print View" button 196*h*. A new browser window (not shown) will be opened that will accommodate this request. A report also can be generated to a data file (for example, a PDF file, as shown in FIG. 3W, button 196*i*), to allow the report to be saved and to be sent to others.

At the very bottom of the report is a Report Criteria or Parameter section 197 (FIG. 3L) that recaps the input parameters used to generate the report. These parameters include the list of selected litigants, as well as the range of dates used to qualify cases. An alternate embodiment of the Parameter section 197, having a slightly different layout, is illustrated in FIG. 3X.

Another important feature of the Litigant Strategic Profile is its ability to link to other online databases of corporate affiliations (in this exemplary implementation, the Lexis-Nexis Directory of Corporate Affiliations ("DCA")). This online directory displays corporate relationships (such as subsidiaries, branches, divisions, etc). In the exemplary implementation described herein, the Litigant Strategic Profile links to the DCA in two places: (1) on the initial input form (as shown in FIG. 3A, a link is embedded in the sentence "If you would like to perform research click here.") and (2) on the returned list of name matches (as shown in FIG. 3C, a link is embedded in the sentence "If you would like to perform this search please click here and a new results window will be opened."). In either instance, the user can click on this link, enter a company name (or partial name), and discover related companies. This capability enables the user to discover additional litigation for parent, subsidiary, or other related companies.

Data required to reproduce the above-described Litigant Strategic Profile report are stored in a Litigant Strategic Profile database table and are displayed as an option the next time the user runs a Litigant Strategic Profile.

Litigant Strategic Profiles are unique in the way that they aggregate specific case information related to litigants, offering the user a view into the litigant's litigation history. Law firms can use Litigant Strategic Profile reports as part of their marketing and client development activities. For example, law firms can use Litigant Strategic Profile reports to quickly see which other law firms represent a specific client or prospect and how their firm fits into this picture; to quickly obtain a geographical view of where litigation takes place and align this with firm resources; and most importantly, to be able to understand the type of litigation in which a litigant is most commonly engaged, and in that way identify new business opportunities.

Corporations can use Litigant Strategic Profiles to investigate current and potential business partners or adversaries. A simple listing of cases (the only search result available using prior art methods and systems) must be laboriously investigated by looking at each case in detail and manually aggregating the information that is compiled automatically to produce the Litigant Strategic Profile report. A Litigant Strategic Profile report generated in seconds translates into hours of manual labor over alternative methods of compilation. Additionally, the ability to focus on a specific Nature of Suit and/or Law Firm further enhances the value over alternative methods.

Attorney/Law Firm Strategic Profile

Upon selecting the Attorney/Law Firm Strategic Profile tab 200 of the main menu, the user is presented with a screen as depicted in FIG. 4A. The user may link back to the Strategic Profile menu or link to other online legal services (in the exemplary implementation described herein, other LexisNexis Courtlink services) by clicking on appropriate links (not shown). The user may click on the "Help" button 210 to receive detailed instructions and report samples. The user may click on any of the four other Strategic Profile tabs 100, 300, 400, and 500 to create a report of the specified type.

The central portion of the screen contains input fields 220*a*-220*b* where the user must specify the parameters used to generate a specific Attorney/Law Firm Strategic Profile. The user must specify a date range 230 for reporting purposes. This date range indicates the dates between which cases will be investigated containing the attorney(s) specified. Cases with an initial filing date outside this range will not be considered. The user may then enter an attorney's name and/or a law firm name in input fields 220*a* and 220*b*. Two optional fields 250*a* and 250*b* complete the input form. The user may elect to enter a "Client Matter Code" in input field 250a useful for aggregating direct fees to be handled by the user's own internal billing system. The second field 250b, labeled "Client Notes," allows the user to make a free form notation regarding the particular Strategic Profile to be generated.

Each time an Attorney/Law Firm Strategic Profile is generated, a record is entered in the database table that is associated with the running of Attorney/Law Firm Strategic Profiles and records the fact that a specific user has run a specific report, so that should the user desire, he or she can rerun the report again at a later date with the same parameters. The bottom portion 260 of the input screen displays all of the Attorney/Law Firm Strategic Profile queries previously run by the user. The user may elect to rerun any of these prior reports by clicking on the "Rerun" link 260a or to delete any of these saved records by clicking on the "Delete" link 260b. At the very bottom of the screen is a link 260c that allows for the deletion of all previously saved records.

Figure 4B:
FIG. 4B is an illustration of an exemplary Attorney/Law Firm Strategic Profile screen presenting possible attorney/law firm matches to the user for approval.

Clicking on the "Produce Profile" button 270 begins the reporting process. As a first step, the program takes the name(s) entered by the user and constructs queries that discover all possible matches against the Attorney/Law Firm database table. If an attorney name was entered, then the query will match names containing the text of the name entered. If a law firm name was entered, then the program will use this input data as an additional qualifier. If a law firm name is entered without an attorney name, all attorneys associated with the law firm are displayed. If an attorney's name is entered in addition to a law firm name, then all attorneys with that name and associated with the law firm are displayed. The program presents a screen displaying all possible matches to the user for approval (FIG. 4B). The user may select any displayed attorney name 280a by clicking on the check box 280b next to the name. The user is also given the opportunity to select or deselect all names by clicking on the appropriate button 280c or 280d. In an alternate embodiment, shown in FIG. 4N, the user may select or deselect all names by clicking on a single check box 280h. This step of asking the user to indicate which name matches are relevant to the Strategic Profile is critical, due to the fact that there are many similar names and/or name variations in the case information as obtained from the courts. Without the step of allowing the user to indicate exactly which names are to be included, there is a high probability of generating erroneous results.

The user may elect to cancel the report by clicking on the "Cancel" button 280e or proceed to report production by clicking on the "Produce Profile" button 280f. The user may also enter a name 280g to be used only for printing on the report heading (not used for matching) by entering text in the input box next to "Name to use on report."

When the user clicks on "Produce Profile," the program begins to gather up the necessary information required to produce the report by executing a series of queries against the Attorney/Law Firm database tables. The Attorney/Law Firm Strategic Profile report is presented in seven sections 291-297. As a prerequisite to producing these sections, the program must first determine the set of cases that qualify based on the input parameters. The program forms a query that investigates the Attorney/Law Firm database table to extract all of the attorney names indicated by the user, and then joins these names to the Docket table by using the Attorney Link table that defines a relationship between each attorney and the cases involving the attorney. The Litigant Link table is also queried in order to discover the litigants represented by the attorney(s). Finally, the list of cases is filtered to only include those where the filing date of the case is between the dates specified by the user. Armed with this set of cases, the program can now produce the seven tables (with accompanying graphics) displayed on the report.

Figure 4E:
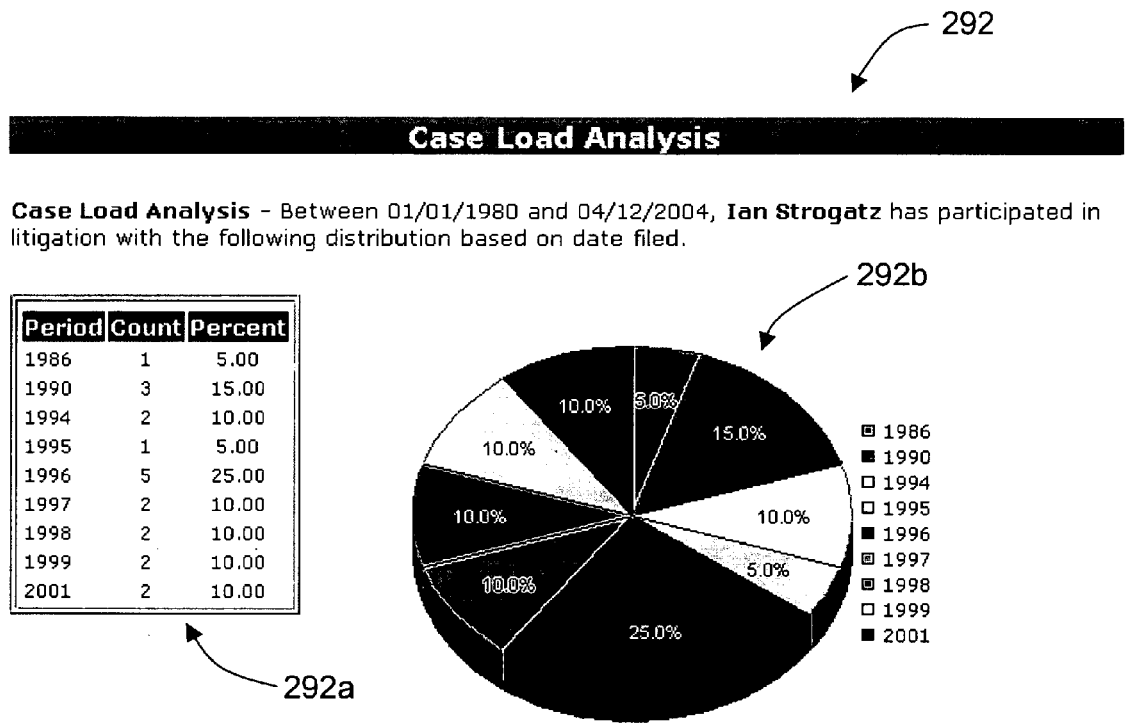
FIG. 4E is an illustration of an exemplary "Case Load Analysis" section of an Attorney/Law Firm Strategic Profile report.
Figure 4I:
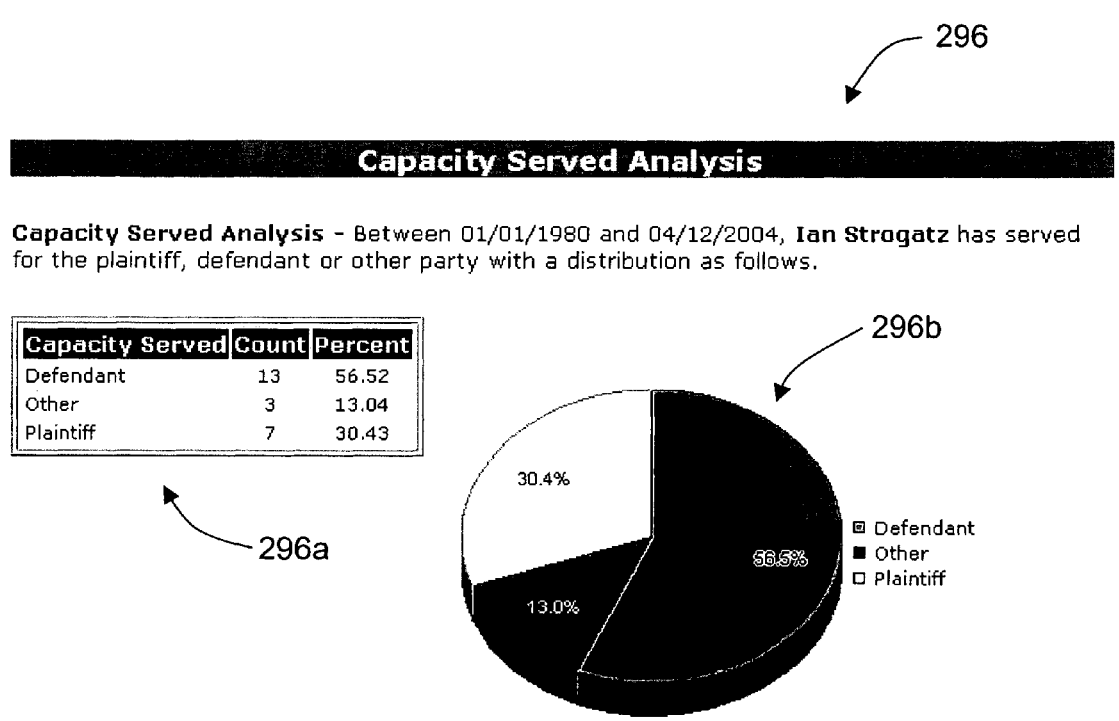
FIG. 4I is an illustration of an exemplary "Capacity Served" section of an Attorney/Law Firm Strategic Profile.
Figures 4K, 4L:
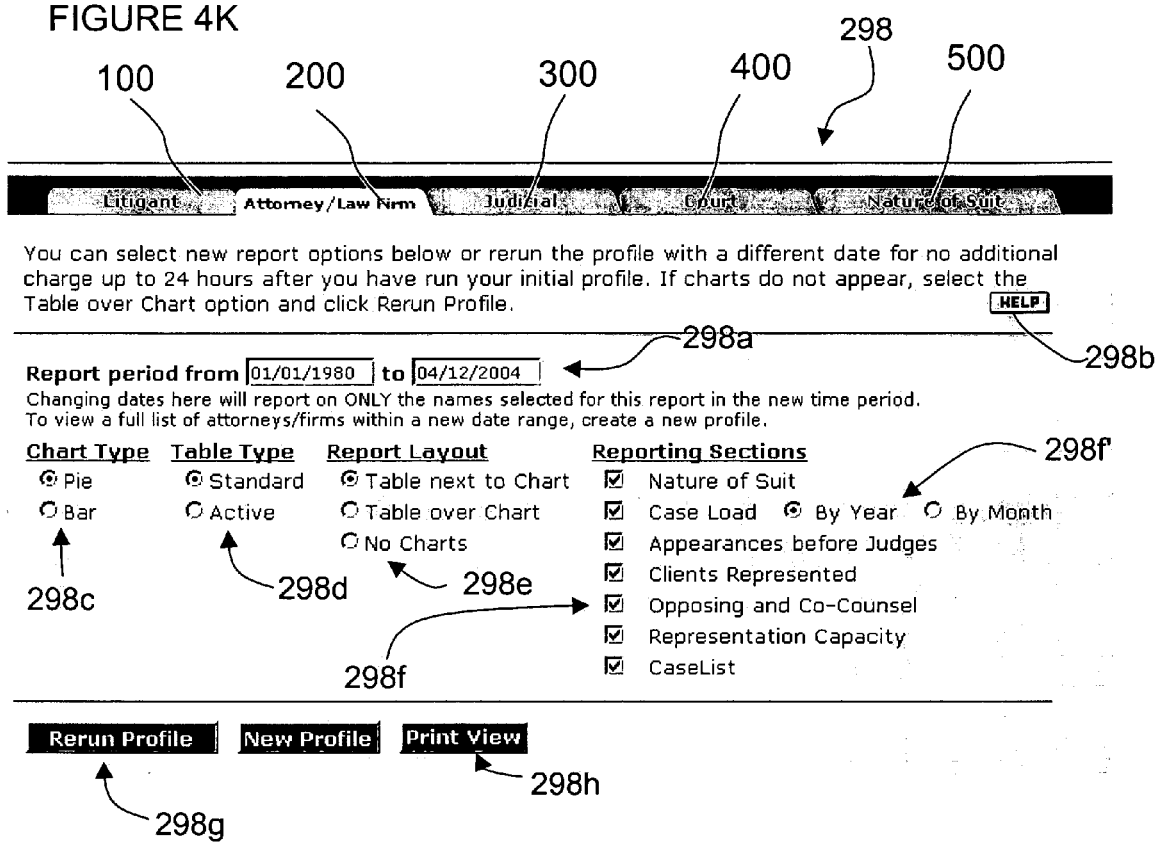
FIG. 4K is an illustration of an exemplary Input Form section of an Attorney/Law Firm Strategic Profile report.
FIG. 4L is an illustration of an exemplary "Parameters" or Report Criteria section of an Attorney/Law Firm Strategic Profile.
Figures 4O, 4P:
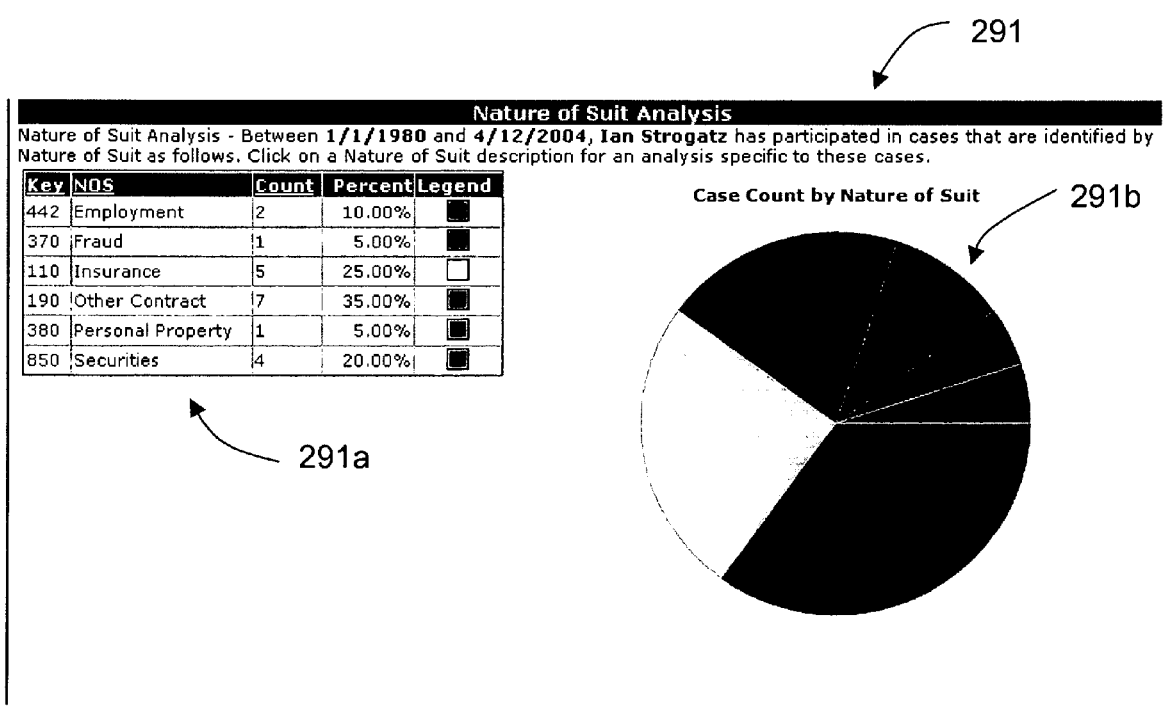
FIG. 4O is an illustration of an alternate embodiment of the report section of FIG. 4C.
FIG. 4P is an illustration of an alternate embodiment of the report section of FIG. 4D.

A report heading 290 (shown in alternate embodiments in FIGS. 4C and 4O) is displayed showing the name of the Attorney or Law Firm, the dates the report covers and the count of cases discovered. The first section of the report is a grouping of cases by Nature of Suit (or case type) description. A query is executed against the database that identifies the qualified cases as described above and groups these cases by Nature of Suit category. A count of cases in each category is presented and a percentage of each type of case against the total cases found is calculated. These results are then presented in tabular form 291a and also as a pie or bar chart 291b, as shown in FIG. 4D. Each Nature of Suit description in the table is enabled to be a hyperlink, meaning that if the user should click on a specific description an entirely new report will be generated further restricting the report to cases of only that particular Nature of Suit. This is a particularly useful feature to those users seeking to investigate case details of cases of only a particular type involving the attorney(s).

The Case Load Analysis report section 292 (FIG. 4E) groups the cases in the set initially by year filed and optionally by month filed. The chart 292a and accompanying graph 292b display the period, counts, and corresponding percentages. This report section provides the user with an overall view of the number of cases being handled by the attorney(s). When displayed for attorneys for an entire law firm, a clear picture is presented of the numbers of cases in which the firm is involved in the Federal District Courts.

The Judge Appearance Analysis report section 293 (FIG. 4F) presents a table 293a of judge names 293b and the number of cases 293c in which the attorney(s) has appeared before the judge, as well as the name of the court 293d where the judge sits. There is no chart associated with this report section. The judge names are hyperlinks. Clicking on a judge name will further restrict the report to only those cases where the judge has presided over the case and redisplay all tables using only these cases. An alternate embodiment of table 293a is filterable according to parameters identified in drop-down menus 293e provided in at least some of the columns (as illustrated in FIG. 4R, the Judge and Court columns).

The Client Analysis report section 294 (FIG. 4G) displays a tabular listing 294a of the clients represented by the attorney(s). There is no chart associated with this section. The query that produces this section joins the Attorney table to the Litigant Link table, the Litigant table, and the Docket table to determine which clients (litigants) have been represented by the attorney. The Litigant Link table is joined to the Litigant Order table to determine the capacity of representation (plaintiff, defendant, or other). The table presented on the report displays the following columns:

Client Name 294b
Capacity (Plaintiff, Defense, Other) 294c
Court 294d
Case Heading (Title) 294e
Nature of Suit (Case Type) 294f An alternate embodiment of table 294a is filterable according to parameters identified in drop-down menus 294g provided in at least some of the columns (as illustrated in FIG. 4S, the Capacity, Court, Case Heading, and Nature Of Suit columns).

The Opposing/Co-Counsel report section 295 (FIG. 4H) is an important table 295a that displays other attorneys that subject attorney(s) have worked with or against (i.e. they were on the same or opposing sides). To construct this table, a complex query is run that gathers up all of the other attorneys from the cases in question and compares their representation in the cases to the subject attorney(s). The table displays the following columns:

Related attorney name 295*b*

Category of representation 295*c*—Plaintiff, Defendant, or other

Side 295*d*—same or opposing side

Court 295*e*

Case Heading (Title) 295*f*

The "Side" column 295*d* will contain the designation "Same Side" if the attorney on a particular row of the table was representing the same side as the subject attorney(s). The term "Opposing" will appear in this column if the attorneys were on opposite sides. An alternate embodiment of table 295*a* is filterable according to parameters identified in drop-down menus 295*g* provided in at least some of the columns (as illustrated in FIG. 4T, the Category of Representation, Side, Court and Case Heading columns).

The Capacity Served report section 296 (FIG. 4I) is a simple summary of the number of cases where the attorney (s) has represented the plaintiff, defendant, or other case participant, presented as a table 296*a* and also as a pie or bar chart 296*b*.

The final report section, the Case Listing report section 297 (FIG. 4J) is a tabular listing 297*a* of the cases included in the report (or report drill down). These are the set of cases initially selected by query that meet the specific criteria as defined by the user. When the user clicks on either a Nature of Suit description and/or a Judge, the case set is limited by these additional parameters. The case set is presented as a table only (no chart). The columns that can be displayed on this table are as follows:

(!) Attorney warning flag 297*b*—If an "!" appears this means that defense counsel has not yet been assigned for the litigant in the case.

Action 297*c*—The user may click on a "View" case link to display the full case docket and/or a "Track" case link that will alert the user to any new case developments.

Court 297*d*—The court where the case was filed.

Docket 297*e*—The case docket number.

Heading 297*f*—The name of the case (e.g. Jones vs. Smith).

NOS 297*g*—The Nature of Suit (or type) of the case.

Filed 297*h*—The date the case was initially filed.

Case Law 297*i*—If a reference appears in this column then it indicates that the case has been closed and that there are case law materials available on, for example, Lexis.com. Clicking on the reference will direct the user to this material.

At least some, and preferably all columns of the tabular case listing 297*a* are sortable. In addition, the user can customize the tabular case listing 297*a* by adding or removing columns, specifying the number of items shown on a page, and setting default sorting options, as discussed hereinafter. An alternate embodiment of table 297*a* is filterable according to parameters identified in drop-down menus 297*j* provided in at least some of the columns (as illustrated in FIG. 4V, the Court and NOS columns).

Figure 4Q:
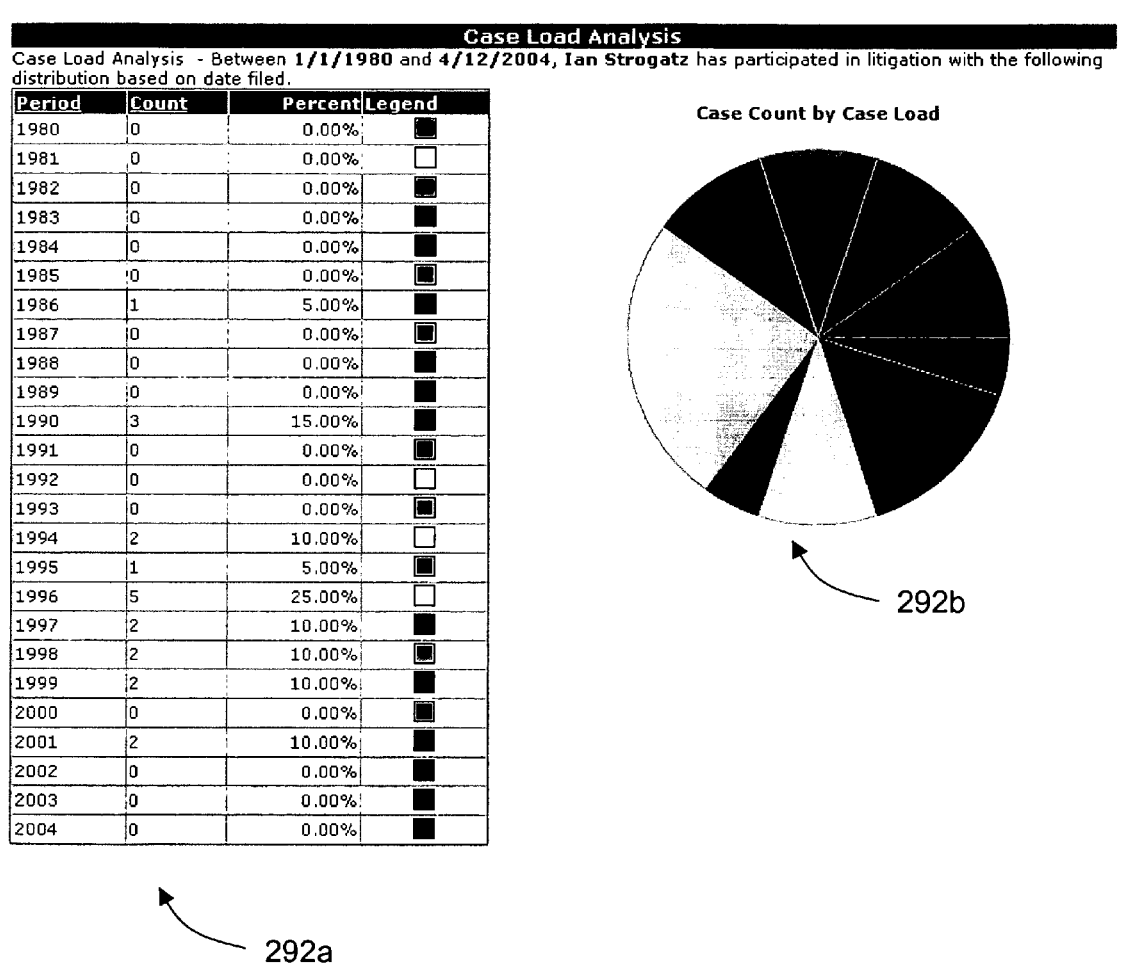
FIG. 4Q is an illustration of an alternate embodiment of the report section of FIG. 4E.
Figure 4U:
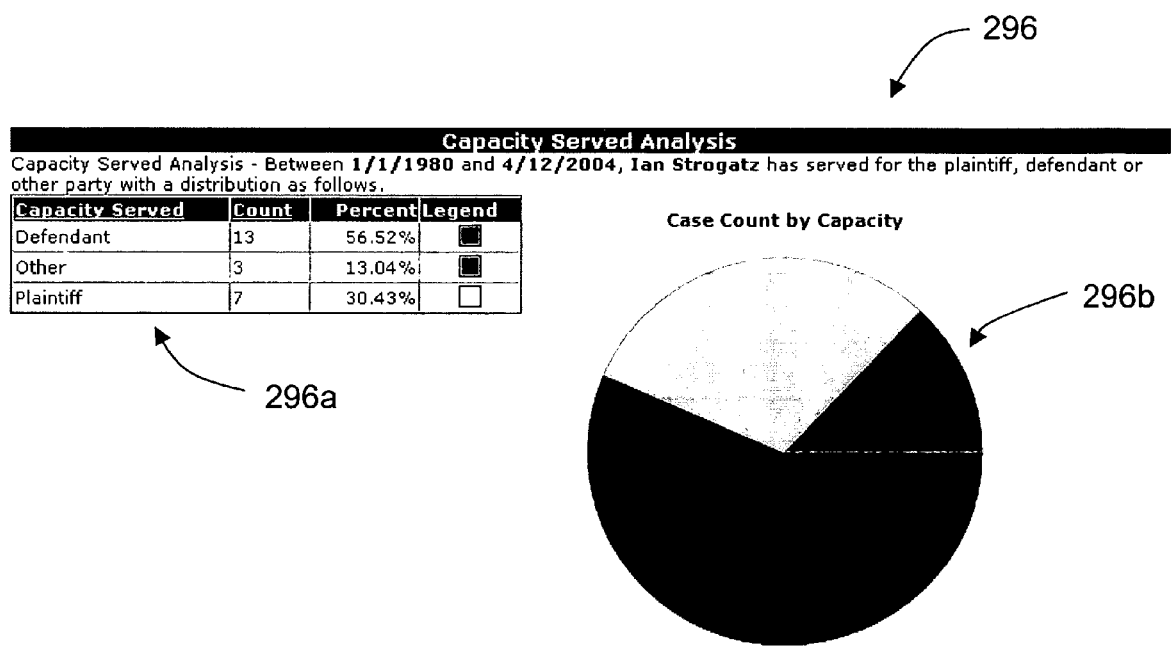
FIG. 4U is an illustration of an alternate embodiment of the report section of FIG. 4I.

The Case Listing report section 297 is the final report section of the Attorney/Law Firm Strategic Profile. Immediately following this section is an input form 298 (FIG. 4K) that allows the user to (1) switch to a different type of Strategic Profile (by clicking on a different one of tabs 100, 200, 300, 400, and 500), (2) change the reporting dates for the current Attorney/Law Firm Strategic Profile (information fields 298*a*), (3) obtain product help (help button 298*b*), (4) change the chart type from pie charts to bar charts (or vice versa) (radio buttons 298*c*), (5) indicate whether the report tables should be active (meaning that report tables can be interactively sorted and filtered) (radio buttons 298*d*) in the implementation in which a java applet is used to allow sorting and filtering, (6) indicate the placement of charts in relation to tables (to the side, below, or suppressed) (radio buttons 298*e*), (7) indicate which of the seven report sections should be displayed (check boxes 298*f*), or (8) indicate if the Case Load Analysis table should be displayed in the period of years or months (radio buttons 298*f'*). The user can select the level of customization he or she requires and click the "Rerun Profile" button 298*g* to create a modified report. An alternate embodiment of the input form, illustrated in FIG. 4W, omits the Table Type option 298*d* (which is instead found in the alternate embodiment of the input screen illustrated in FIG. 4M) and the Report Layout option 298*e* (which in the alternate embodiment is superfluous because as shown in FIG. 4V, all tables are made active, and as shown in FIG. 4Q, the report layout is fixed as "Table next to Chart." The segments of the pie chart or the bars of the bar chart preferably are displayed in unique colors. A color key can be provided as a separate column of the corresponding table. "Mousing over" a segment of a pie chart or a bar of a bar chart displays the data, for example 194*c'* in FIG. 3U, represented by the segment or the bar.

Should the user desire a printable copy of the report (one without header graphics or the bottom input form), he or she can click the "Print View" button 298*h*. A new browser window (not shown) will be opened which will accommodate this request. A report also can be generated to a data file (for example, a PDF file, as shown in FIG. 4W, button 298*i*), to allow the report to be saved and to be sent to others.

At the very bottom of the report is a Report Criteria or Parameter section 299 (FIG. 4L) that recaps the input parameters used to generate the report. These parameters include the list of selected attorneys as well as the range of dates used to qualify cases. An alternate embodiment of the Parameter section 299, using a different format, is illustrated in FIG. 4X.

Data required to reproduce this Attorney/Law Firm Strategic Profile are stored in a database table and is displayed as an option the next time the user runs an Attorney/Law Firm Strategic Profile.

Attorney/Law Firm Strategic profiles are a unique and valuable tool for litigators researching opposing counsel. All of the relevant facts about the attorney(s) activity in Federal District Court are displayed in concise tables and easy to read charts. While activity can be discovered at a glance, further detail can be uncovered by viewing the full case docket and supporting materials pointed to by the profiles.

Attorney/Law Firm Strategic profiles can also be used as a means of evaluating lawyer effectiveness and as a research tool. In particular, the Opposing/Co-Counsel Analysis provides invaluable detail regarding other attorneys who have worked for and against the subject attorney(s).

Judicial Strategic Profile

Upon selecting the Judicial Strategic Profile tab of the main menu, the user is presented with a screen as depicted in FIG. 5A. The user may link back to the Strategic Profile menu or link to other online legal services, for example other LexisNexis Courtlink services, by clicking on appropriate links (not shown). The user may click on the "Help" button 310 to receive detailed instructions and report samples. The user may click on any of the four other Strategic Profile tabs 100, 200, 400, or 500 to create a report of the specified type.

The central portion of the screen contains input fields 320a-320b and 330 where the user must specify the parameters used to generate a specific Judicial Strategic Profile. The user must specify a date range 330 for reporting purposes. This date range indicates the dates between which cases will be investigated with the involvement of the specified judge. Cases with an initial filing date outside this range will not be considered. The user may then enter a judge name 320a. The user can also search for a judge by selecting a specific court from a dropdown list 320b. Two optional fields 350a and 350b complete the input form. The user may elect to enter a "Client Matter Code" (input field 350a) useful for aggregating direct fees to be handled by the user's own internal billing system. The second field 350b, labeled "Client Notes," allows the user to make a free form notation regarding the particular Strategic Profile to be generated.

In an alternate embodiment, illustrated in FIG. 5J, the user is allowed to select the Chart Type (using, for example, radio buttons 395c) and Reporting Selections (using, for example, check boxes 395f) before running the initial report.

Each time a Judicial Strategic Profile is generated, a record is entered in a Judge database table. The bottom portion 360 of the input screen displays all of the Judicial Strategic Profiles previously run by the user. The user may elect to rerun any of these prior reports by clicking on the "Rerun" link 360a or to delete any of these saved records by clicking on the "Delete" link 360b. At the very bottom of the screen is a link 360c that allows for the deletion of all previously saved records.

Figure 5B:
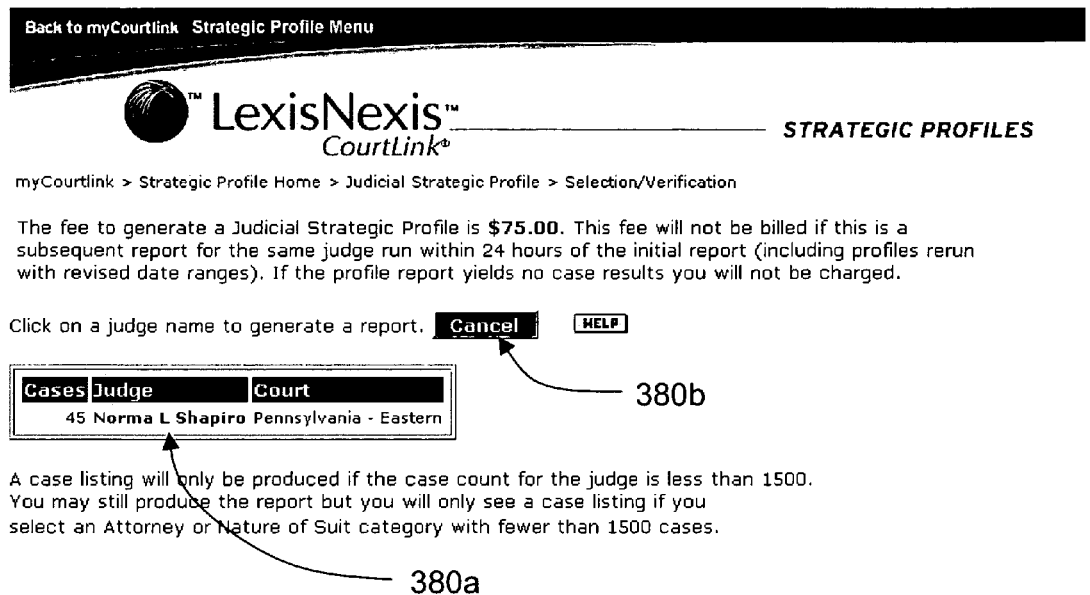
FIG. 5B is an illustration of an exemplary Judicial Strategic Profile screen presenting possible matching judges to the user for approval.

Clicking on the "Produce Profile" button 370 begins the reporting process. As a first step, to the program takes the name and/or court entered by the user and construct a query that discovers all possible matching judges. The program presents these possible matches 380a to the user for approval (FIG. 5B). The user may select any displayed judge and begin the reporting process by clicking on the judge name. In an alternate embodiment, illustrated in FIG. 5K, the user may select the desired judge by clicking on a radio button 380c, and then begins the reporting process by clicking on the "Create Profile" button 380d. The user may elect to cancel the report by clicking on the "Cancel" button 380b.

When the user clicks on a judge name, the program begins to gather up the necessary information required to produce the report by executing a series of queries against the Judge and Judge Link database tables, as well as the Docket and Attorney database tables. The Judicial Strategic Profile report is presented in four sections 391-394. As a prerequisite to producing these sections, the program must first determine the set of cases that qualify based on the input parameters. The program forms a query that investigates the Judge database table and uses the Judge Link table to quickly discover all cases presided over by the judge. These cases are filtered by the beginning and ending date parameters to produce a qualifying case set. Armed with this set of cases, the program can now produce the four tables 391a, 392a, 393a, and 394a (with accompanying graphics 391b, 392b, and 394b) displayed on the report.

Figure 5C:
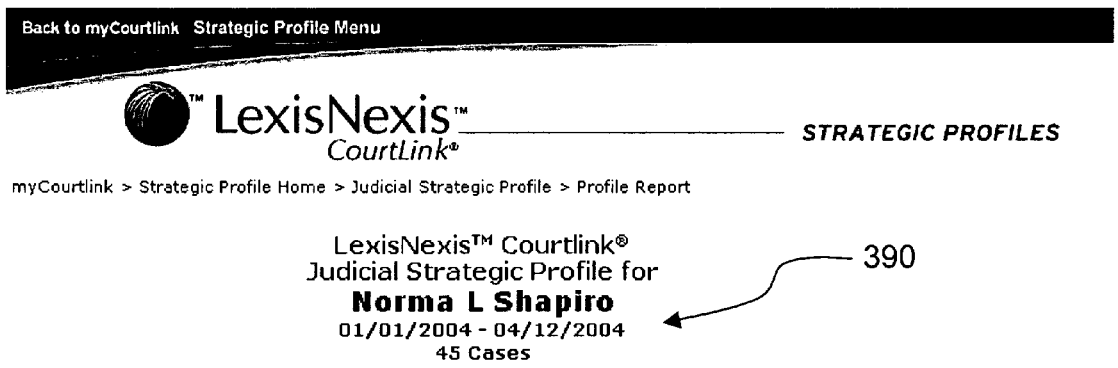
FIG. 5C is an illustration of an exemplary heading of a Judicial Strategic Profile report, showing the name of the judge, the dates the report covers and the count of cases discovered.

A report heading 390 (FIG. 5C) is displayed showing the name of the judge, the dates the report covers and the count of cases discovered. An alternate embodiment of the report heading 390, using a different format, is illustrated in FIG. 5L. The first section 391 of the report is a grouping of cases by Nature of Suit (or case type) description. A query is executed against the database that identifies the qualified cases as described above and groups these cases by Nature of Suit category. A count of cases in each category is presented and a percentage of each type of case against the total cases found is calculated. These results are then presented in tabular form 391a and also as a pie or bar chart 391b, as shown in FIG. 5D). Each Nature of Suit description in the table is enabled to be a hyperlink, meaning that if the user should click on a specific description an entirely new report will be generated further restricting the report to cases of only that particular Nature of Suit. This is a particularly useful feature to those users seeking to investigate case details of only cases of a particular type that the judge has presided over.

Figure 5E:
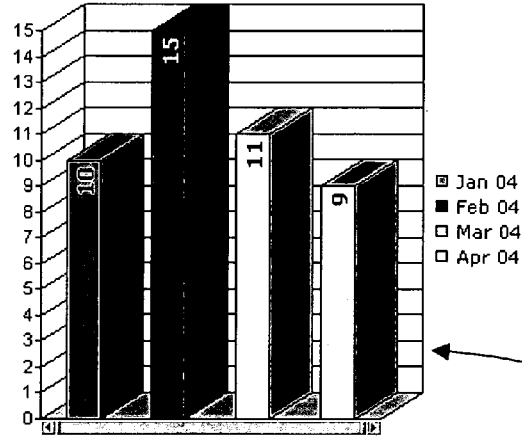
FIG. 5E is an illustration of an exemplary "Case Load Analysis" section of a Judicial Strategic Profile report.

The Case Load Analysis report section 392 (FIG. 5E) groups the cases in the set by either year or month, providing an indication of the distribution of work over time. The chart 392a and accompanying graph 392b display counts and corresponding percentages.

The Attorney Appearance Analysis report section 393 (FIG. 5F) is a particularly useful table 393a indicating how many times each attorney has appeared before the judge. Each attorney name is a hyperlink. Clicking on an attorney name will regenerate a report for the cases related to the particular attorney only. There is no chart associated with this table. An alternate embodiment of table 393a is filterable according to parameters identified in drop-down menus 393b provided in at least some of the columns (as illustrated in FIG. 5O, the Attorney Name and LawFirm columns).

Figure 5G:
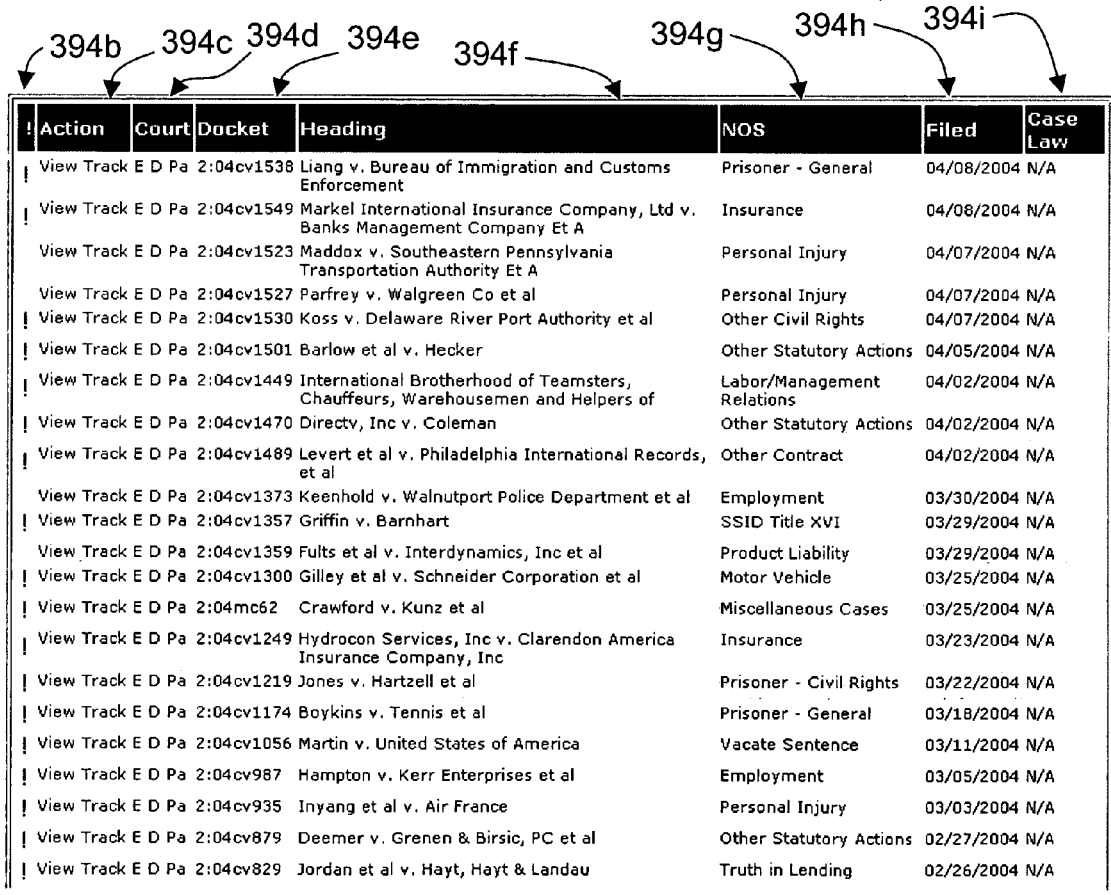
FIG. 5G is an illustration of an exemplary "Case Listing" section of a Judicial Strategic Profile report, displaying a tabular listing of the cases included in the report (or report drill down).

The final report section, the Case Listing report section 394 (FIG. 5G) is a tabular listing 394a of the cases included in the report (or report drill down). These are the set of cases initially selected by query that meet the specific criteria as defined by the user. When the user clicks on either a Nature of Suit description and/or an Attorney, the case set is limited by this additional parameter. The case set is presented as a table only (no chart). The columns that can be displayed on this table are as follows:

(!) Attorney warning flag 394b—If an "!" appears this means that defense counsel has not yet been assigned for the litigant in the case.

Action 394c—The user may click on a "View" case link to display the full case docket and/or a "Track" case link that will alert the user to any new case developments.

Court 394d—The court where the case was filed.

Docket 394e—The case docket number.

Heading 394f—The name of the case (e.g. Jones vs. Smith)

NOS 394g—The Nature of Suit (or type) of the case.

Filed 394h—The date the case was initially filed

Case Law 394i—If a reference appears in this column then it indicates that the case has been closed and that there are case law materials available on, for example, Lexis.com. Clicking on the reference will direct the user to this material.

At least some, and preferably all columns of the tabular case listing 394a are sortable. In addition, the user can customize the tabular case listing 394a by adding or removing columns, specifying the number of items shown on a page, and setting default sorting options, as discussed hereinafter. An alternate embodiment of table 394a is filterable according to parameters identified in drop-down menus 394j provided in at least some of the columns (as illustrated in FIG. 5P, the Court and NOS columns).

Figure 5H:
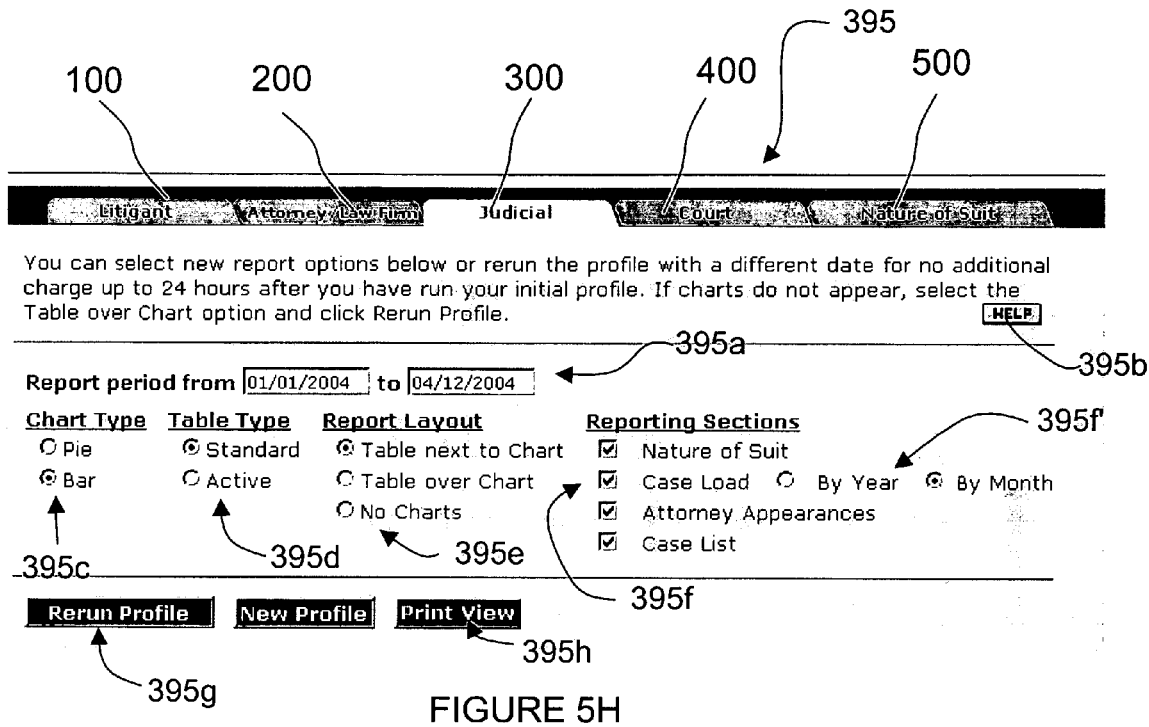
FIG. 5H is an illustration of an exemplary Input Form section of a Judicial Strategic Profile report.

The Case Listing section 394 is the final report section of the Judicial Strategic Profile. Immediately following this section is an input form 395 (FIG. 5H) that allows the user to (1) switch to a different type of Strategic Profile (by clicking on a different one of tabs 100, 200, 300, 400, and 500), (2) change the reporting dates for the current Judicial Strategic Profile (information fields 395a), (3) obtain product help (help button 395b), (4) change the chart type from pie charts to bar charts (or vice versa) (radio buttons 395c), (5) indicate whether the report tables should be active (meaning that report tables can be interactively sorted and filtered) (radio buttons 395d) in the implementation in which a java applet is used to allow sorting and filtering, (6) indicate the placement of charts in relation to tables (to the side, below, or suppressed) (radio buttons 395e), (7) indicate which of the four report sections should be displayed (check boxes 395f), or (8) indicate if the Case Load Analysis report section should be aggregated by month or year (radio buttons 395f). The user can select the level of customization he or she requires and click the "Rerun Profile" button (395g) to create a modified report.

Figure 5I:
FIG. 5I is an illustration of an exemplary "Parameters" or Report Criteria section of a Judicial Strategic Profile.
Figure 5J:
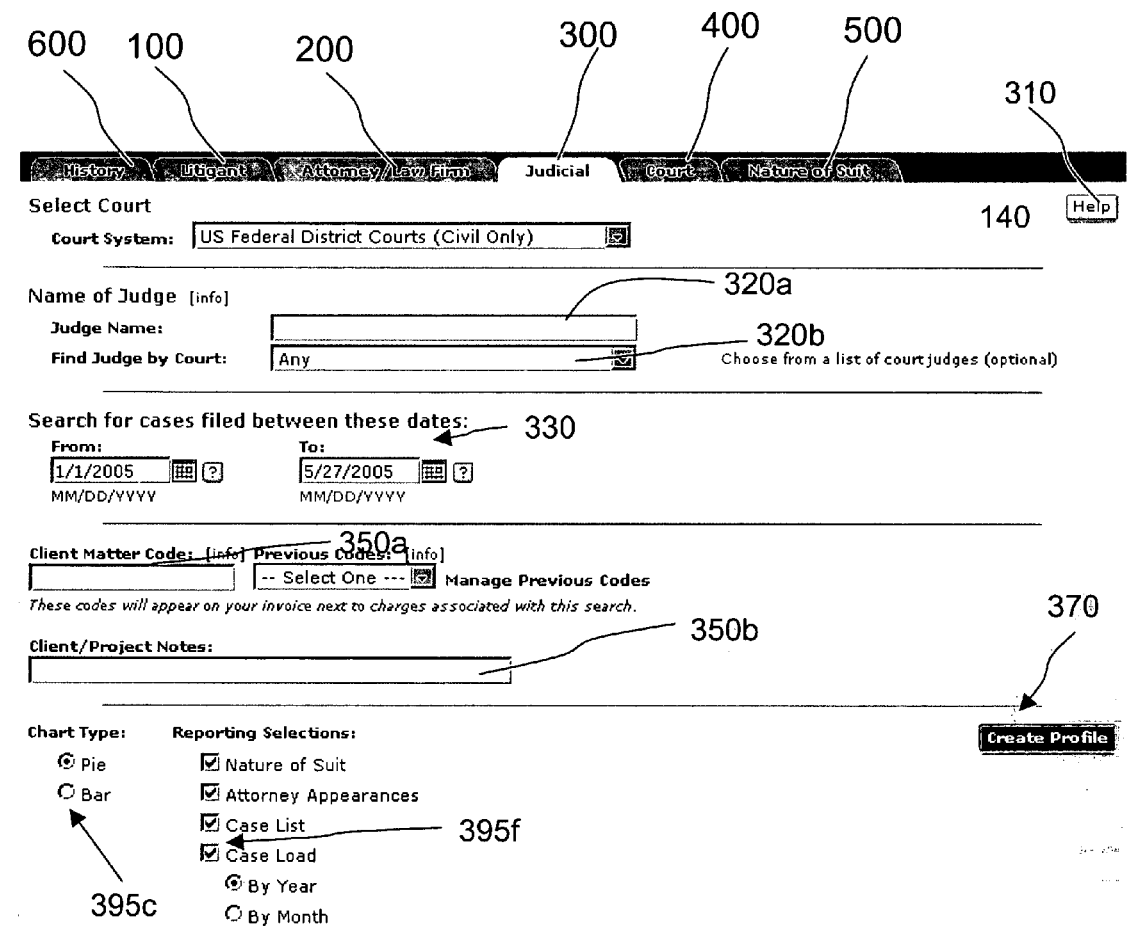
Figure 5N:
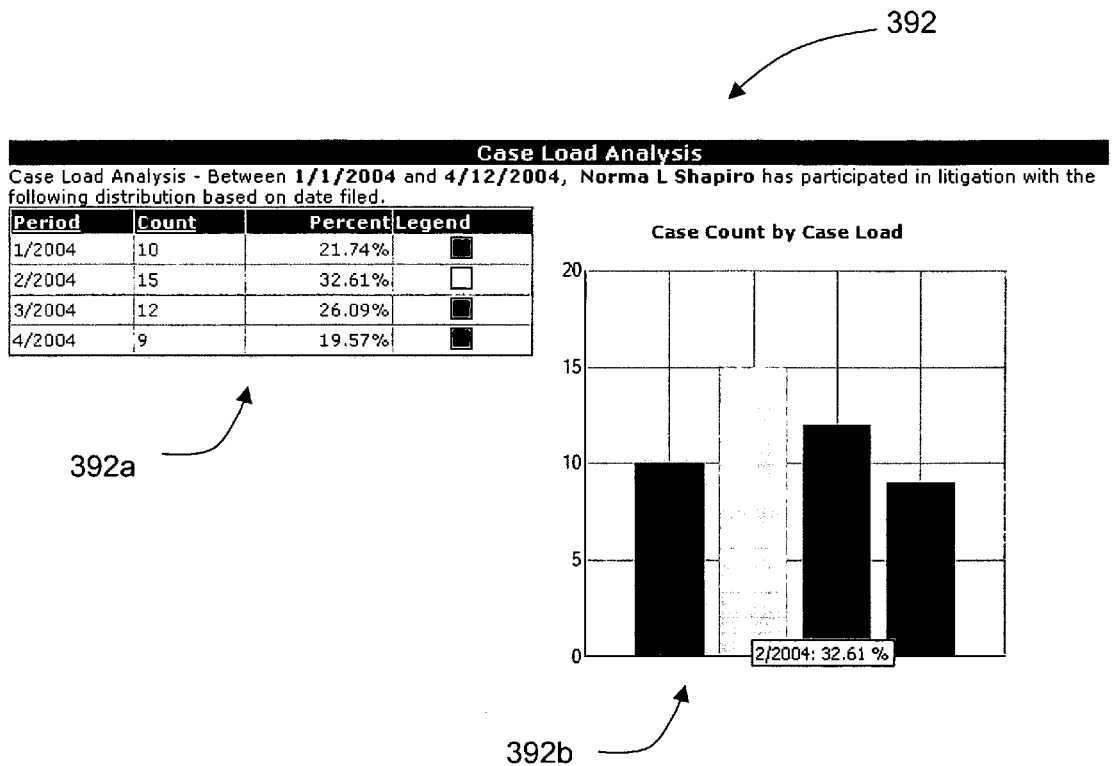
FIG. 5N is an illustration of an alternate embodiment of the report section of FIG. 5E.

In an alternate embodiment, illustrated in FIG. 5Q, the 395d Table Type option 395d and the Report Layout option 395e are omitted, in favor of making all tables active (for example, as shown in FIG. 5P), and fixing the report layout as "Table next to Chart" (for example, as shown in FIG. 5N). The segments of the pie chart or the bars of the bar chart preferably are displayed in unique colors. A color key can be provided as a separate column of the corresponding table. "Mousing over" a segment of a pie chart or a bar of a bar chart displays the data, for example 194c' in FIG. 3U, represented by the segment or the bar.

Should the user desire a printable copy of the report (one without header graphics or the bottom input form), he or she can click the "Print View" button (395h). A new browser window (not shown) will be opened which will accommodate this request. A report also can be generated to a data file (for example, button 395i, a PDF file), to allow the report to be saved and to be sent to others.

At the very bottom of the report is a Parameter or Report Criteria section 396 (FIG. 5I) that recaps the input parameters used to generate the report. These include judge name and court(s) as well as the range of dates used to qualify cases. An alternate embodiment of the Parameter section 396, using a different format, is illustrated in FIG. 5R.

Data required to reproduce this Judicial Strategic Profile are stored in a database table and are displayed as an option the next time the user runs a Judicial Strategic Profile.

Judicial Strategic Profiles are unique in the way that they aggregate specific case information related to a specific judge, allowing a litigator (or others) the opportunity to quickly see the types of cases that the judge has ruled on, as well as the listing of attorneys who have appeared before the judge. Law firms can use Judicial Strategic Profiles as part of their litigation preparation and research activities. Researching rulings by the judge on prior cases and the judge's dealing with counsel can provide valuable insight into developing litigation strategies.

Court Strategic Profile

Figure 6A:
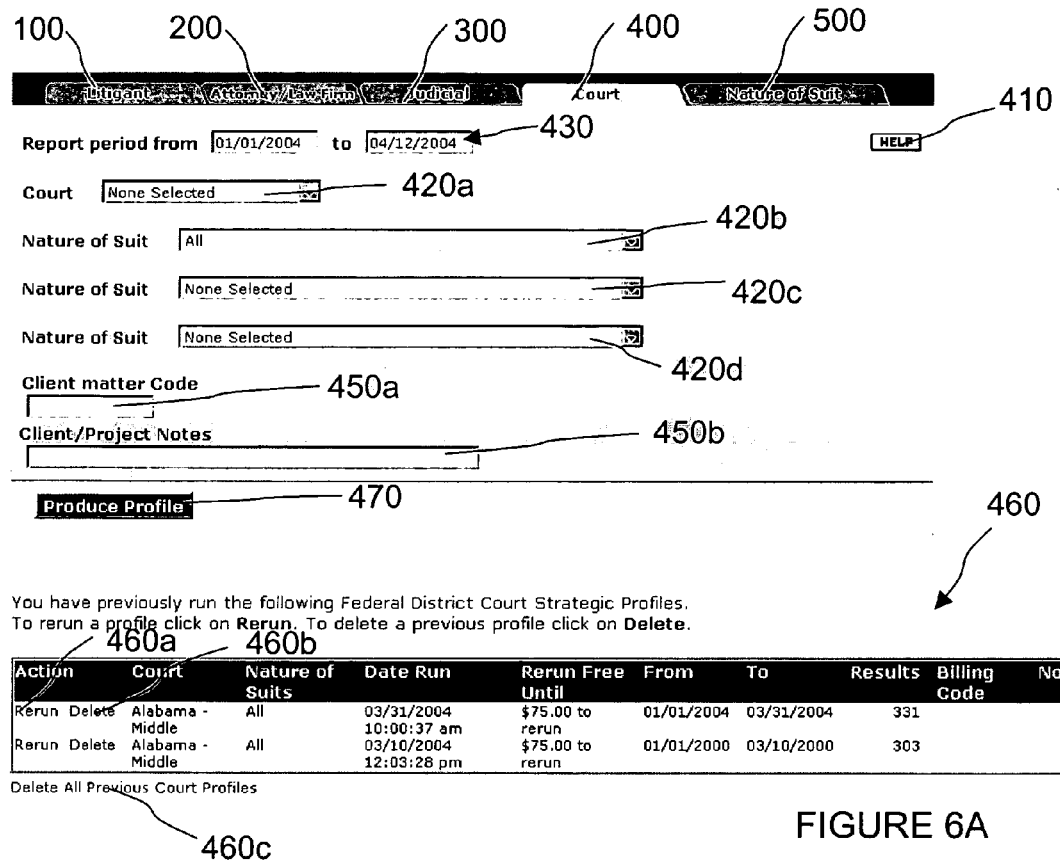
FIG. 6A is an illustration of an exemplary Court Strategic Profile main screen.

Upon selecting Court Strategic Profile, the user is presented with a screen as depicted in FIG. 6A. The user may link back to the Strategic Profile menu or link to other LexisNexis Courtlink services by clicking on appropriate links (not shown). The user may click on the "Help" button 410 to receive detailed instructions and report samples. The user may click on any of the four other Strategic Profile tabs 100, 200, 300, or 500 to create a report of the specified type.

The central portion of the screen contains input fields 420a-420d where the user must specify the parameters used to generate a specific Court Strategic Profile. The user must specify a date range 430 for reporting purposes. This date range indicates the dates between which cases will be investigated that were filed in the specified court. Cases with an initial filing date outside this range will not be considered. The user may then enter a court in the input field 420a and may then optionally enter up to a predetermined number of Nature of Suit classifications in the input fields 420b-420d in order to restrict the case set further (in the exemplary screen illustrated in FIG. 6A, the number of Nature of Suit classifications is three). The user may elect to enter a "Client Matter Code" in input field 450a, useful for aggregating direct fees to be handled by the user's own internal billing system. The second field 450b, labeled "Client Notes," allows the user to make a free form notation regarding the particular Strategic Profile to be generated. In an alternate embodiment, illustrated in FIG. 6F, before choosing a court from the input field 420a, the user selects between multiple radio buttons 420e to specify the type of court (e.g. a US District court or a State Court) for which the Strategic Profile report is to be prepared.

Each time a Court Strategic Profile is generated, a record is entered in a Court database table. The bottom portion 460 of the input screen displays all of the Court Strategic Profiles previously run by the user. The user may elect to rerun any of these prior reports by clicking on the "Rerun" link 460a or to delete any of these saved records by clicking on the "Delete" link 460b. At the very bottom of the screen is a link 460c that allows for the deletion of all previously saved records.

In an alternate embodiment, illustrated in FIG. 6F, the user is allowed to select the Chart Type (for example, using radio buttons 493c) and the Reporting Period (for example, using radio buttons 493f) before running the initial report.

Figure 6B:
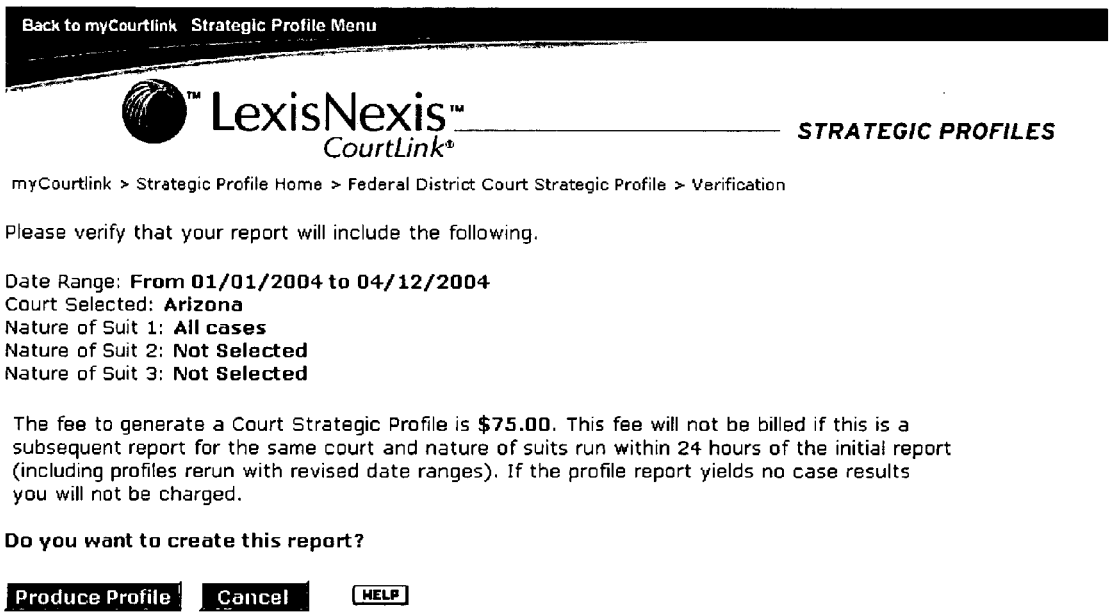
FIG. 6B is an illustration of an exemplary Court Strategic Profile verification screen confirming user selections of courts and/or nature of suit descriptions.

Clicking on the "Produce Profile" button 470 begins the reporting process. The first step produces a screen that verifies the user selections (FIG. 6B). The user may elect to produce the report or cancel by clicking on the appropriate button. An alternate embodiment of the verification screen using a different format is illustrated in FIG. 6G.

Figure 6C:
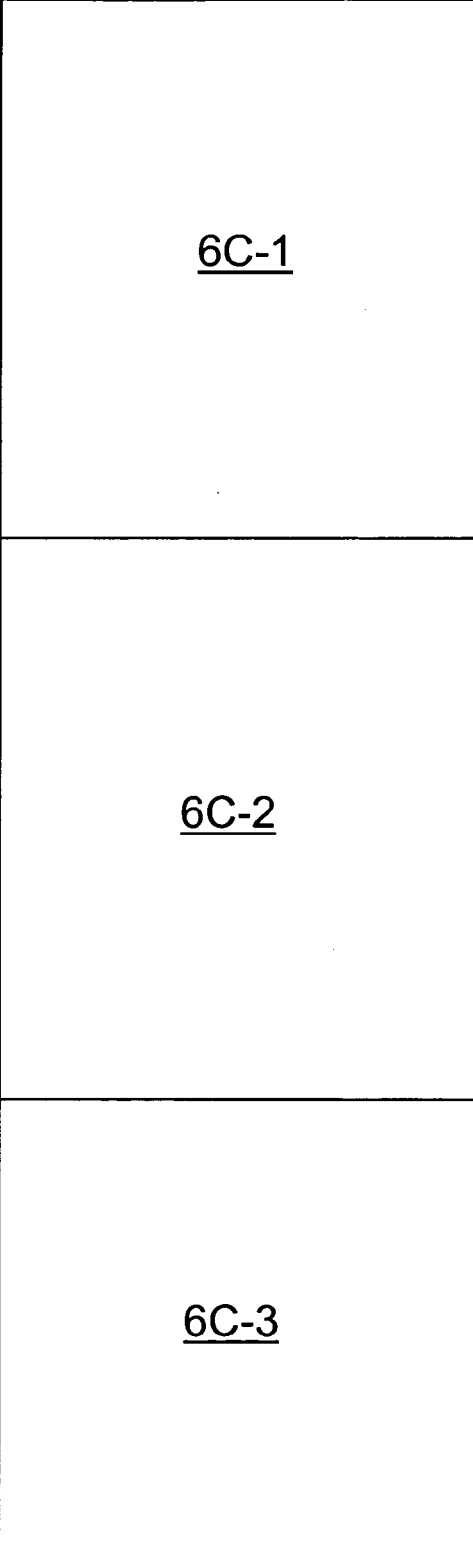
FIG. 6C shows the arrangement of FIGS. 6C-1, 6C-2, and 6C-3, which together illustrate an exemplary "Total Number of Cases Filed" section of a Court Strategic Profile report where multiple Nature of Suit descriptions are specified. An alternate embodiment for the exemplary "Total Number of Cases Filed" section is illustrated in FIG. 6H, which shows the arrangement of 6H-1 and 6H-2. 6H-2 combines both the chart and the table that were separately displayed in 6C-2 and 6C-3.
Figures 1, 6C:
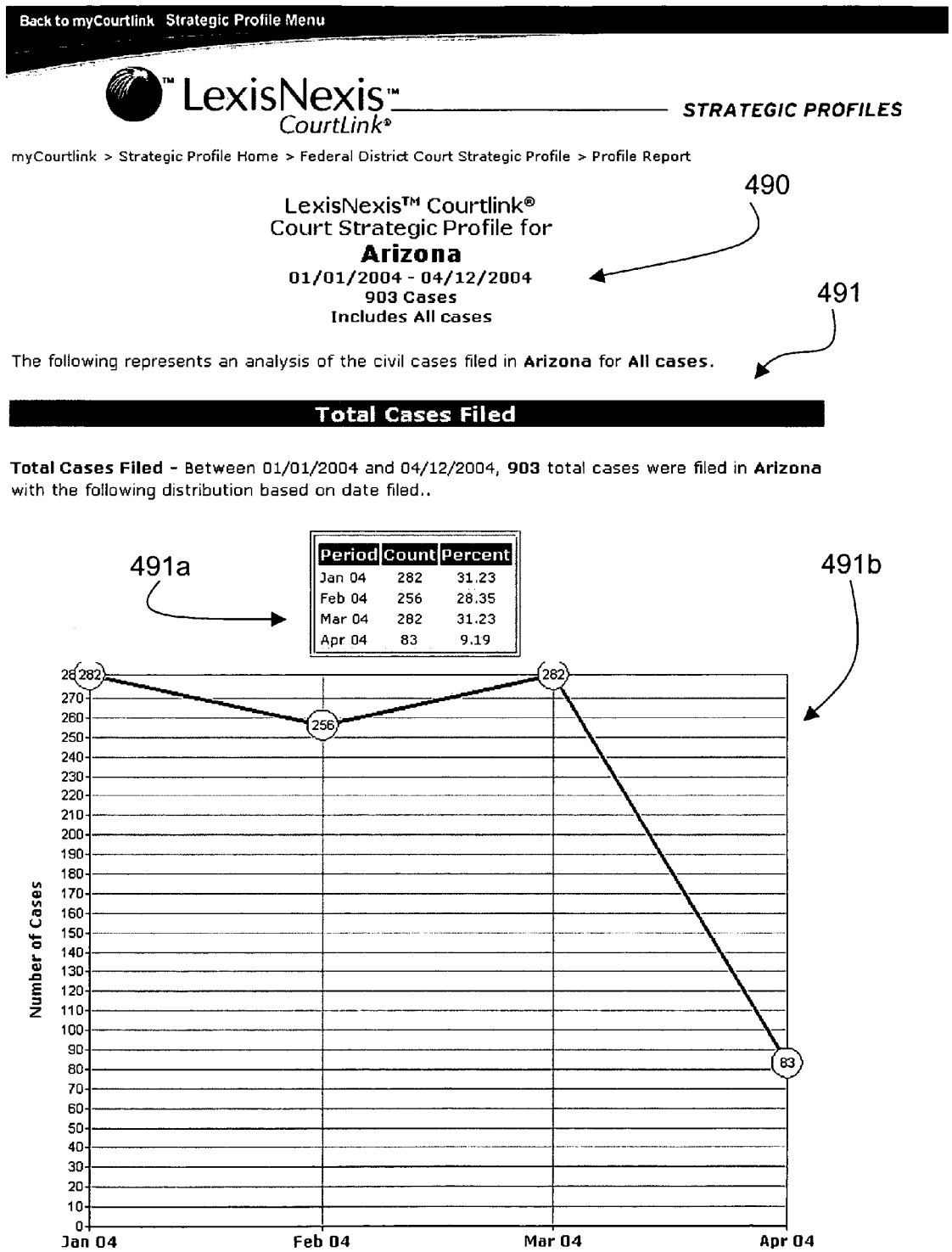
Figures 3, 6C:
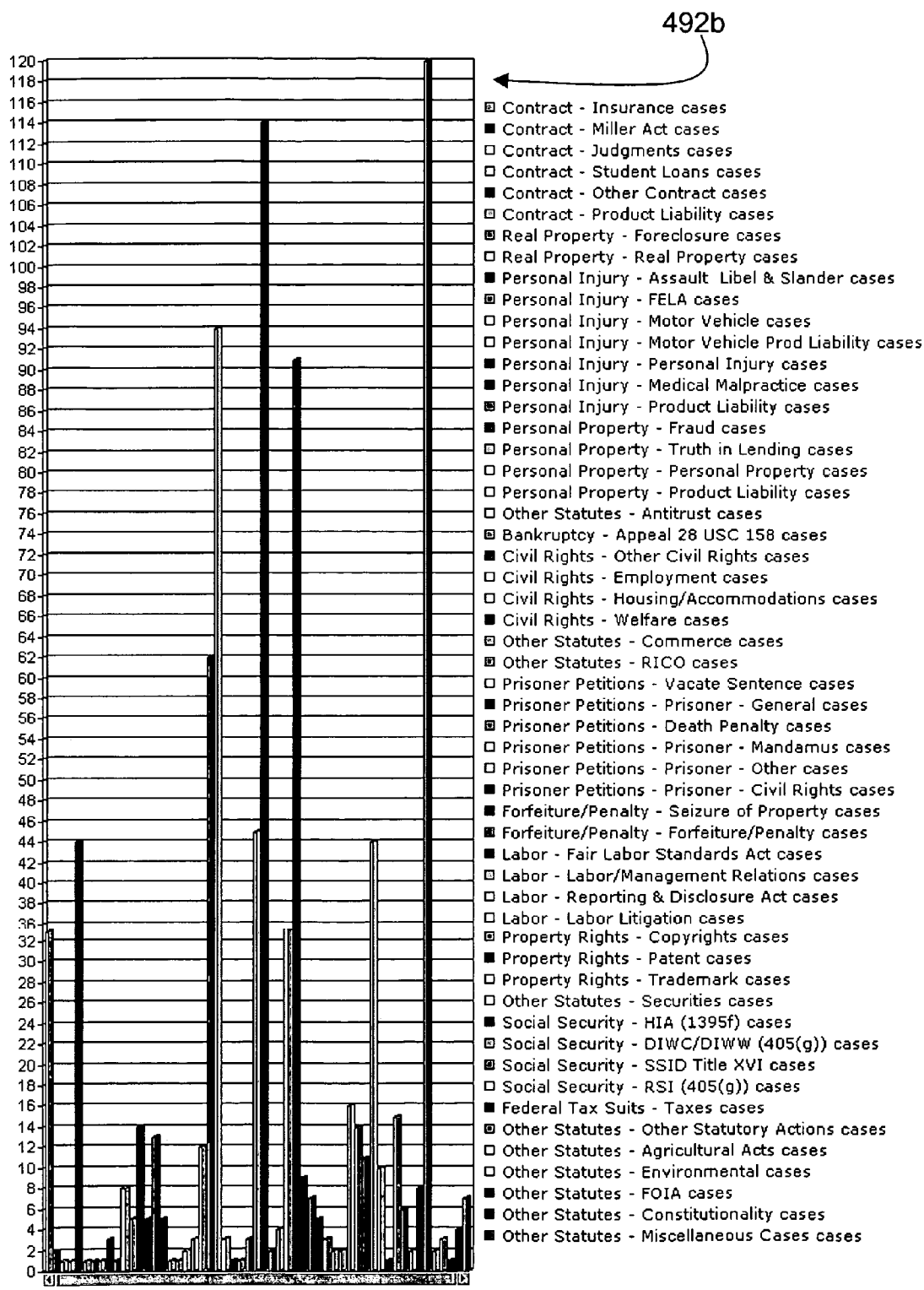
Figure 6D:
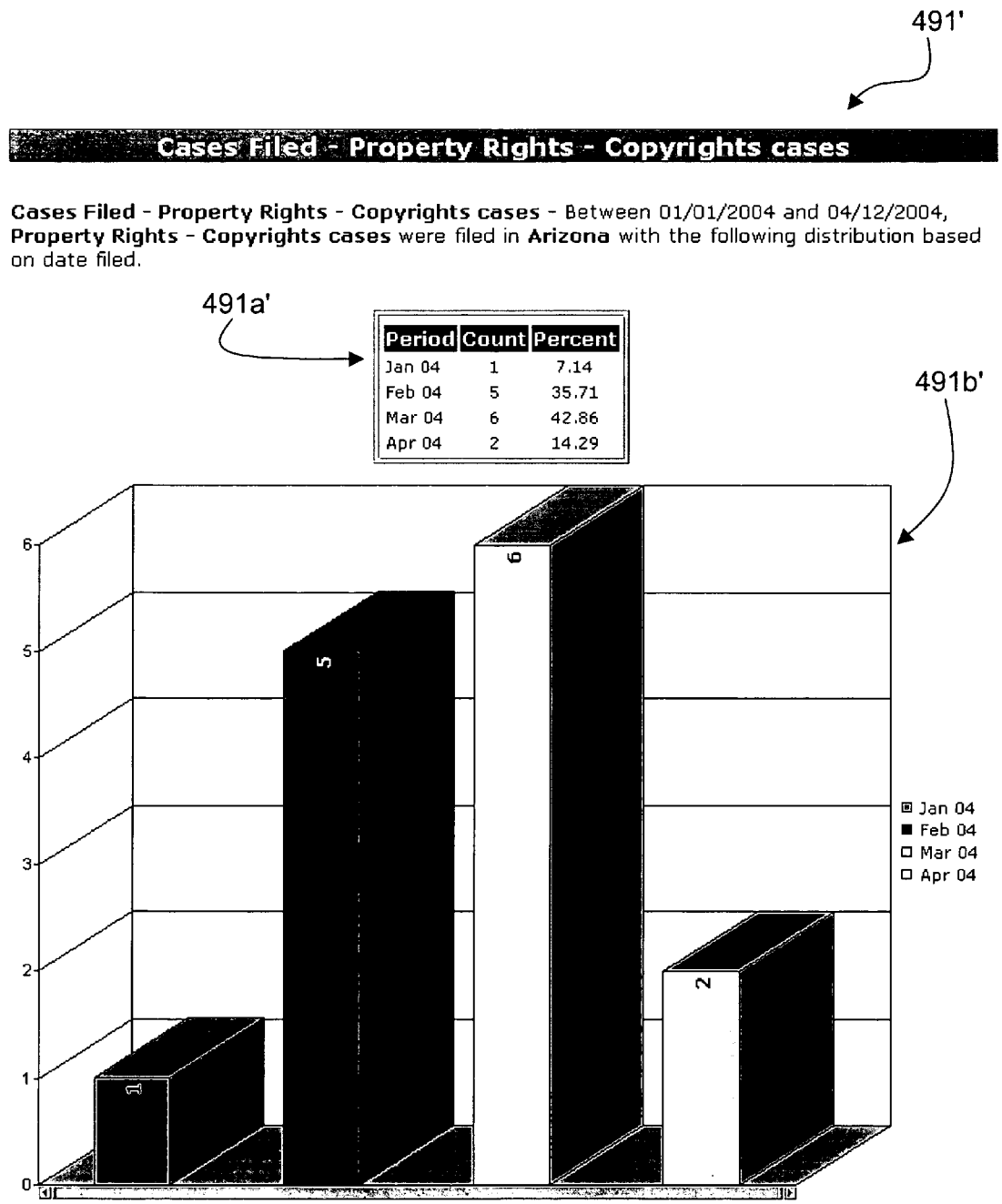
FIG. 6D is an illustration of an exemplary "Nature of Suit" section of a Court Strategic Profile report where a single Nature of Suit description is specified.

The Court Strategic Profile report takes on a slightly different appearance depending on the options selected. If all Nature of Suit descriptions are included (e.g. no specific Nature of Suit description was specified), then the report will initially display a report heading 490 showing the name of the court, the dates the report covered, and the count of cases discovered, followed by a Total Cases Filed report section 491 that displays a table 491a for the total number of cases filed in the court by time period (either by month or by year) with an accompanying bar or line chart 491b (FIG. 6C-1). Following this section is a report section 492 that displays the number of cases filed by each Nature of Suit across the entire time period as a table 492a (FIG. 6C-2) and as a corresponding graph 492b (FIG. 6C-3). If two or three Nature of Suit descriptions are specified from the initial input form, the report will first display the Total Cases filed across all selected Nature of Suit classifications followed by individual tables for the count of cases filed for each Nature of Suit in the court. If one Nature of Suit classification is selected, then the report 491' is simply one table 491a' displaying the count of cases for the selected Nature of Suit in the specified court and a corresponding graph 491b' (FIG. 6D).

Figure 6E:
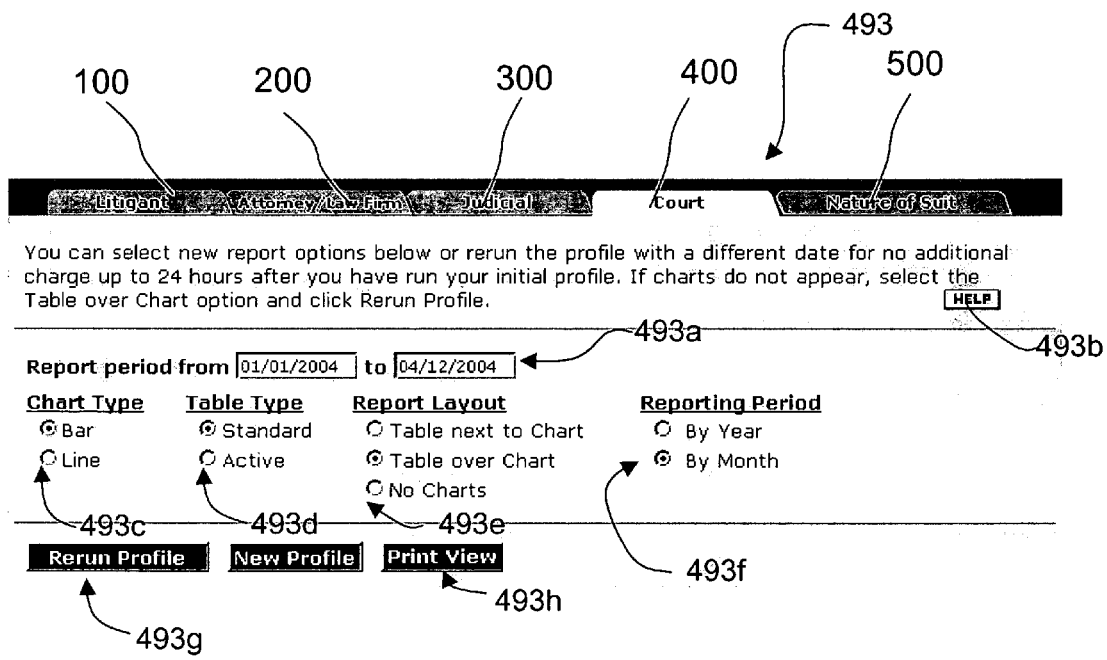
FIG. 6E is an illustration of an exemplary Court Strategic Profile Input Form.

At the bottom of the report is an input form 493 (FIG. 6E) that allows the user to (1) switch to a different type of Strategic Profile (by clicking on a different one of the tabs 100, 200, 300, 400, and 500), (2) change the reporting dates for the current Court Strategic Profile (information fields 493a), (3) obtain product help (help button 493b), (4) change the chart type from bar charts to line charts (or vice versa) (radio buttons 493c), (5) indicate whether the report tables should be active (meaning that report tables can be interactively sorted and filtered) (radio buttons 493*d*) in the implementation in which a java applet is used to allow sorting and filtering, (6) indicate the placement of charts in relation to tables, (to the side, below, or suppressed) (radio buttons 493*e*), or (7) indicate if the reporting period should be aggregated by month or year (radio buttons 493*f*). The user can select the level of customization he or she requires and click the "Rerun Profile" button 493*g* to create a modified report. Should the user desire a printable copy of the report (one without header graphics or the bottom input form), he or she can click the "Print View" button 493*h*. A new browser window (not shown) will be opened that will accommodate this request.

Figure 6H:
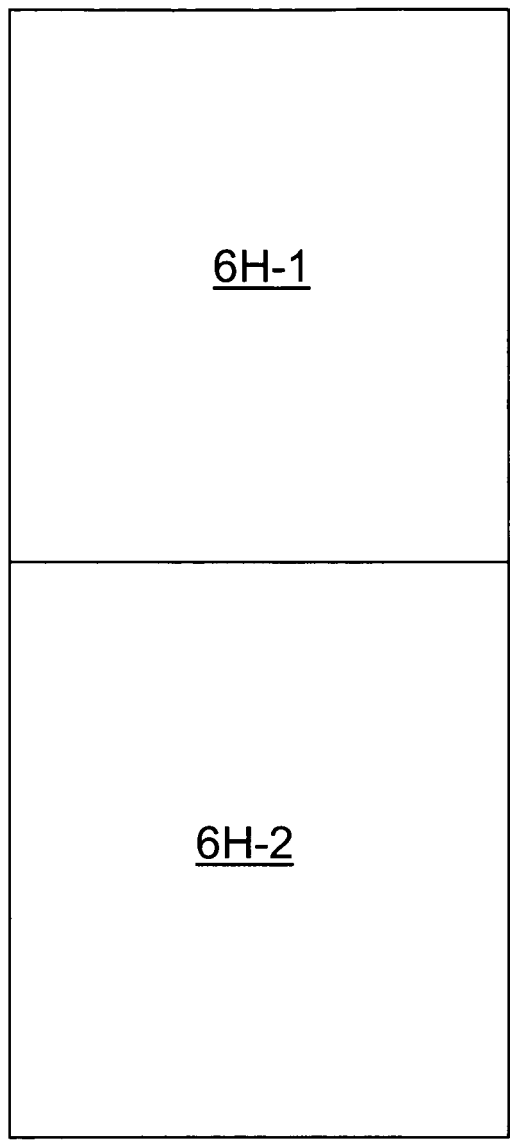
FIG. 6H shows the arrangement of FIGS. 6H-1 and 6H-2, which together are an illustration of an alternate embodiment of the report section of FIGS. 6C-1, 6C-2, and 6C-3.
Figures 1, 6H:
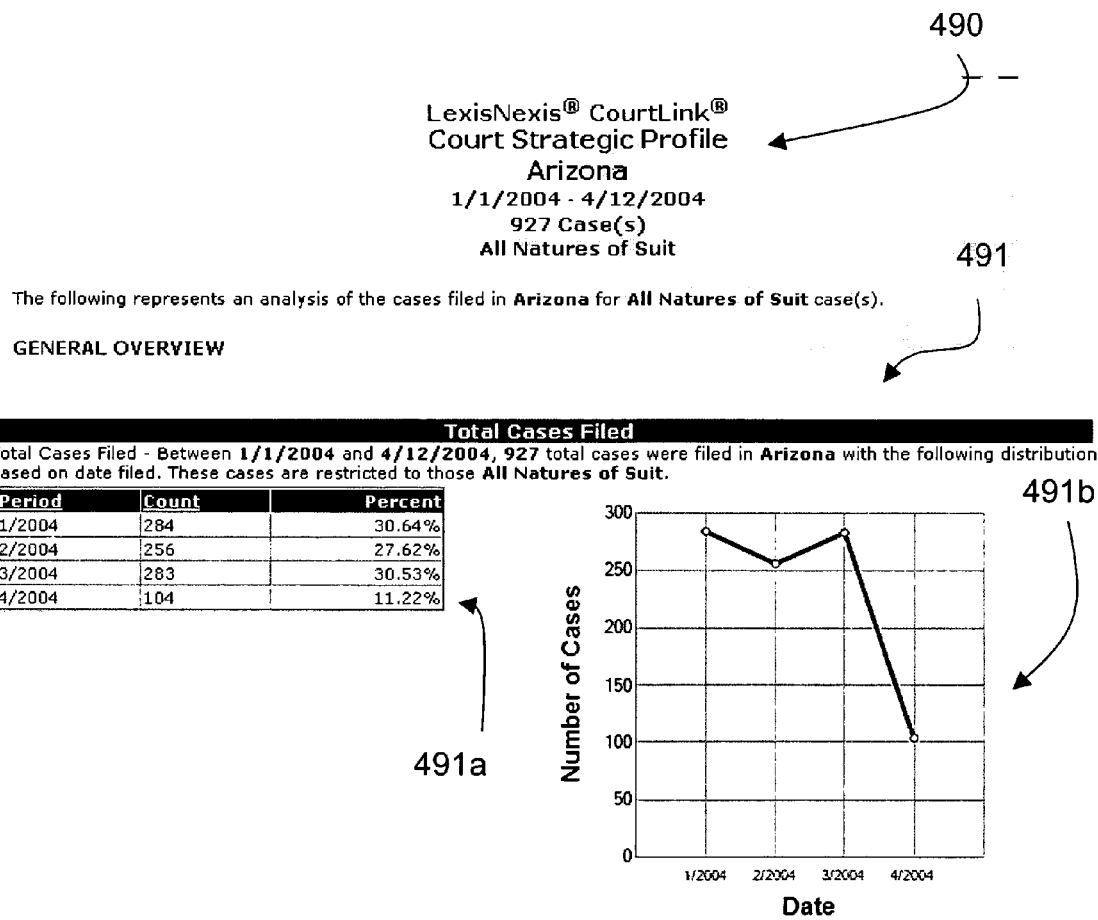
Figures 2, 6H:
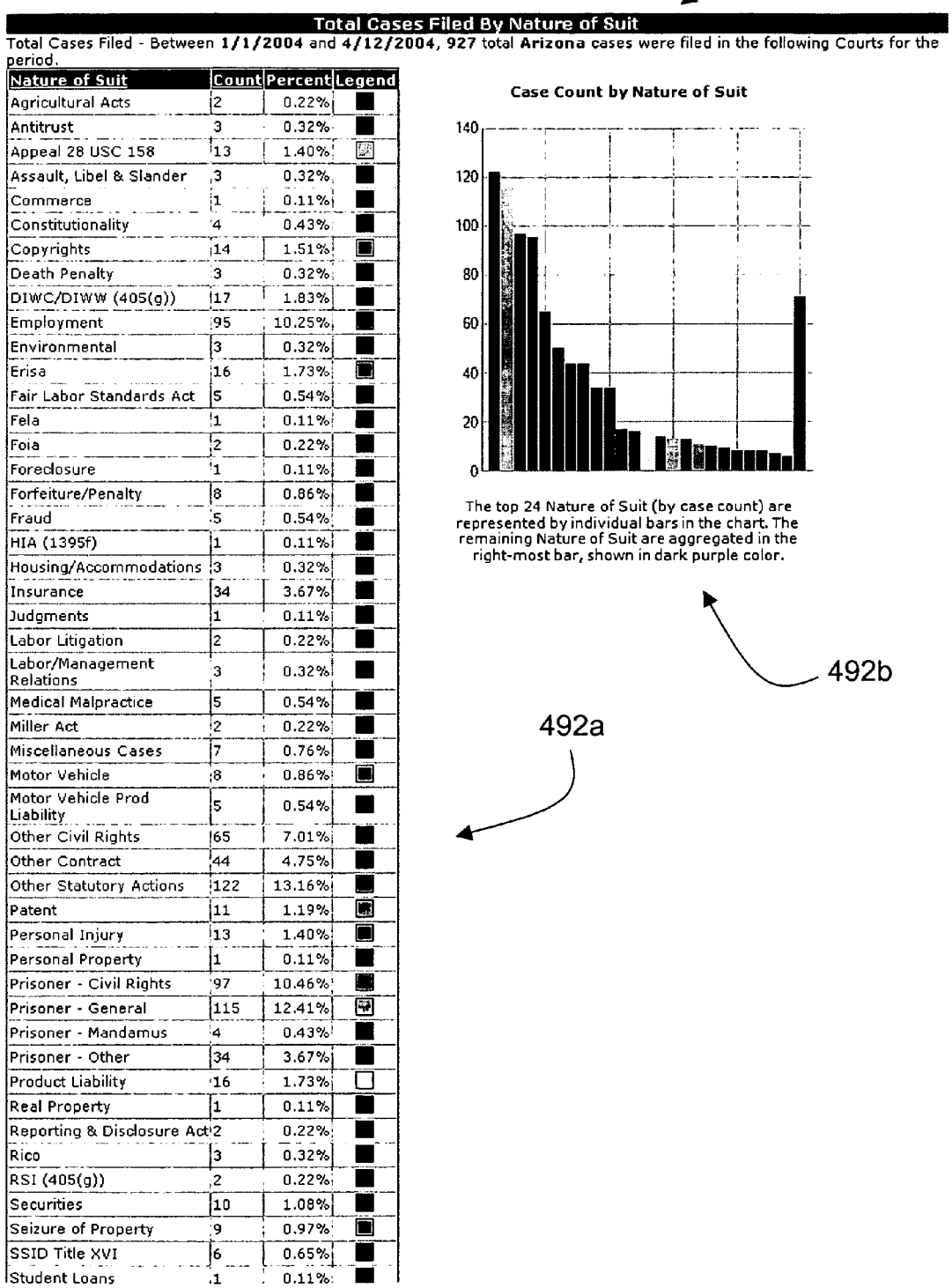

In an alternate embodiment, illustrated in FIG. 6J, the Table Type option 493*d* and the Report Layout option 493*e* are removed, in favor of making all tables active, and fixing the report layout as "Table next to Chart" (see, for example, FIG. 6H-2). A report also can be generated to a data file (in the example of button 493*i*, a PDF file), to allow the report to be saved and to be sent to others.

Data required to reproduce this Court Strategic Profile are stored in a database table and are displayed as an option the next time the user runs a Court Strategic Profile.

Court Strategic Profiles are run primarily to gauge the level of activity in certain courts for specific case types. A law firm can use this trend data to better allocate firm resources both geographically and by practice area. Others, especially the media, use this report to research litigation trends.

Nature of Suit Strategic Profile

Figure 7A:
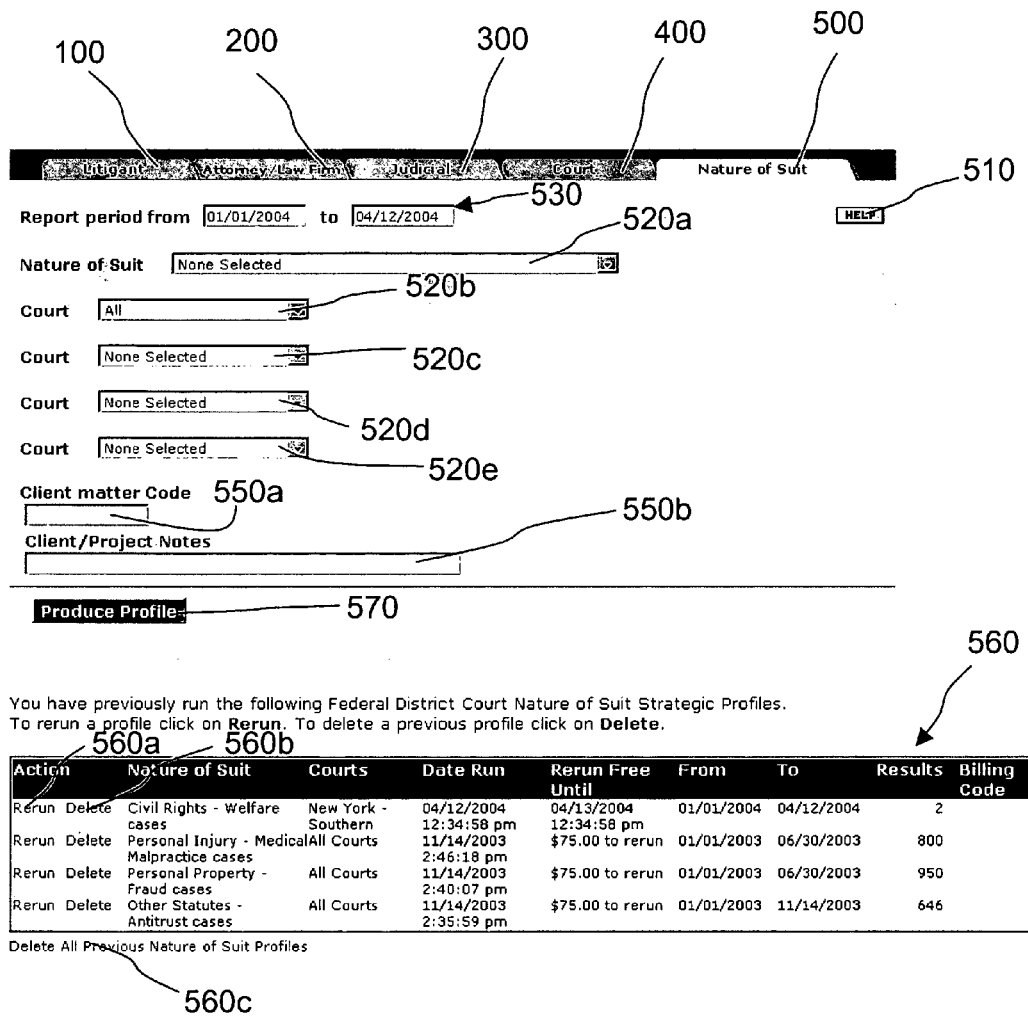
FIG. 7A is an illustration of an exemplary Nature of Suit Strategic Profile initial parameter input screen.

Upon selecting Nature of Suit Strategic Profile 500, the user is presented with a screen as depicted in FIG. 7A. The user may link back to the Strategic Profile menu or link to other online legal services, for example, other LexisNexis Courtlink services, by clicking on appropriate links (not shown). The user may click on the "Help" button 510 to receive detailed instructions and report samples. The user may click on any of the four other Strategic Profile tabs 100, 200, 300, or 400 to create a report of the specified type.

The central portion of the screen contains input fields 520*a*-520*e* where the user must specify the parameters used to generate a specific Nature of Suit Strategic Profile. The user must specify a date range 530 for reporting purposes. This date range indicates the dates between which cases will be investigated that were filed in the specified court. Cases with an initial filing date outside this range will not be considered. The user must then select a Nature of Suit description from a dropdown list 520*a*. The user may then optionally select none or up to a pre-determined number of Courts in the input fields 520*b*-520*e* for reporting (in the exemplary screen illustrated in FIG. 7A, the number of Courts is four). The user may elect to enter a "Client Matter Code" (input field 550*a*), useful for aggregating direct fees to be handled in by the user's own internal billing system. The second field 550*b*, labeled "Client Notes," allows the user to make a free form notation regarding the particular Strategic Profile to be generated.

Each time a Nature of Suit Strategic Profile is generated, a record is entered in a database table that is associated with the running of Nature of Suit Strategic Profiles and records the fact that a specific user has run a specific report, so that should the user desire, he or she can rerun the report again at a later date with the same parameters. The bottom portion 560 of the input screen displays all of the Nature of Suit Strategic Profiles previously run by the user. The user may elect to rerun any of these prior reports by clicking on the "Rerun" link 560*a* or to delete any of these saved records by clicking on the "Delete" link 560*b*. At the very bottom of the screen is a link 560*c* that allows for the deletion of all previously saved records.

In an alternate embodiment, the user is allowed to select the Chart Type (using, for example, radio buttons 593*c*) and the Reporting Period (using, for example, radio buttons 593*f*) before running the initial report, as illustrated in FIG. 7N.

Figure 7B:
FIG. 7B is an illustration of an exemplary Nature of Suit Strategic Profile verification screen confirming user selection of nature of suit.

Clicking on the "Produce Profile" button 570 begins the reporting process. As a first step, the program produces a screen that verifies the user selections (FIG. 7B). The user may elect to produce the report or cancel by clicking on the appropriate button. An alternate embodiment of the verification screen using a different format is illustrated in FIG. 7O.

Figure 7C:
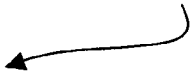
FIGS. 7C, 7D, and 7E are illustrations of exemplary headings of a Nature of Suit Strategic Profile for all, two, and one specified courts, respectively, showing the nature of suit description, the dates the report covers, the count of cases discovered, and the specified court or courts.
Figure 7D:
Figure 7E:

A report heading 590 is displayed showing the Nature of Suit (case type), the dates and courts the report covers, and the count of cases discovered. FIGS. 7C, 7D, and 7E, respectively illustrate exemplary headings for reports in which all, one, and two courts are specified. Alternate embodiments of these three figures with the same information but a different format are illustrated by FIGS. 7P, 7Q, and 7R.

Figure 7F:
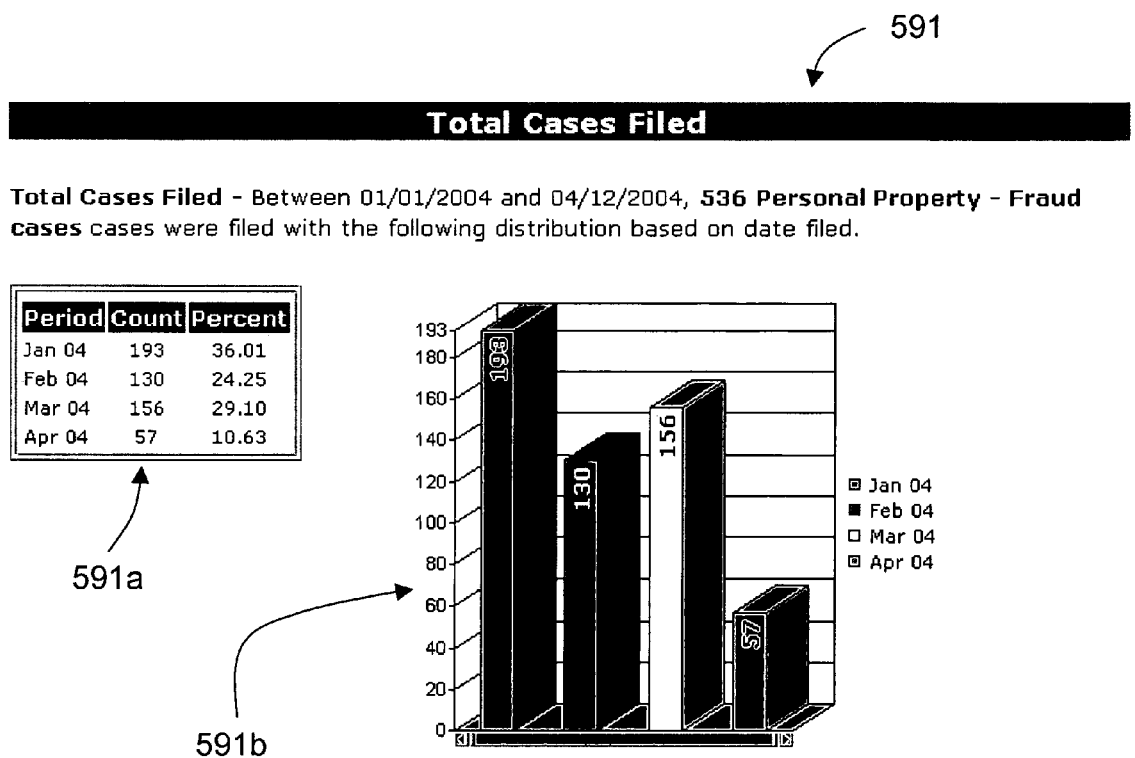
FIG. 7F is an illustration of an exemplary "Total Number of Cases Filed" section of a Nature of Suit Strategic Profile report for all Courts, in which all Courts are selected.
Figure 7H:
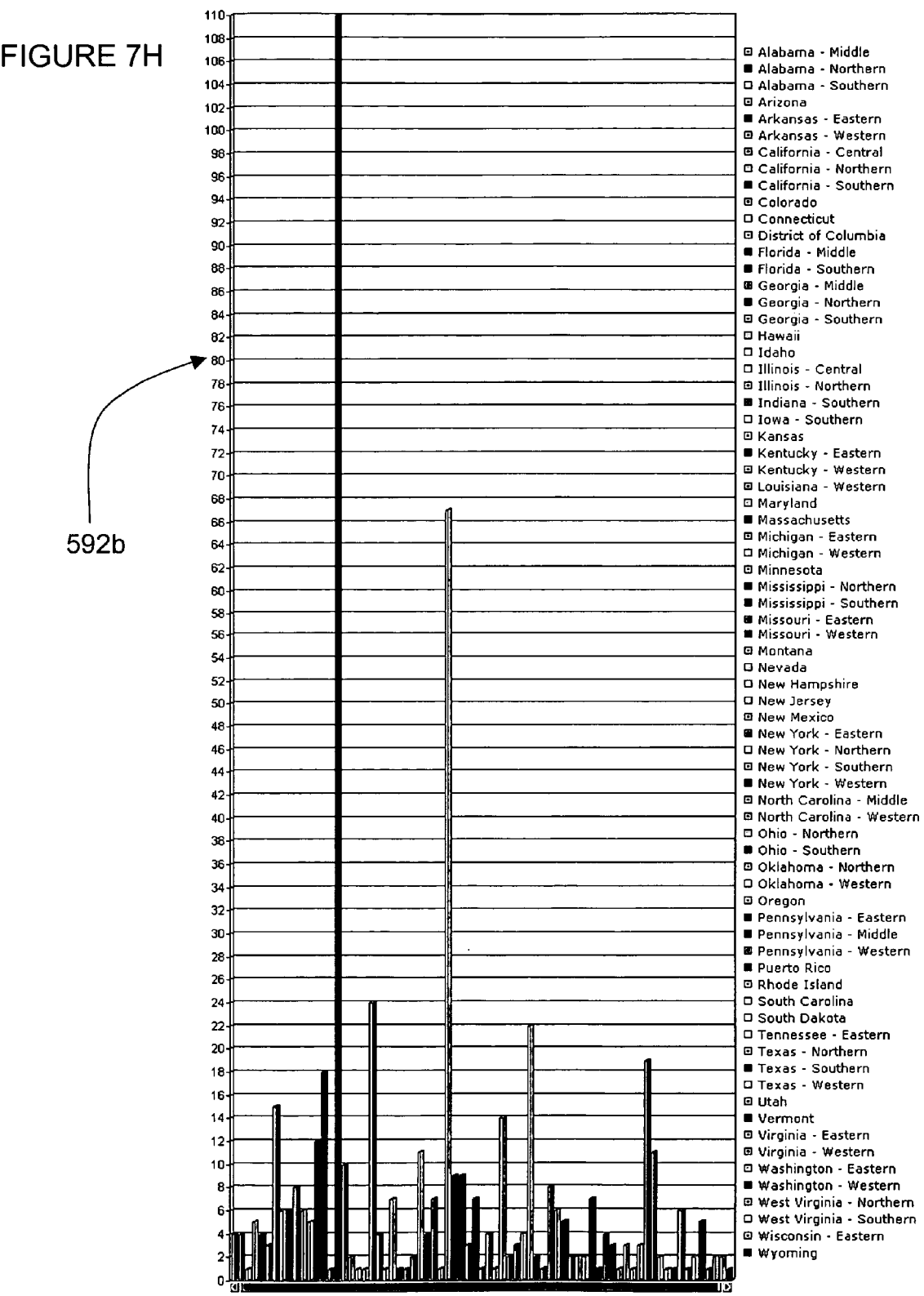

The Nature of Suit Strategic Profile report takes on a slightly different appearance depending on the options selected. If all Courts are included for a specified Nature of Suit, the report will initially display a Total Cases Filed section 591 with a table 591*a* and chart 591*b* (FIG. 7F) for the total number of cases filed in the Nature of Suit by time period (either by month or by year). This section is next followed by a Total Cases Filed By Court section 592 with a table 592*a* (FIG. 7G) and a chart 592*b* (FIG. 7H) showing the distribution of these cases across all courts. The accompanying charts can be either bar or line as specified by the user.

Figure 7I:
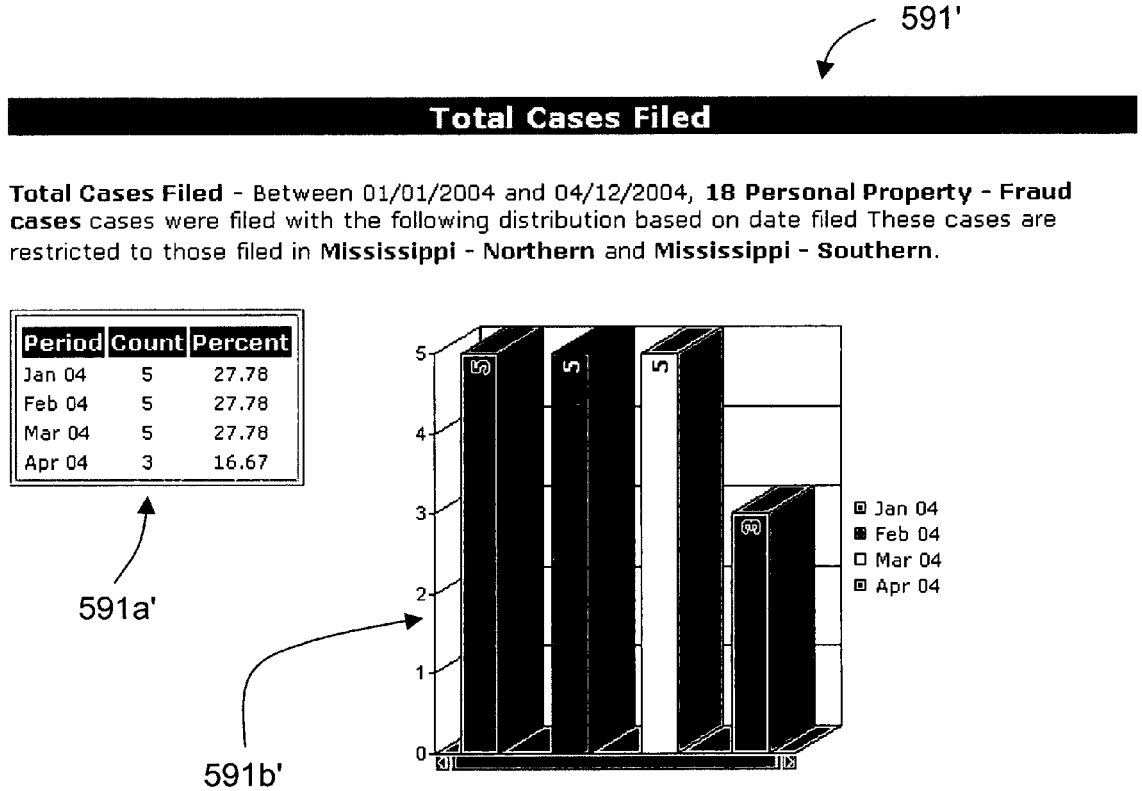
FIG. 7I is an illustration of an exemplary "Total Number of Cases Filed" section of a Nature of Suit Strategic Profile report for all Courts, in which two Courts are selected.
Figure 7J:
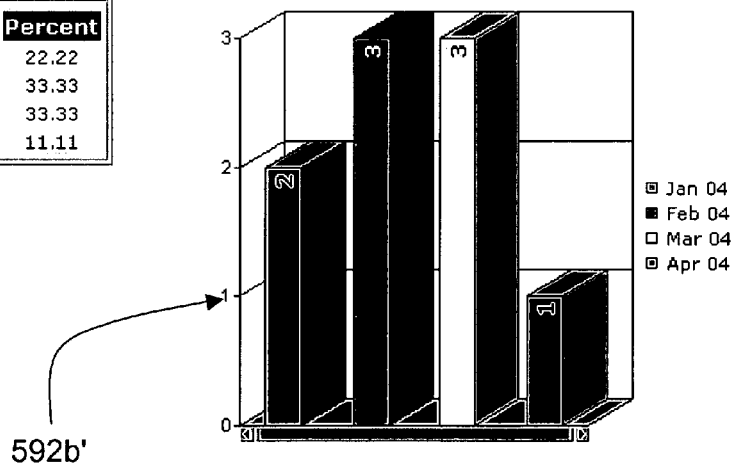
FIGS. 7J and 7K are illustrations of exemplary "Total Number of Cases Filed" sections of a Nature of Suit Strategic Profile report for each Court, in which two Courts are selected.
Figure 7K:
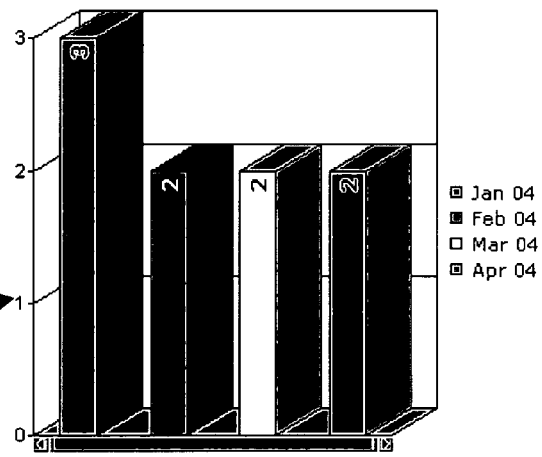
Figure 7S:
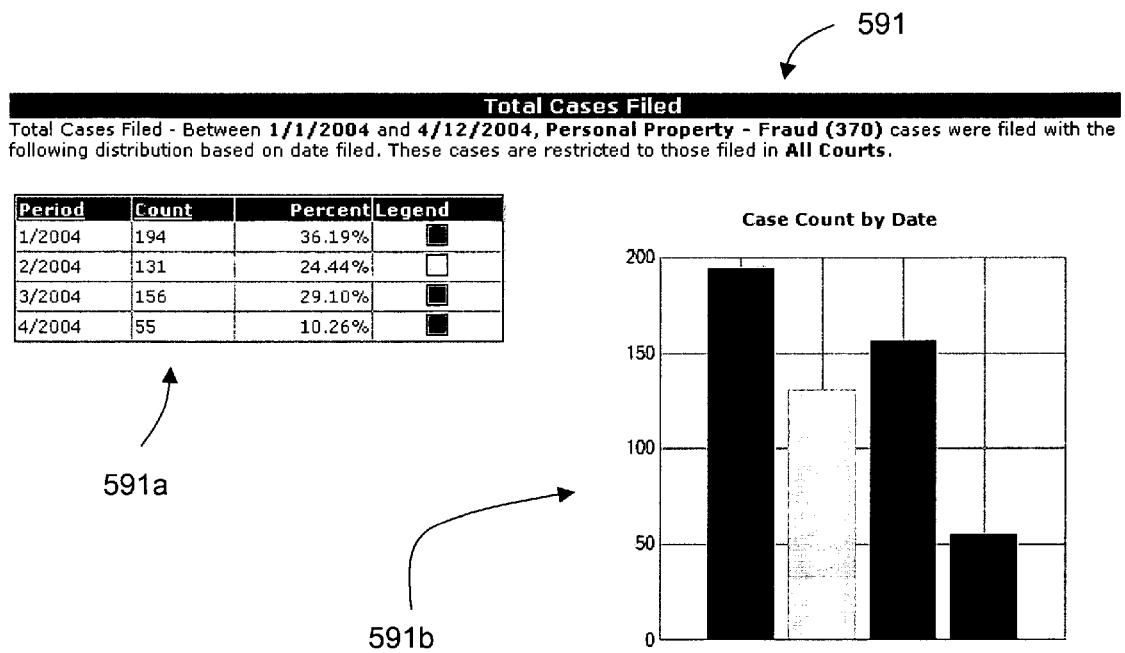
FIG. 7S is an illustration of an alternate embodiment of the report section of FIG. 7F.
Figure 7U:
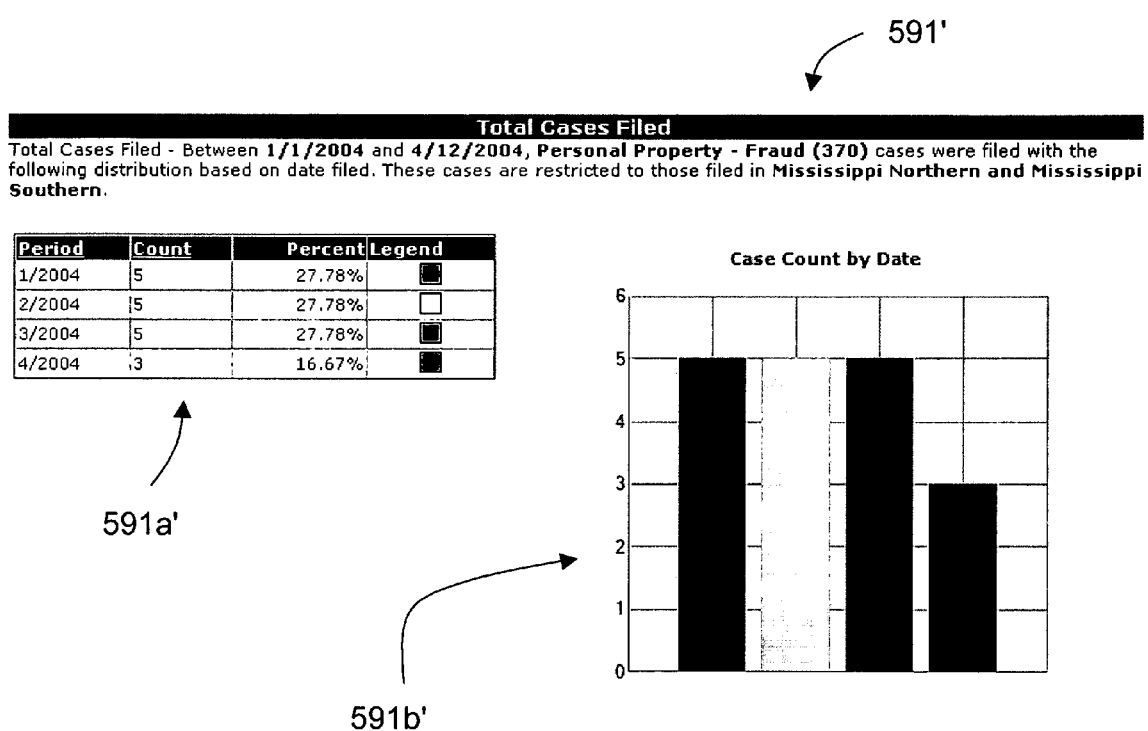
FIG. 7U is an illustration of an alternate embodiment of the report section of FIG. 7I.
Figure 7V:
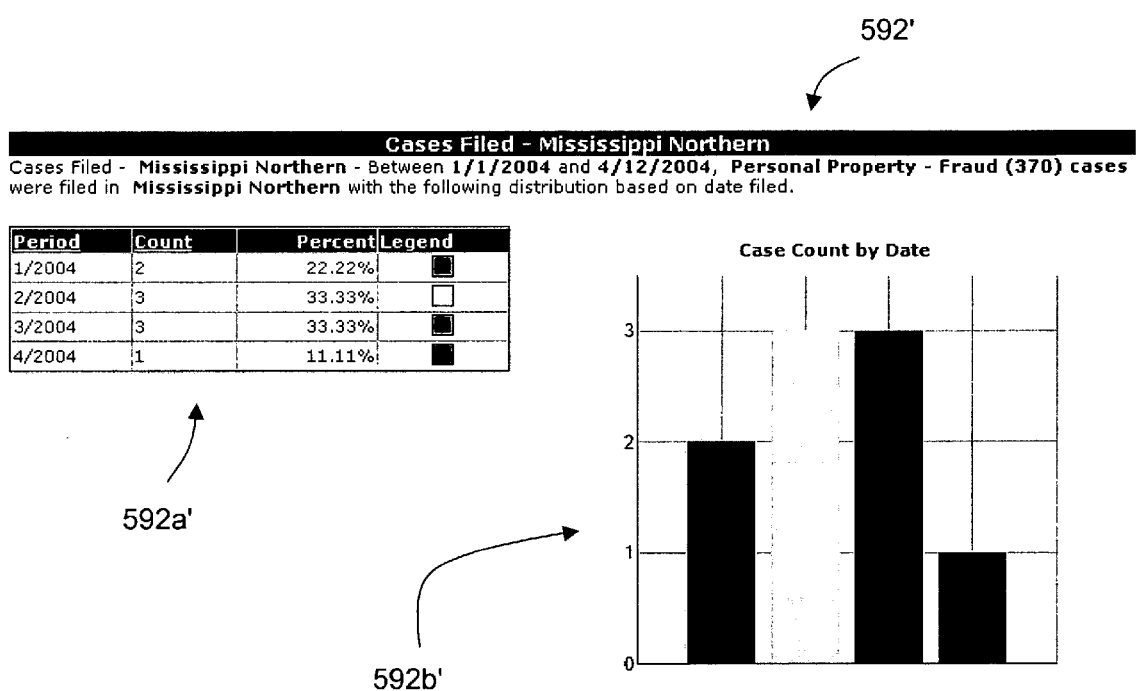
FIG. 7V is an illustration of an alternate embodiment of the report section of FIG. 7J.
Figure 7W:
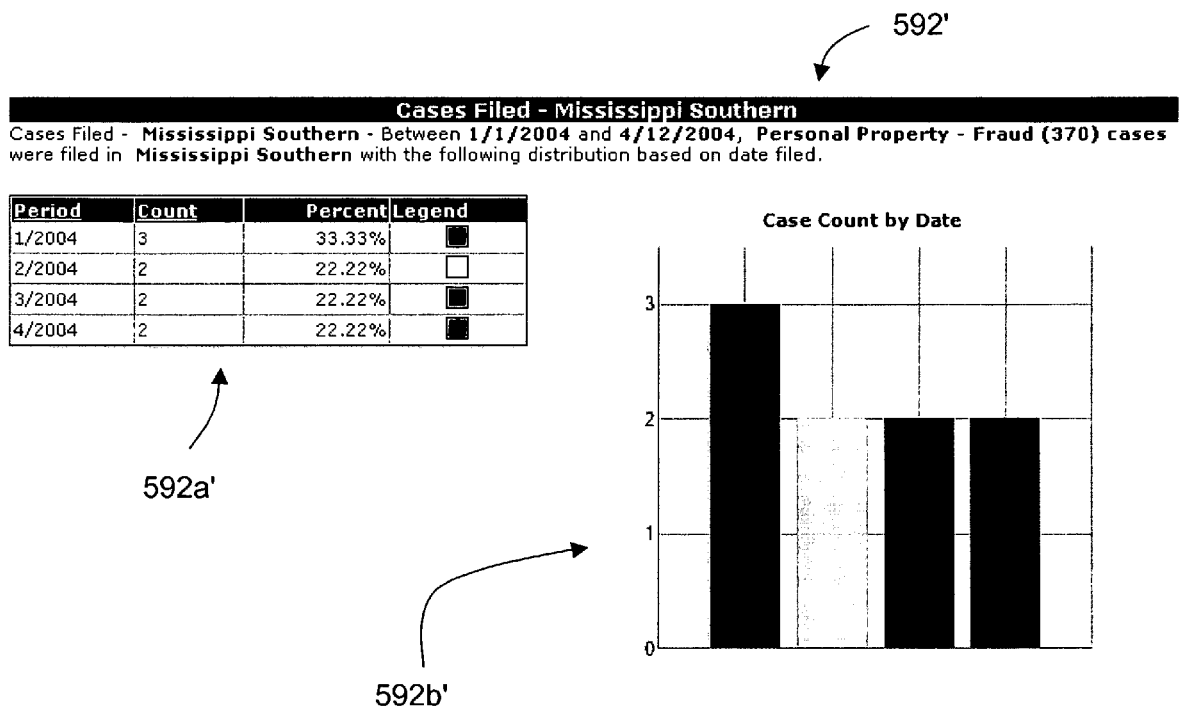
FIG. 7W is an illustration of an alternate embodiment of the report section of FIG. 7K.
Figure 7X:
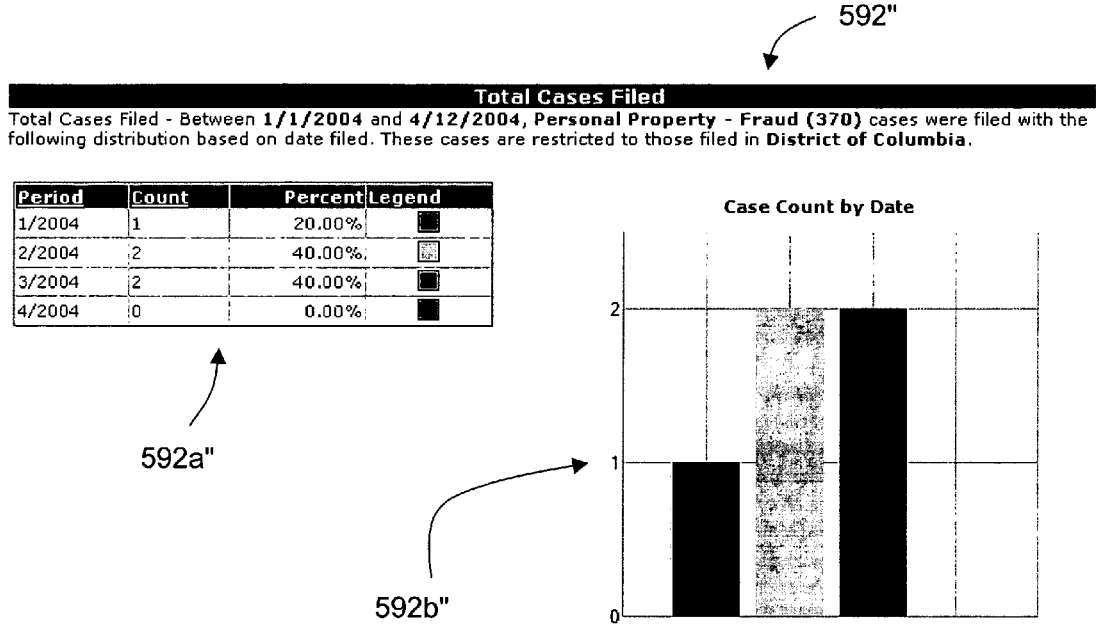
FIG. 7X is an illustration of an alternate embodiment of the report section of FIG. 7L.

If two, three, or four Courts are specified from the initial input form, the report will first display the Total Cases filed across all Courts combined 591' (FIG. 7I) with a table 591*a*' and corresponding graph 591*b*', followed by Cases Filed by state sections 592' with individual tables 592*a*' for the count of cases filed for each Court (FIGS. 7J and 7K), and corresponding graphs 592*b*'. If a single Court is selected, the report 592" is simply one table 592*a*" displaying the count of cases for the selected Nature of Suit in that Court and a corresponding graph 592*b*" (FIG. 7L).

At the bottom of the report is an input form 593 (FIG. 7M) that allows the user to (1) switch to a different type of Strategic Profile (by clicking on a different one of tables 100, 200, 300, 400, and 500), (2) change the reporting dates for the current Nature of Suit Strategic Profile (information fields 593*a*), (3) obtain product help (help button 593*b*), (4) change the chart type from bar charts to line charts (or vice versa) (radio buttons 593*c*), (5) indicate whether the report tables should be active (meaning that report tables can be interactively sorted and filtered) (radio buttons 593*d*) in the implementation in which a java applet is used to allow sorting and filtering, (6) indicate the placement of charts in relation to tables (to the side, below, or suppressed) (radio buttons 593*e*), or (7) indicate if the reporting period should be aggregated by month or year (radio buttons 593*f*). The user can select the level of customization he or she requires and click the "Rerun Profile" button 593*g* to create a modified report. Should the user desire a printable copy of the report (one without header graphics or the bottom input form), he or she can click the "Print View" button 593h. A new browser window (not shown) will be opened which will accommodate this request.

Figure 7Y:
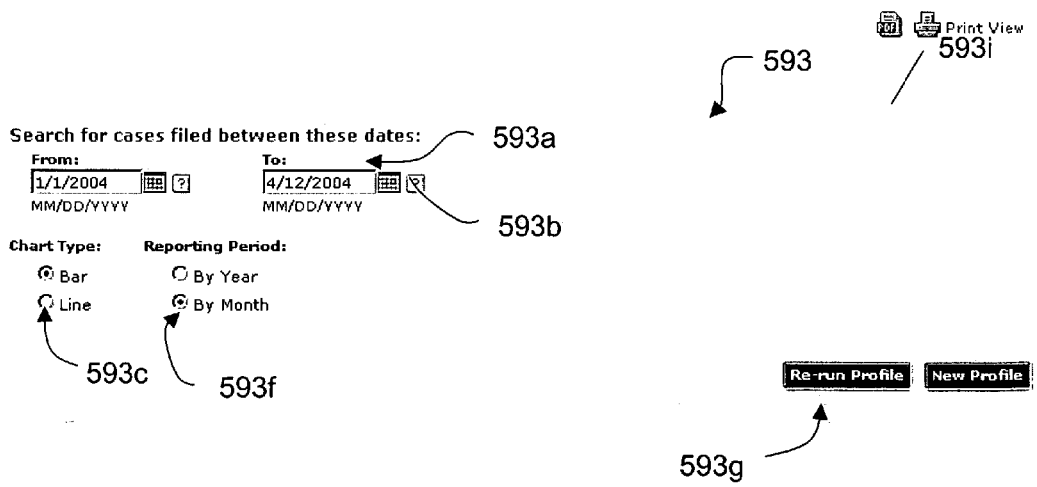
FIG. 7Y is an illustration of an alternate embodiment of the report section of FIG. 7M.

In an alternate embodiment, illustrated in FIG. 7Y, the Table Type option 593d and the Report Layout option 593e are omitted, in favor of making all tables active, and fixing the report layout as "Table next to Chart" (see, for example, FIG. 7T). A report also can be generated to a data file (for example in button 593i, a PDF file), to allow the report to be saved and to be sent to others.

Data required to reproduce this Nature of Suit Strategic Profile are stored in a database table and are displayed as an option the next time the user runs a Nature of Suit Strategic Profile.

Nature of Suit Strategic Profiles are run primarily to gauge the level of activity in certain courts for specific case types. A law firm can use this trend data to better allocate firm resources both geographically and by practice area. Others, especially the media, can use this report to research litigation trends.

History Report

In one embodiment, individual tabs on the Strategic Profile reports main menu screen have their own history information. In an alternate embodiment, shown in FIG. 2B, a separate History tab 600 is provided on the main menu. Upon selecting History (by clicking the corresponding tab 600 of the main menu), the user is presented with a screen as depicted in FIG. 2B. In the History screen, all reports previously run by the user are grouped in one table 610. The table 610 includes a selection box column 610a; an Action column 610b displaying the available actions that can be taken for each report; a Type column 610c, displaying the type of report for each report; a Report Name column 610d displaying the name of each report; a System column 610e displaying the court system for which each report was run; a Date Run column 610f displaying the date each report was run; a Rerun Free Until column 610g displaying either the date and time until which the user can rerun a report without charge or the charge for rerunning the report; a Date Range column 610h displaying the date range for each report; a Results column 610i displaying the number of entries in each report; a Client Matter Code column 610j displaying the client matter code (if any) entered by the user for each report; and a Project Notes column 610k displaying any project notes entered by the user for each report. The table 610 is sortable by most columns and filterable according to parameters identified in drop-down menus 620 provided in at least some of the columns (as illustrated in FIG. 2B, the Type, System, Client Matter Code, and Project Notes columns).

It will be appreciated by those of skill in the art that the specific form in which the reports are displayed can be changed as needed according to user preference and to improve readability. For example, graphs can be presented in either three dimensions, as shown in FIGS. 3E-3I, 4D, 4E, 4I, 5D, 5E, 6C-3, 6D, 7F, and 7I-7L, or in two dimensions, as shown in FIGS. 3Q-3U, 4P-4Q, 4U, 5M-5N, 6H-1, 6H-2, 6I, and 7S-7X. The reports can be tabbed or otherwise divided into separate sections 50, 52, 54 corresponding to separate web pages (for example, section 1—Profile Report (tables and graphs); section 2—Case List; and section 3—Criteria), as shown in FIG. 3P. As shown in FIG. 3V, link 195k can be provided to a menu that allows the user to customize case list tables by adding or removing columns, specifying the number of items (rows in the table) displayed on a page (instead of displaying all items (rows in the table)), and setting default sorting options.

It is to be understood that the present invention is not limited to the illustrated user interfaces or to the order of the user interfaces described herein. Various types and styles of user interfaces may be used in accordance with the present invention without limitation.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method for aggregating and presenting relevant information implemented using a programmable data processing apparatus having computer-readable memory storing a database, the method comprising the steps of using said programmable data processing apparatus to:
   store a set of data, received from a public records host server, in a plurality of computer-readable database tables in the database;
   present a user with a first interface to choose a strategic profile report wherein a set of computer-executable instructions, associated with each strategic profile report, is configured to query one or more of said computer readable database tables to produce said chosen strategic profile report;
   receive a strategic profile report selection;
   query at least one of said computer-readable database tables based on computer-executable instructions associated with said strategic profile report selection;
   generate a second interface comprising a set of hyperlinks wherein each of said hyperlinks represents a discrete data point, which is displayed as the text portion of each of the hyperlinks, and, upon selection, executes an associated set of computer-executable instructions to construct a query using said data point as an input parameter;
   query and filter said computer-readable database tables using said query;
   generate a third interface comprising a subset of data from said computer-readable database tables filtered by said data point.

2. A method for aggregating and presenting relevant information from public records as claimed in claim 1 wherein
   said strategic profile report is chosen from the group consisting of:
      a litigant strategic profile report;
      an attorney strategic profile report;
      a judicial strategic profile report,
      a court strategic profile report; and
      a nature of suit strategic profile report; and
   said computer-readable database tables comprise:
      a docket table configured to store data comprising a list of cases and their causes of action;
      a litigant table configured to store data comprising a unique list of litigants;
      a litigant link table configured to store data comprising litigants from said list of litigants, a set of cases associated with each of said litigants, and a position for each of said litigants in each of said set of cases;
      an attorney table configured to store data comprising a unique list of attorneys and their law firms,
      an attorney link table configured to store data comprising a relationship, if applicable, between each litigant in said list of litigants and each attorney in said list of attorneys where a given attorney represented a given litigant and each case from said list of cases involving said given attorney;

a judge table configured to store data comprising a list of judges; and a judge link table configured to store data comprising a relationship, if applicable, between each judge in said list of judges and each case in said list of cases that a given judge participated in.

3. A method for aggregating and presenting relevant information as claimed in claim 2 wherein each hyperlink, in said set of hyperlinks in said second interface, for an "attorney strategic profile report" further comprises one or more aggregations chosen from the list consisting of an aggregation of clients represented by said attorney; types of cases represented by said attorney, judges said attorney has appeared before, states/courts said attorney has appeared before, and other attorneys said attorney has worked with.

4. A method for aggregating and presenting relevant information as claimed in claim 2 wherein each hyperlink, in said set of hyperlinks in said second interface, for a "judicial strategic profile report" further comprises one or more aggregations chosen from the list consisting of cases a judge has presided over, attorneys appearing before said judge, and types of cases said judge has presided over.

5. A method for aggregating and presenting relevant information as claimed in claim 2 wherein each hyperlink, in said set of hyperlinks in said second interface, for a "nature of suit strategic profile report" further comprises an aggregation of cases according to their case type.

6. A method for aggregating and presenting relevant information as claimed in claim 2 wherein each hyperlink, in said set of hyperlinks in said second interface, for a "court strategic profile report" further comprises an aggregation of cases filed in a court selected by said user.

7. A method for aggregating and presenting relevant information as claimed in claim 2 wherein each hyperlink, in said set of hyperlinks in said second interface, for a "litigant strategic profile report" further comprises an aggregation chosen from the list consisting of an aggregation of a set of cases naming a litigant provided as a search parameter;

a set of types of cases in which said litigant appears;

a set of states and courts in which said litigant has appeared; and a set of attorneys/firms representing said litigant.

8. A method for aggregating and presenting relevant information as claimed in claim 7 wherein each of said query steps queries said docket table, litigant table, and said litigant link table.

9. A system configured to generate a set of reports:

at least one computer-readable memory configured with a set of database tables storing attorney names, litigant names, docket information, judge names, litigant names and a set of linkages between a set of litigants and a set of cases;

a set of attorneys and a set of litigants; and a set of judges and a set of cases;

a first processor, programmed with computer program instructions to produce a first machine, configured to generate a first interface to receive a user-selected strategic profile report wherein said report focuses on an entity chosen from the list of a litigant, an attorney, a judge, a court or a nature of suit;

a second processor, programmed with computer program instructions to produce a second machine, configured to query one or more of said database tables wherein said database tables queried depends on said user-selected strategic profile report;

said second machine configured to generate for graphical display a second interface comprising a set of hyperlinks associated with said strategic profile report wherein a textual component associated with each hyperlink displays a count of cases calculated by said strategic profile report;

said second machine configured to generate for graphical display a third interactive user interface, upon clicking a hyperlink, further comprising a set of computer-executable instructions to construct a query, by querying one or more of said database tables associated with said hyperlink wherein said query constructed from said computer-executable instructions encoded in said hyperlink uses a data point represented by a text portion displayed as said hyperlink as a variable in said query to retrieve a subset of data from said database tables.

10. A system configured to generate a set of reports as claimed in claim 9 wherein a litigant strategic profile report comprises:

for each type of case said litigant is associated with, a set of hyperlinks displaying how many of each type of case;

for each attorney representing said litigant, another set of hyperlinks displaying how many cases each attorney has represented.

11. A system configured to generate a set of reports as claimed in claim 9 wherein an attorney strategic profile report comprises:

for each type of case said attorney is associated with, a set of hyperlinks displaying how many of each type of case;

for each judge said attorney has appeared before, another set of hyperlinks displaying how many times said attorney has appeared before each judge;

for every other attorney said attorney has worked with, a third set of hyperlinks displaying how many times said attorney worked with each of every other attorney.

12. A system configured to generate a set of reports as claimed in claim 9 wherein a judicial strategic profile report comprises:

an area comprising a set of hyperlinks displaying how many attorneys have appeared before said judge; and another area comprising a set of hyperlinks displaying the types of cases said judge has presided over.

13. A system configured to generate a set of reports as claimed in claim 9 wherein a nature of suit strategic profile report comprises a set of hyperlinks displaying how many cases associated with a nature of suit are pending.

14. A system configured to generate a set of reports as claimed in claim 9 wherein a nature of suit strategic profile report comprises a set of hyperlinks displaying how many cases associated with a nature of suit are pending.

15. A system configured to generate a set of reports as claimed in claim 9 wherein said underlying data is represented as an aggregate in one or more hyperlinks and further wherein said second machine is configured to generate for graphical display a fourth interface, based on computer-executable instructions associated with said hyperlinks representing said underlying data.

16. A system configured to generate a set of reports as claimed in claim 15 wherein said fourth user interface displays a case represented by a hyperlink from said series of hyperlinks representing said underlying data.

17. A system configured to generate a set of reports as claimed in claim 9 wherein if a user selects a report focusing on a judge, said second processor queries at least said database tables comprising judge names, docket information, and a set of linkages between said judge names and said set of cases.

\* \* \* \* \*